United States Patent
Hioki et al.

(10) Patent No.: US 8,063,741 B2
(45) Date of Patent: Nov. 22, 2011

(54) TAG TAPE, TAG TAPE ROLL, AND RFID LABEL

(75) Inventors: Hitomi Hioki, Nagoya (JP); Kiyoichi Ohta, Chiryu (JP); Tsuyoshi Nagae, Kasugai (JP); Koshiro Yamaguchi, Kakamigahara (JP); Tsuyoshi Ohashi, Hashima (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 472 days.

(21) Appl. No.: 12/308,358

(22) PCT Filed: Jun. 11, 2007

(86) PCT No.: PCT/JP2007/061762
§ 371 (c)(1),
(2), (4) Date: Apr. 6, 2009

(87) PCT Pub. No.: WO2008/004409
PCT Pub. Date: Jan. 10, 2008

(65) Prior Publication Data
US 2009/0295542 A1 Dec. 3, 2009

(30) Foreign Application Priority Data

Jun. 12, 2006 (JP) .................. 2006-161744
Dec. 27, 2006 (JP) .................. 2006-353042

(51) Int. Cl.
*H04Q 5/22* (2006.01)
(52) U.S. Cl. .................. 340/10.1; 340/572.8; 235/375; 156/60
(58) Field of Classification Search .................. 340/10.1, 340/572.1–572.8; 156/60; 235/375, 385
See application file for complete search history.

(56) References Cited

U.S. PATENT DOCUMENTS

| | | | | |
|---|---|---|---|---|
| 6,478,229 | B1 * | 11/2002 | Epstein | 235/492 |
| 6,648,232 | B1 * | 11/2003 | Emmert | 235/488 |
| 6,977,112 | B2 * | 12/2005 | Shino et al. | 235/492 |
| 7,368,032 | B2 * | 5/2008 | Green et al. | 156/264 |
| 2003/0075608 | A1 * | 4/2003 | Atherton | 235/492 |
| 2004/0091681 | A1 * | 5/2004 | Hoffmann | 156/230 |
| 2006/0118229 | A1 * | 6/2006 | Ohashi et al. | 340/572.8 |
| 2007/0139206 | A1 * | 6/2007 | Kikuchi et al. | 340/572.8 |
| 2007/0159353 | A1 * | 7/2007 | Arai et al. | 340/870.11 |

FOREIGN PATENT DOCUMENTS

| | | |
|---|---|---|
| JP | 2002163618 | 6/2002 |
| JP | 2004333651 | 11/2004 |
| JP | 2005157661 | 6/2005 |
| JP | 2005209171 | 8/2005 |
| JP | 2005223627 | 8/2005 |
| JP | 2006131331 | 5/2006 |
| WO | 0065559 | 11/2000 |

* cited by examiner

*Primary Examiner* — Eric M Blount
(74) *Attorney, Agent, or Firm* — Day Pitney LLP

(57) ABSTRACT

This disclosure discloses a tag label producing apparatus comprising: a printing device; a transmitting/receiving device that performs information transmission/reception; a feeding device that feeds said tag medium; a coordination control portion; a communication determining portion that determines whether or not information transmission/reception has succeeded; and a decision portion that decides a feeding-stop condition for stopping feeding based on a feeding condition for the transmission/reception, and a feeding-condition for printing to a print area; wherein: said coordination control portion controls in coordination operations of said feeding device, said transmitting/receiving device, and said printing device so as to stop feeding based on said feeding-stop condition decided by said decision portion and to perform retry of said information transmission/reception when said communication determining portion determines that said information transmission/reception has failed.

24 Claims, 34 Drawing Sheets

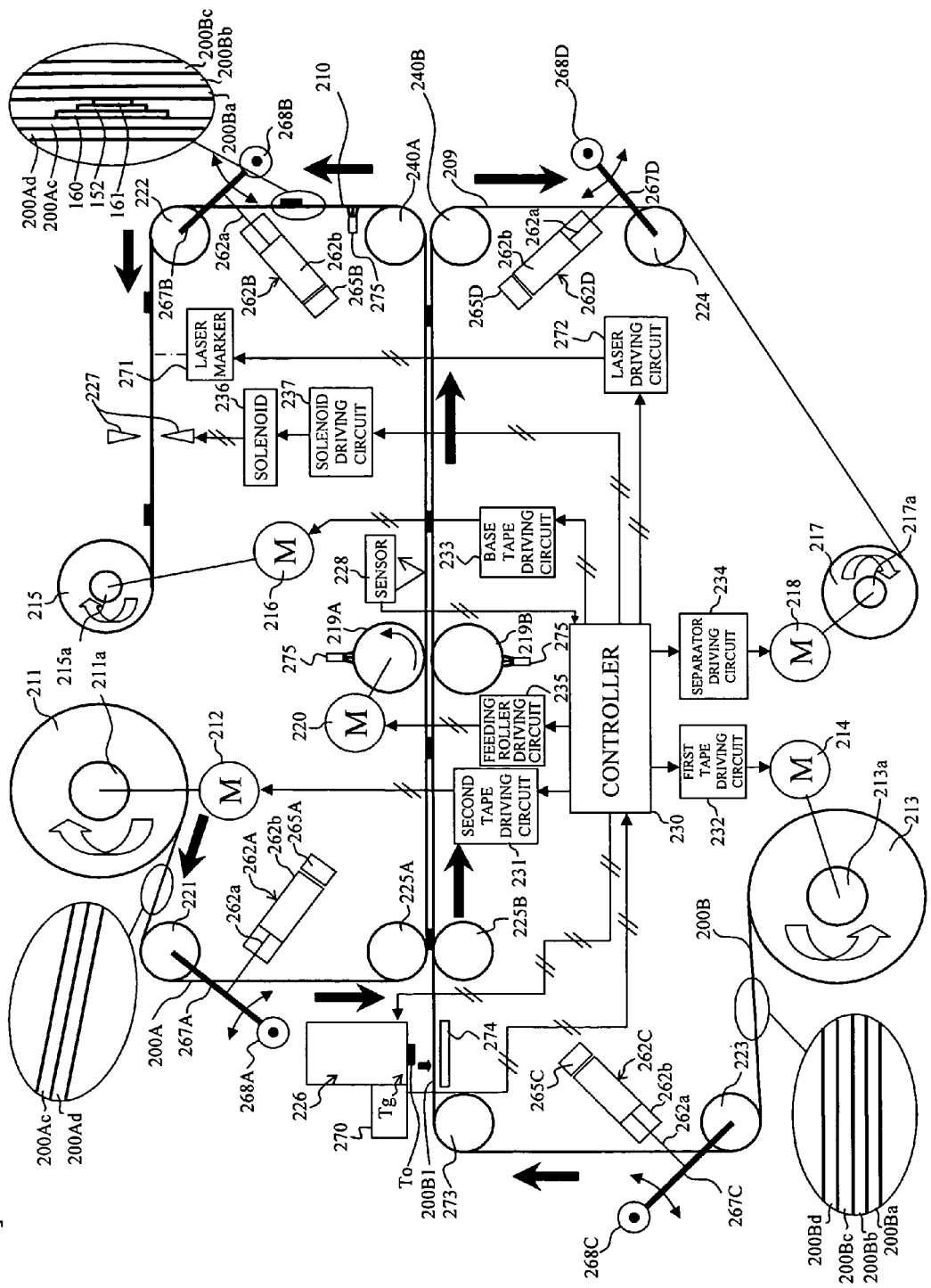
[FIG. 1]

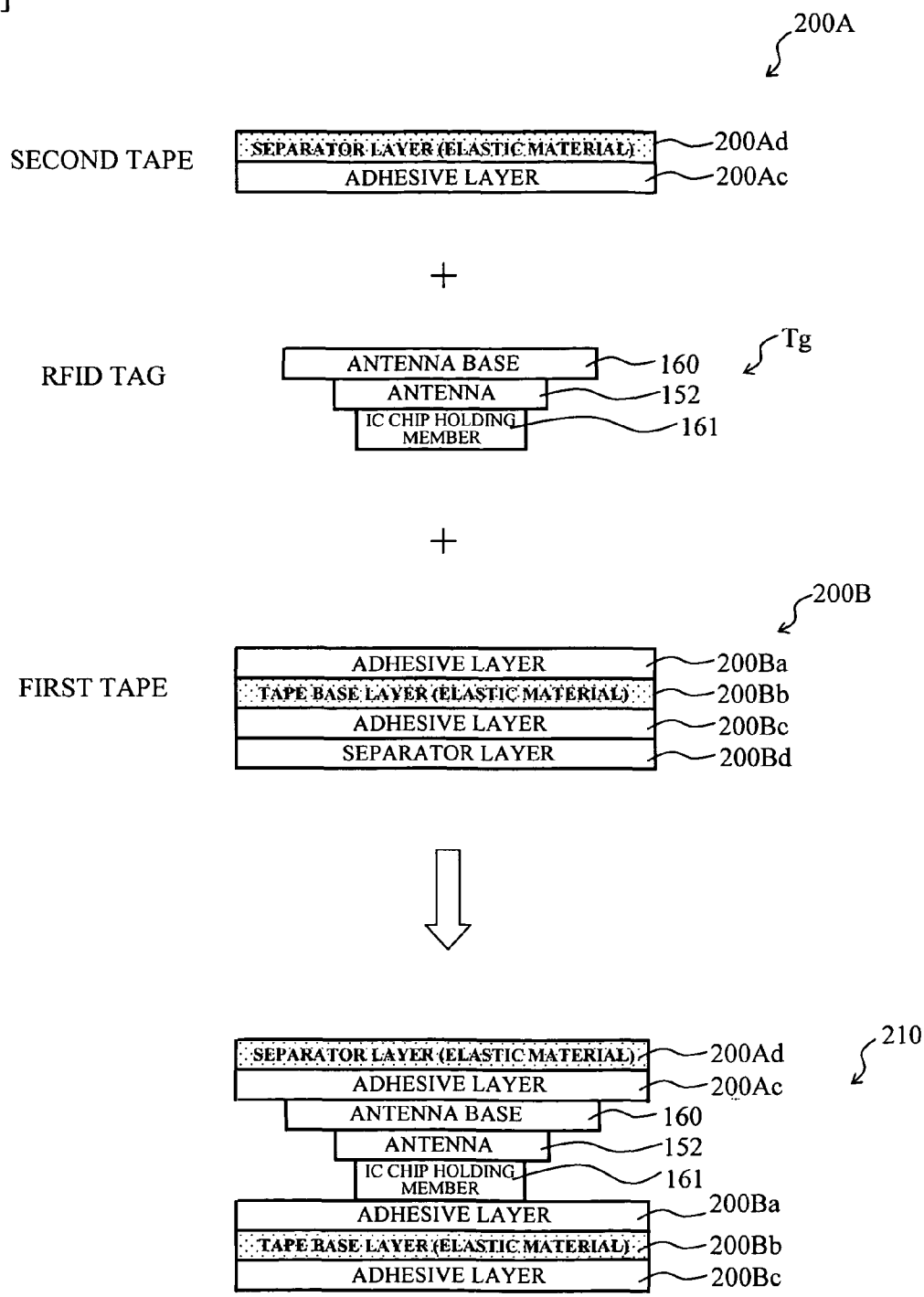
[FIG. 2]

[FIG. 3]
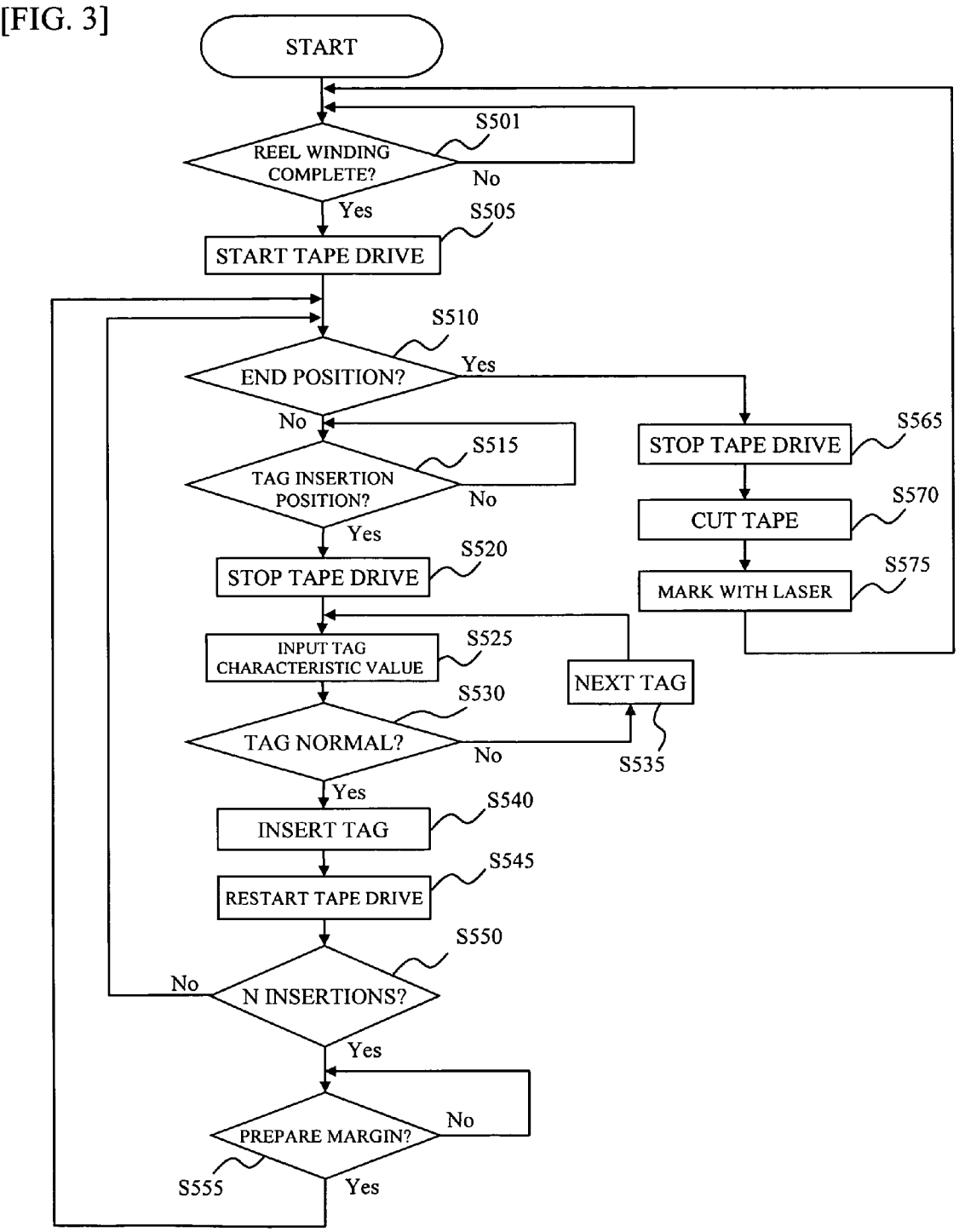

[FIG. 4]
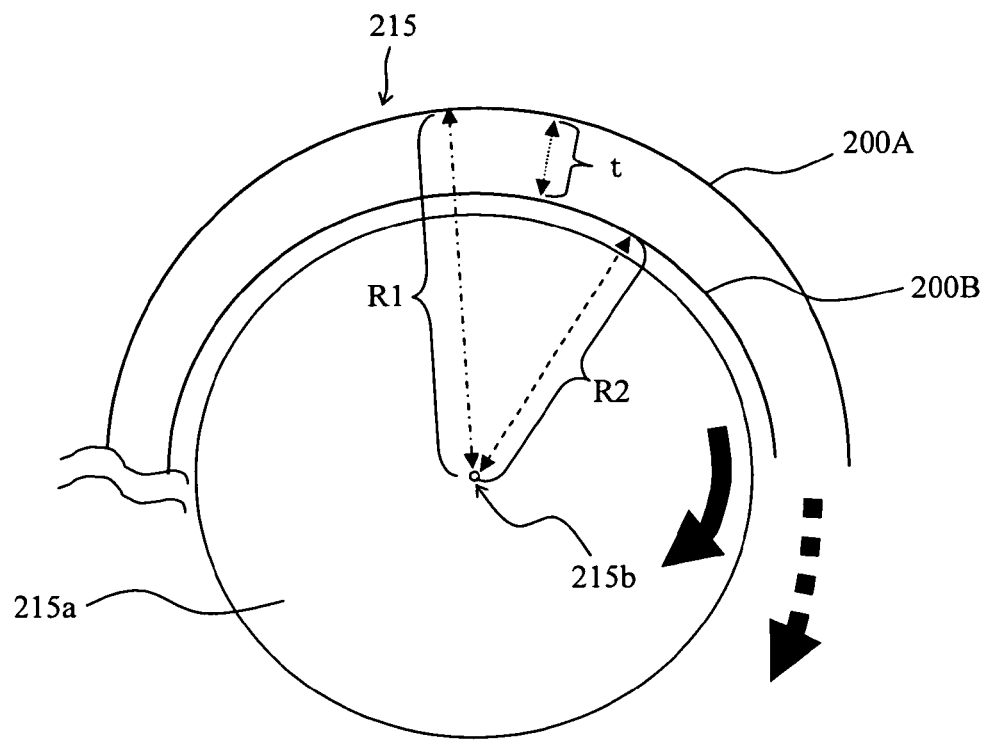

[FIG. 5]
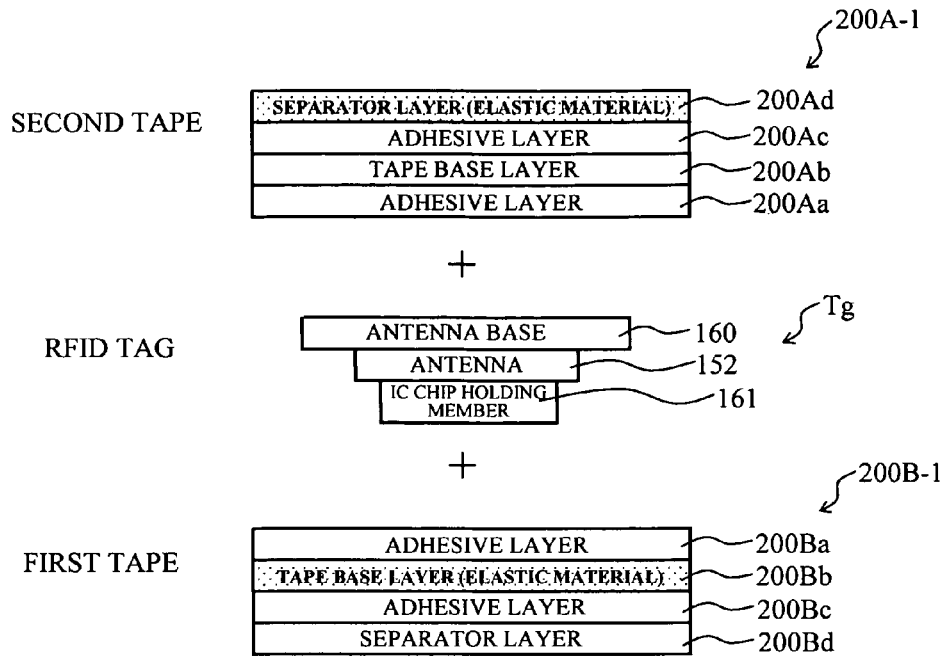
[FIG. 6]
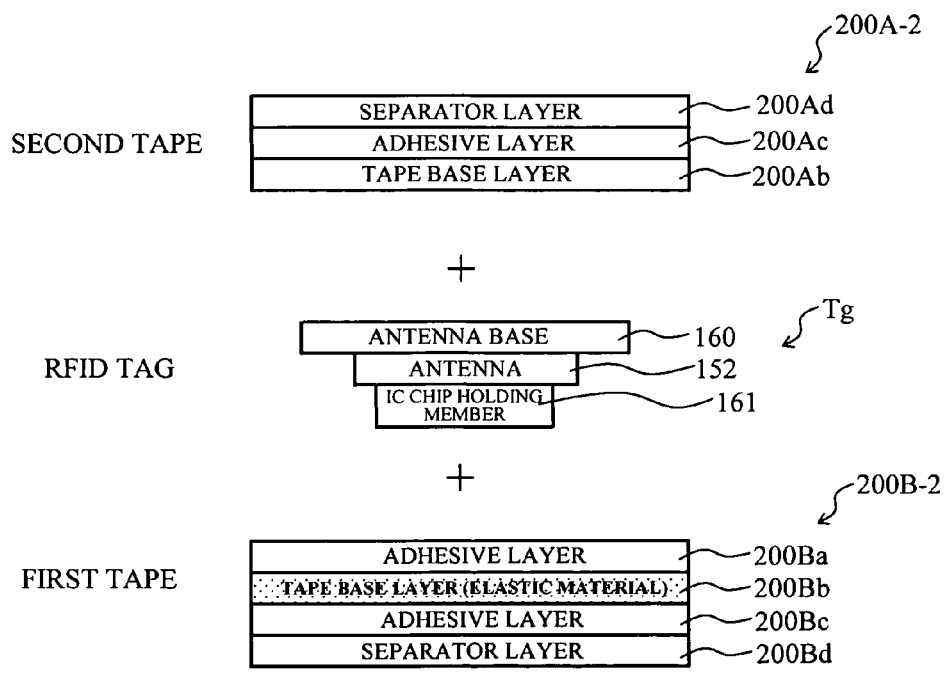

[FIG. 7]
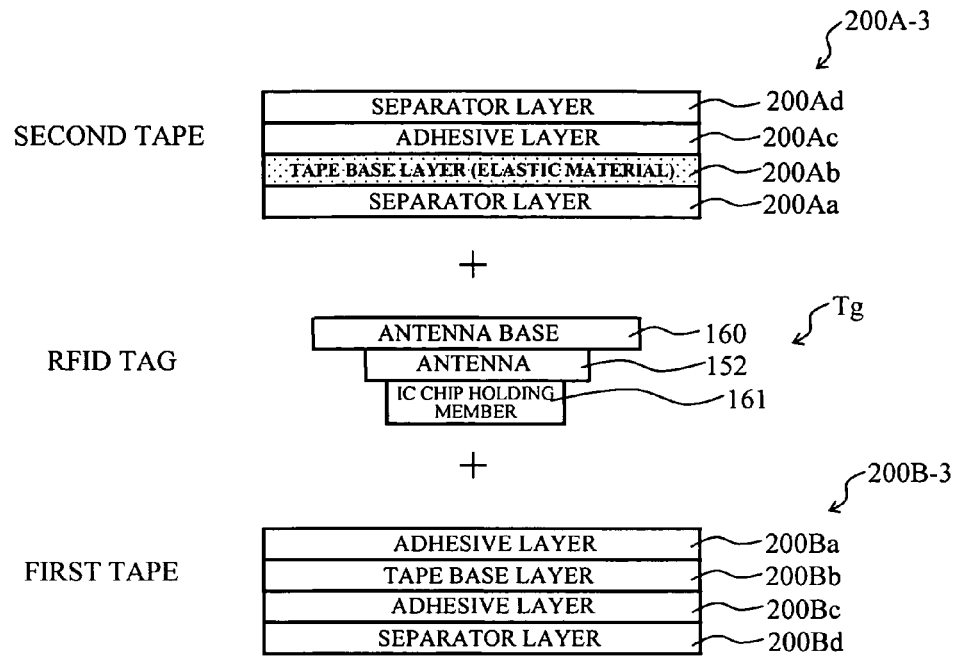
[FIG. 8]
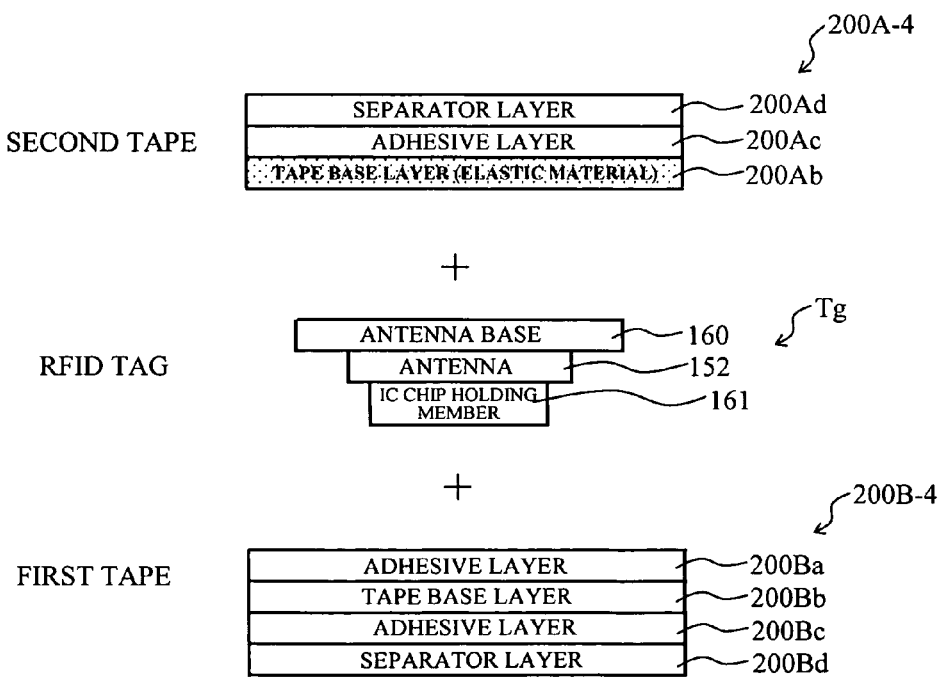

[FIG. 9]
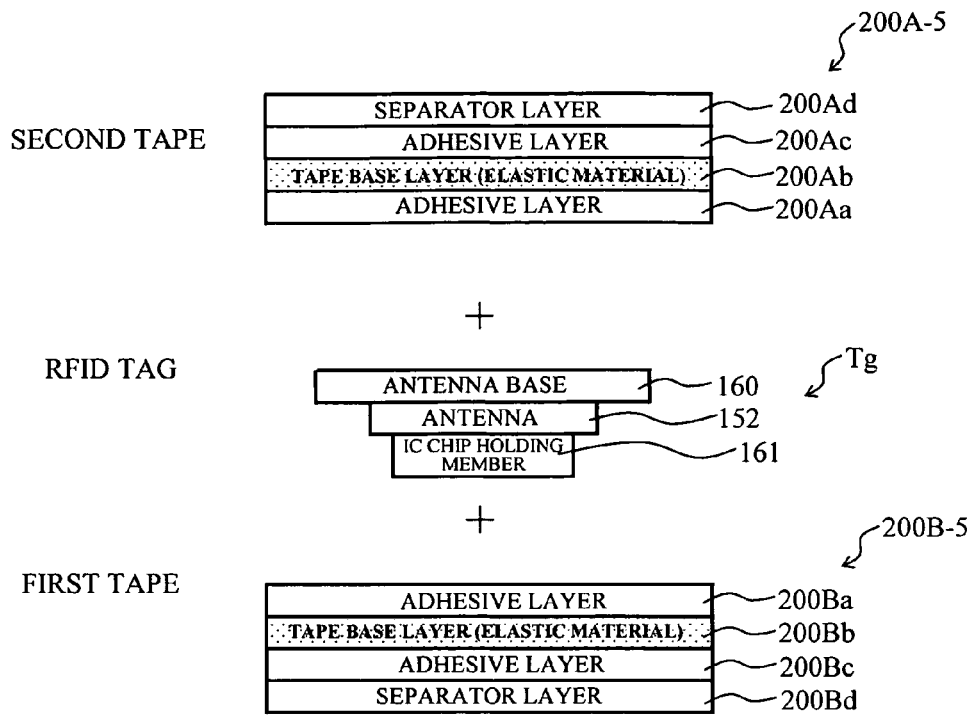
[FIG. 10]
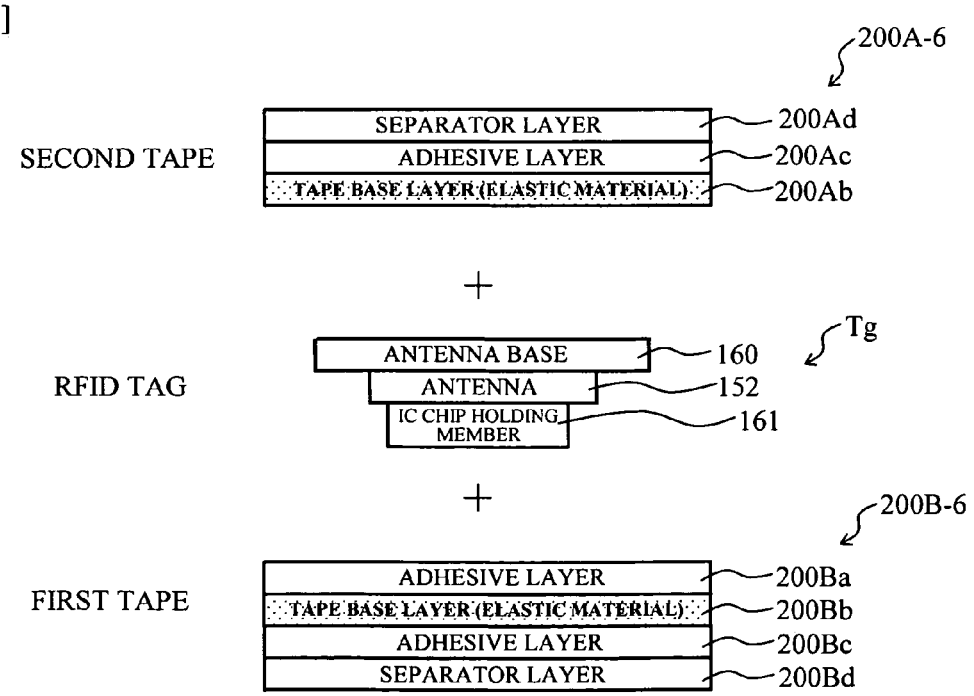

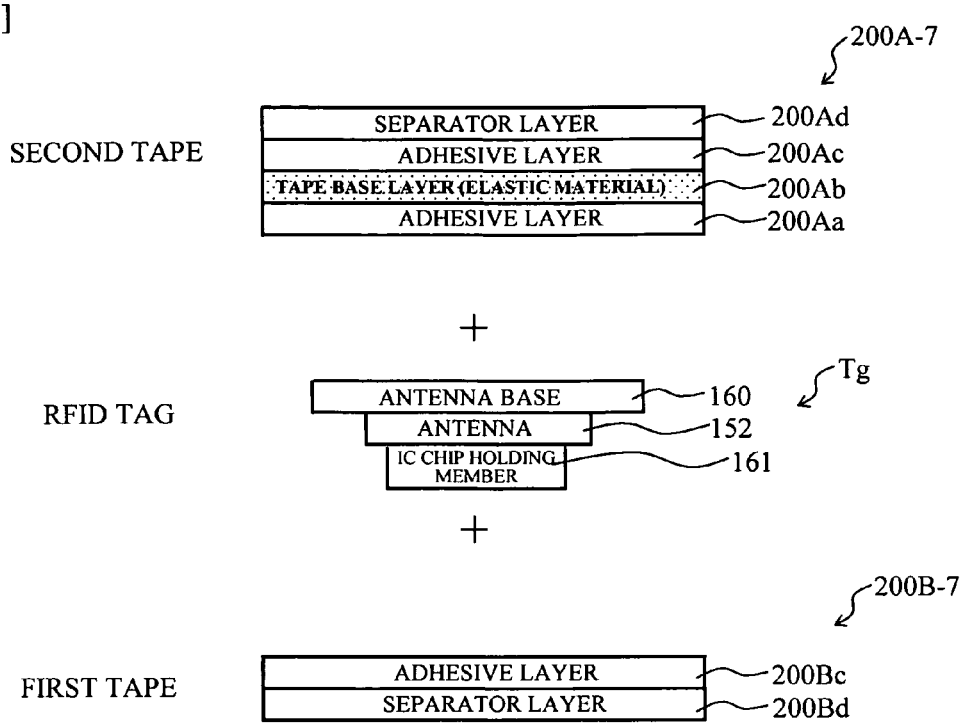
[FIG. 11]
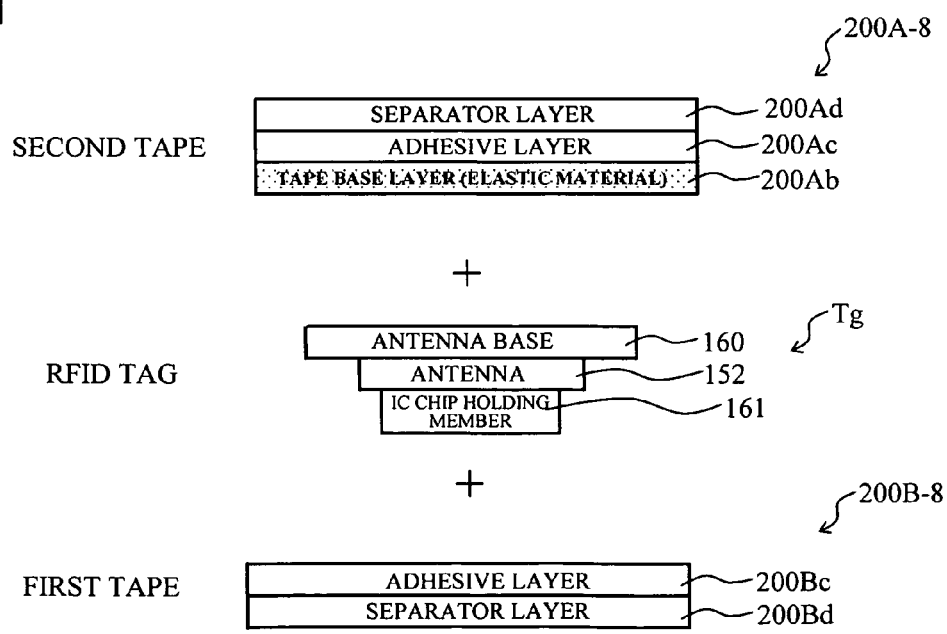
[FIG. 12]

[FIG. 13]
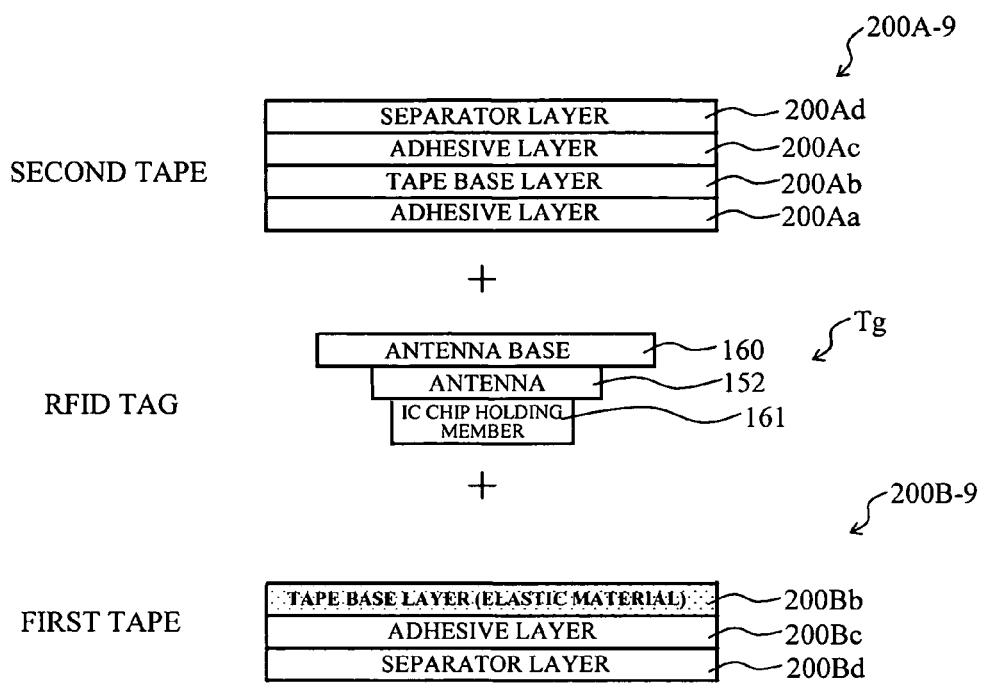

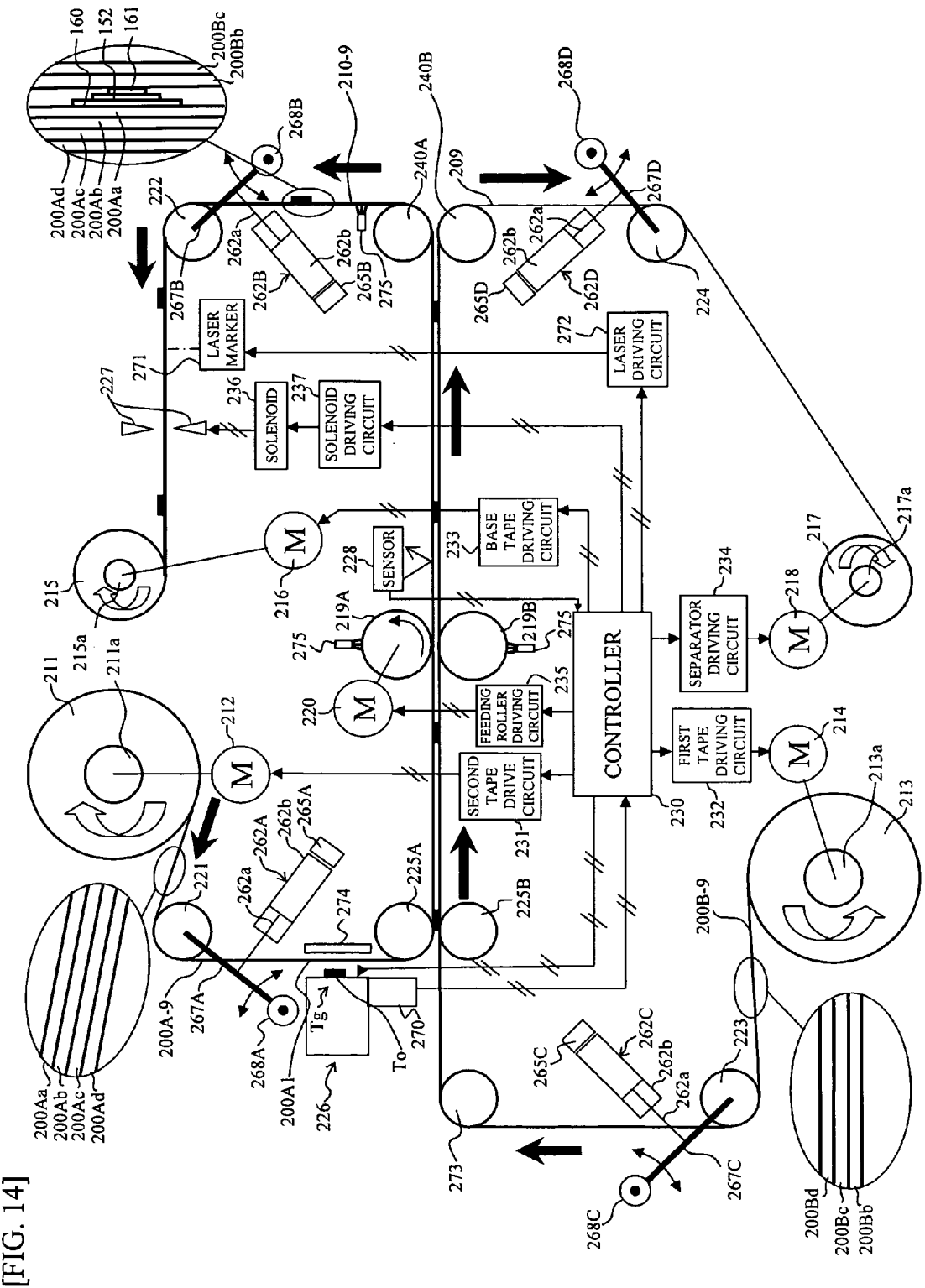
[FIG. 14]

[FIG. 15]
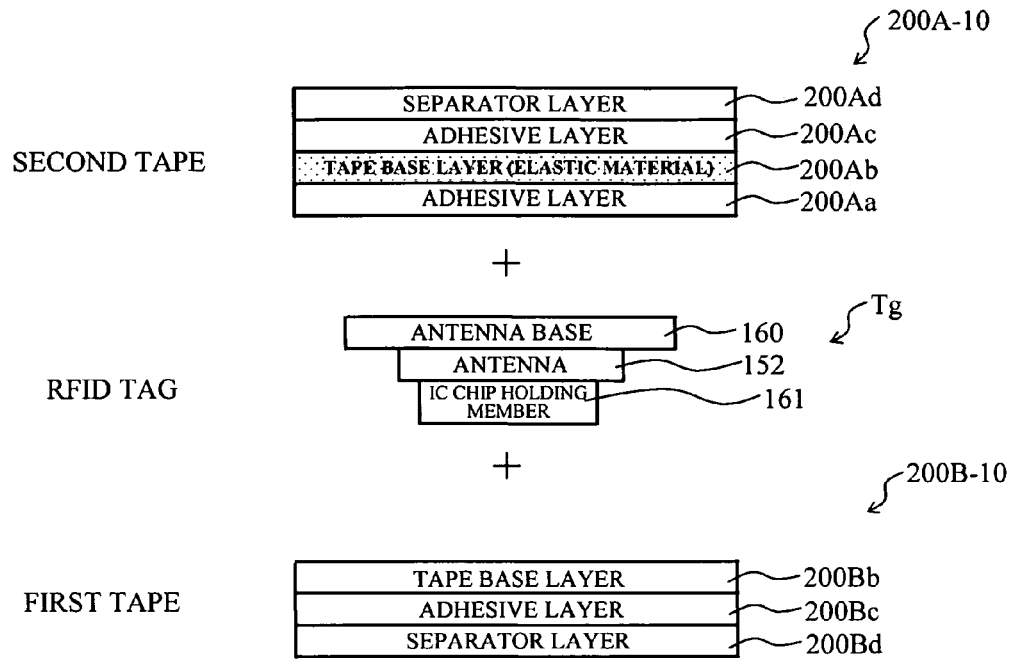
[FIG. 16]
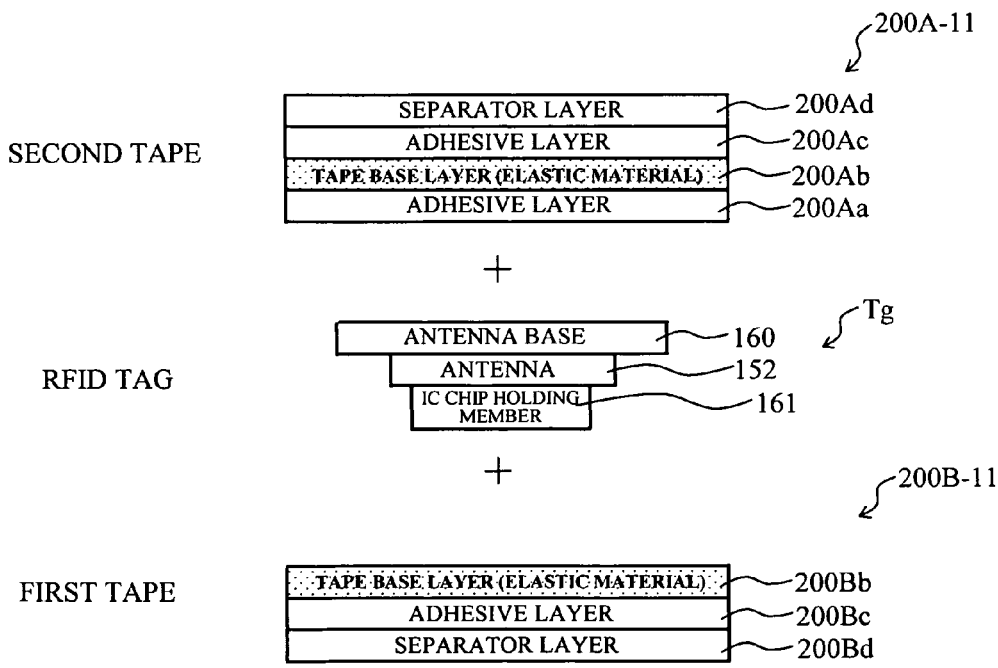

[FIG. 17]
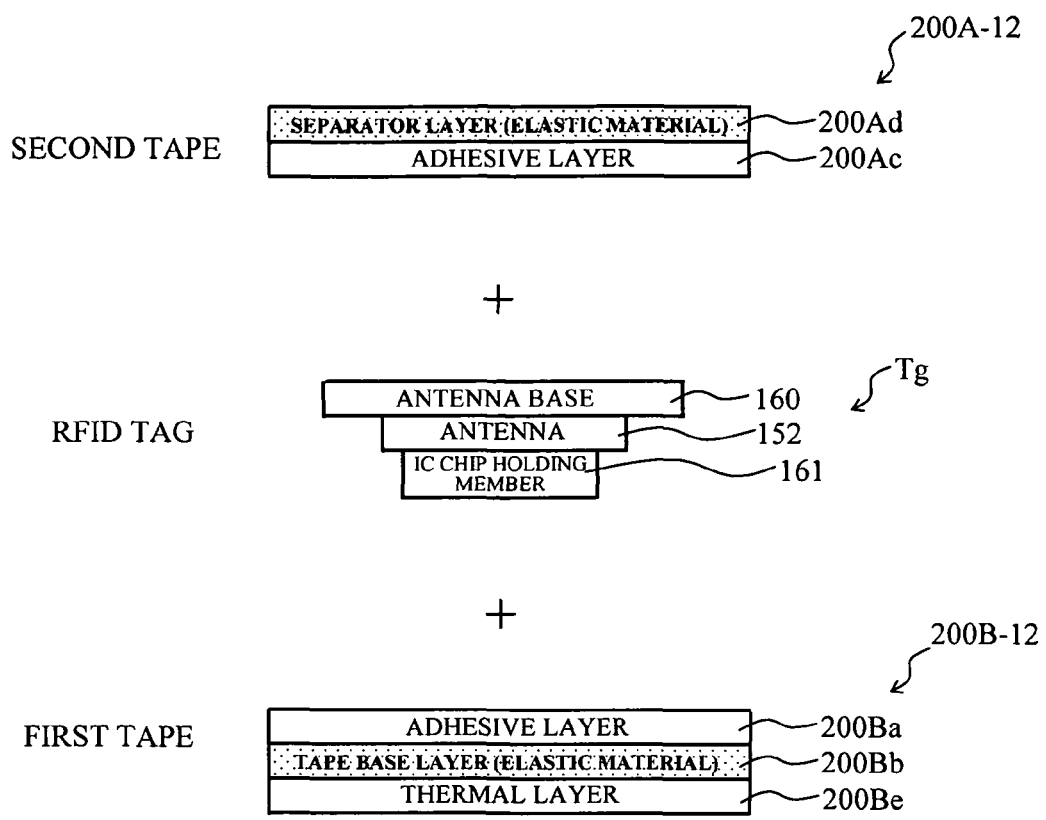

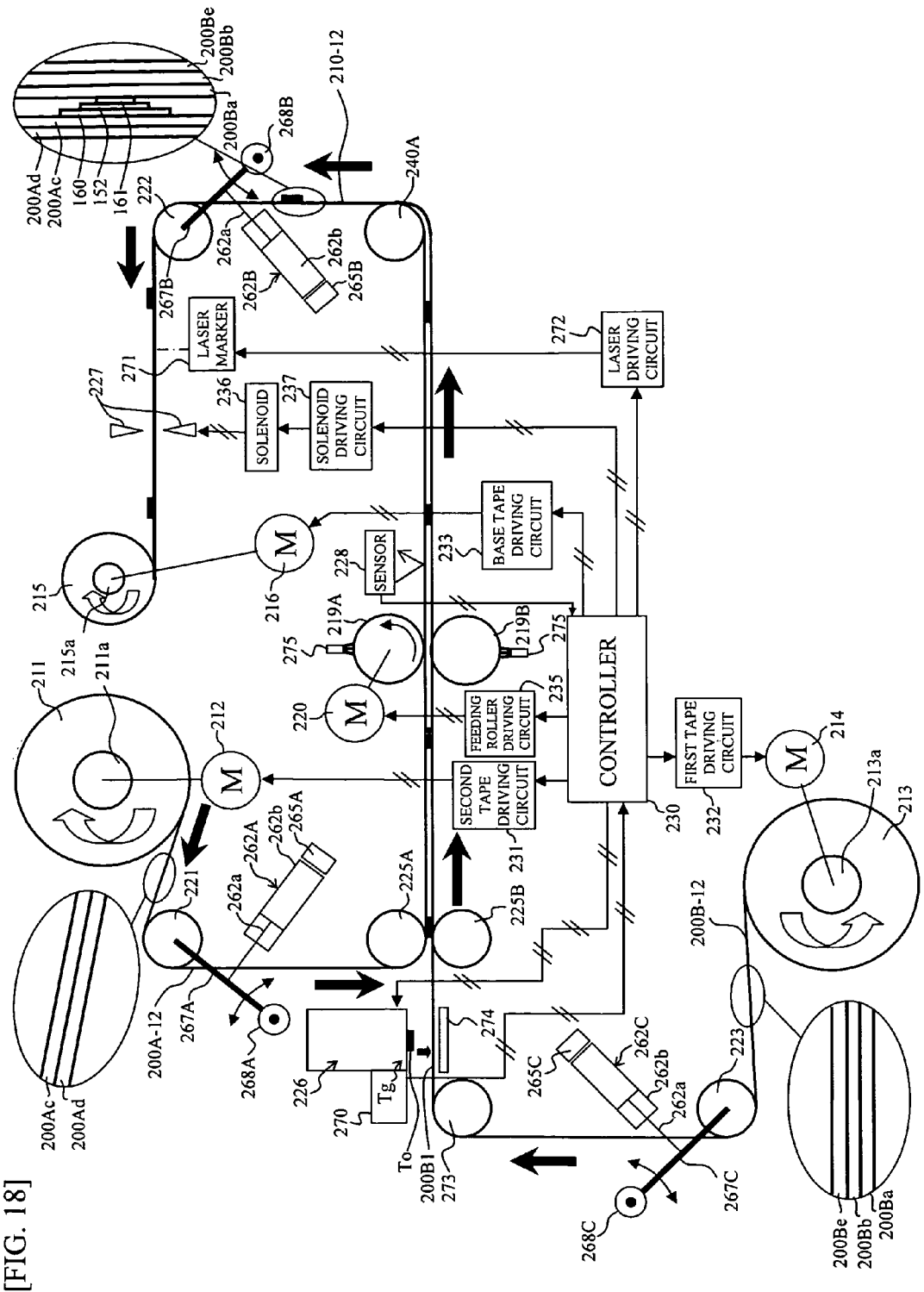
[FIG. 18]

[FIG. 19]
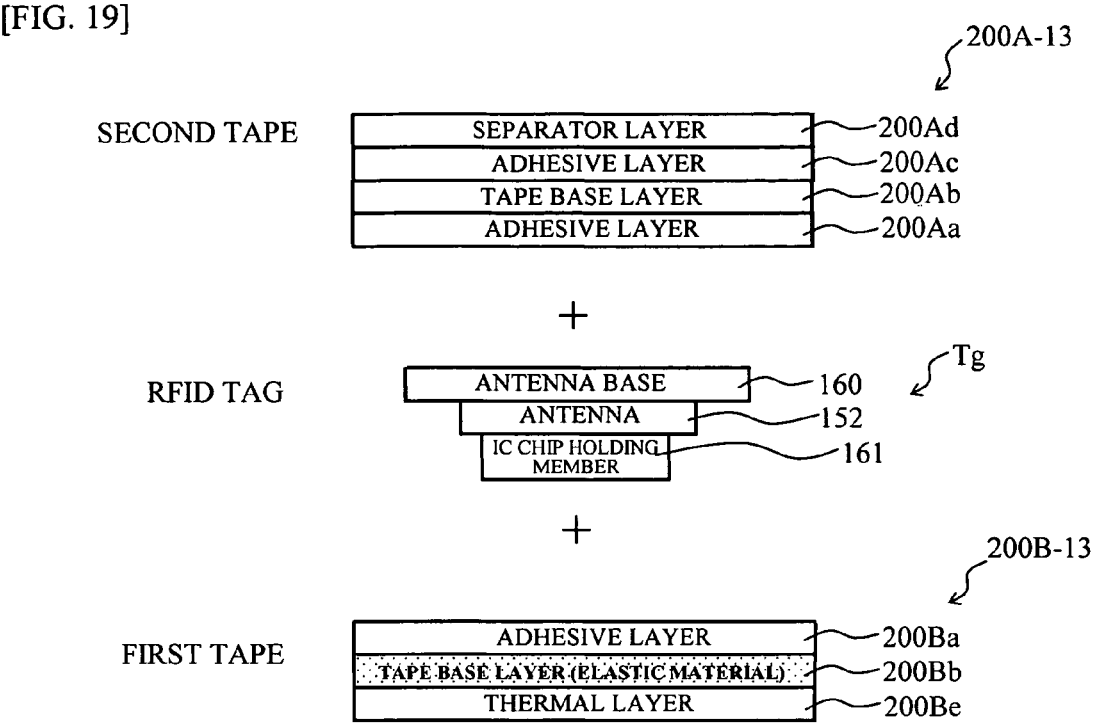
[FIG. 20]
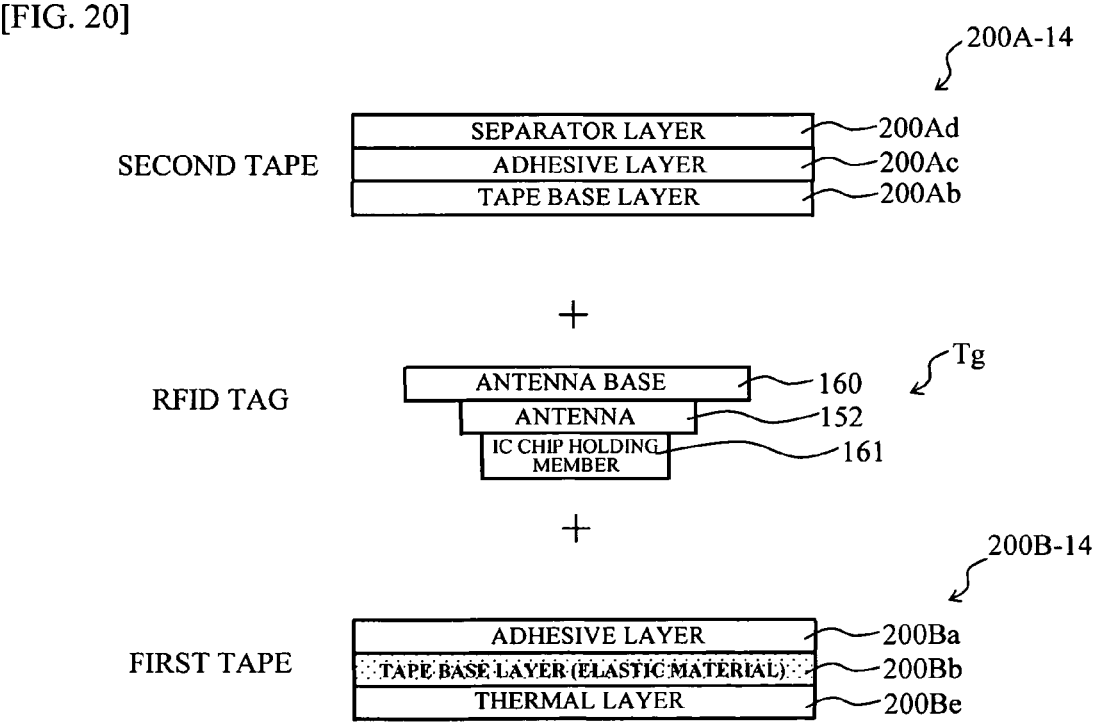

[FIG. 21]
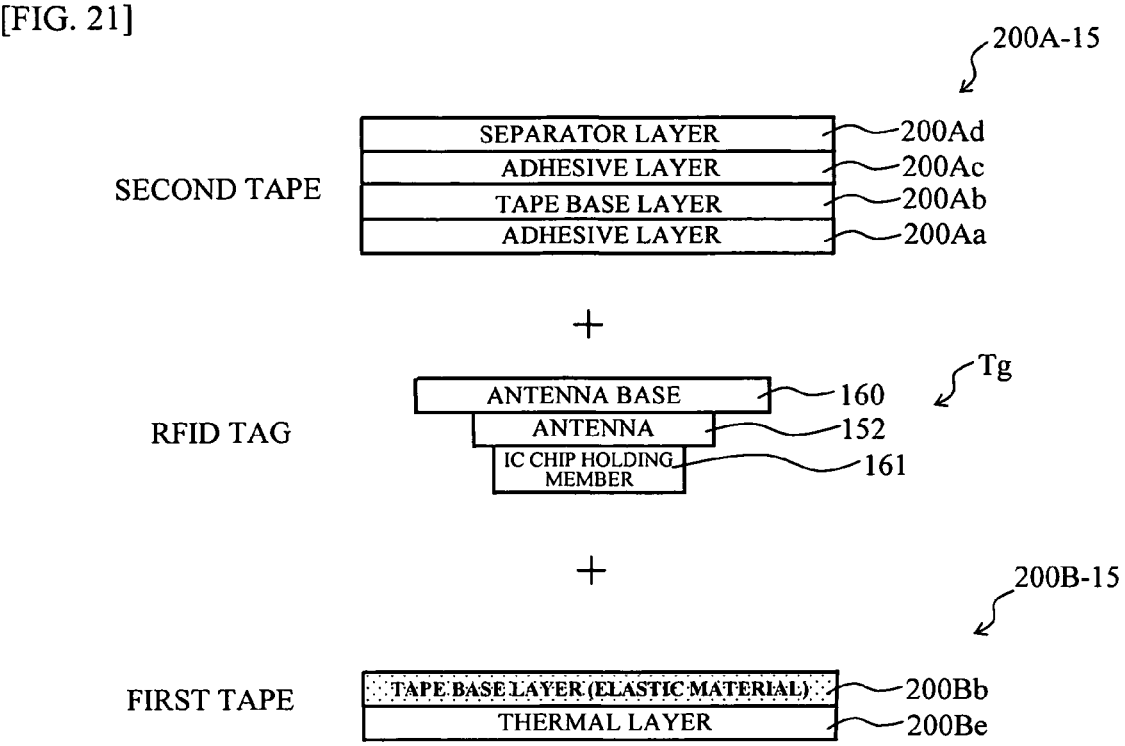

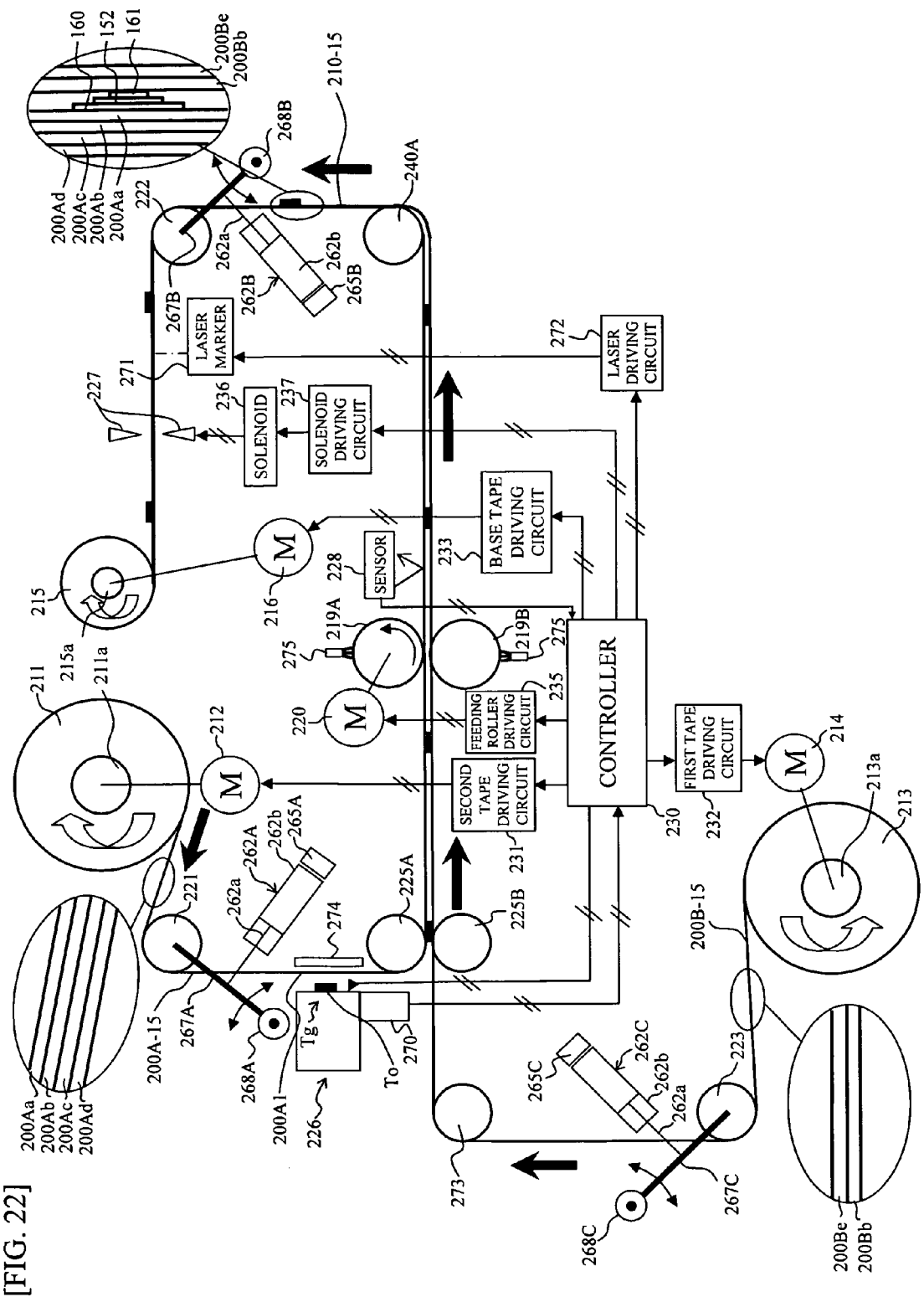
[FIG. 22]

[FIG. 23]
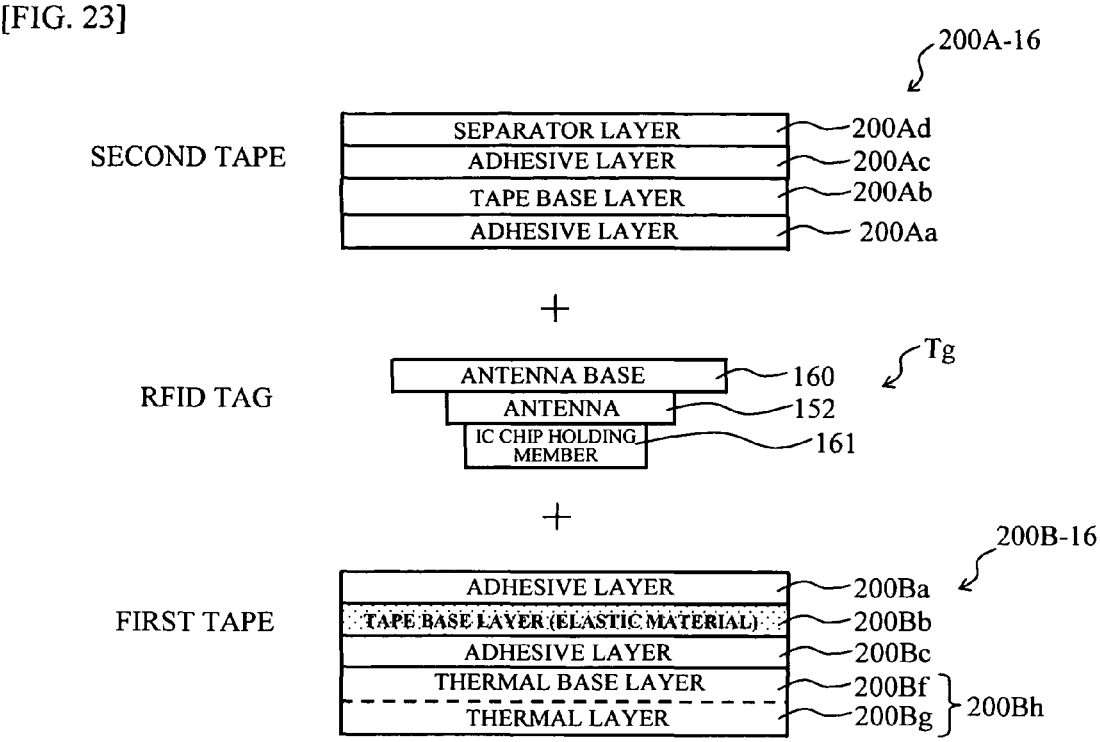
[FIG. 24]
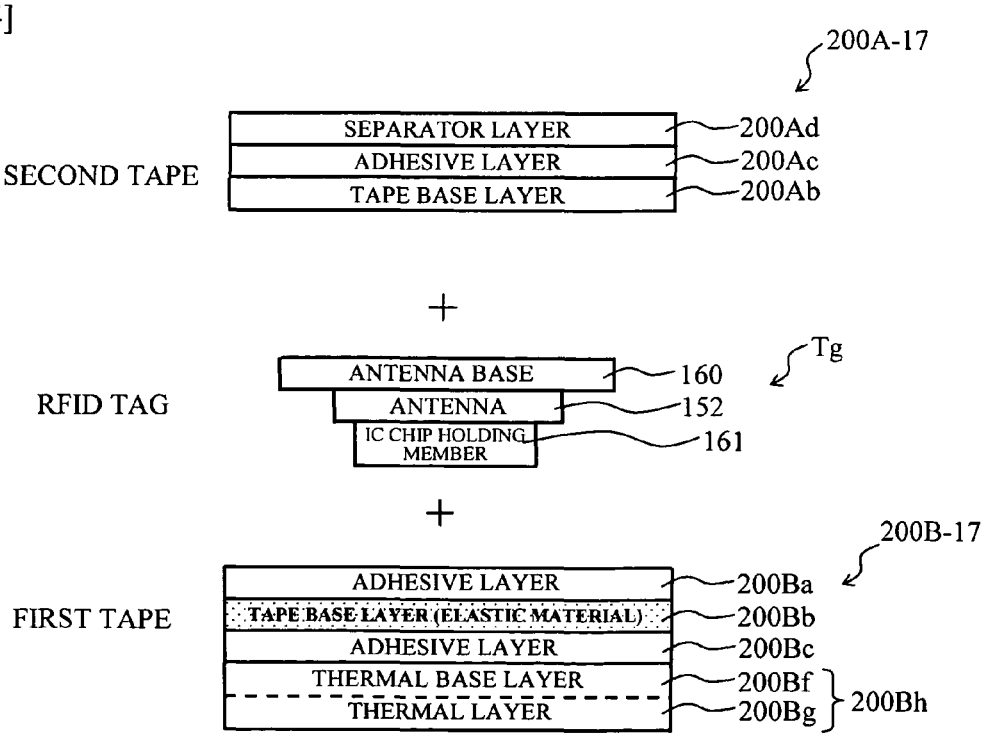

[FIG. 25]
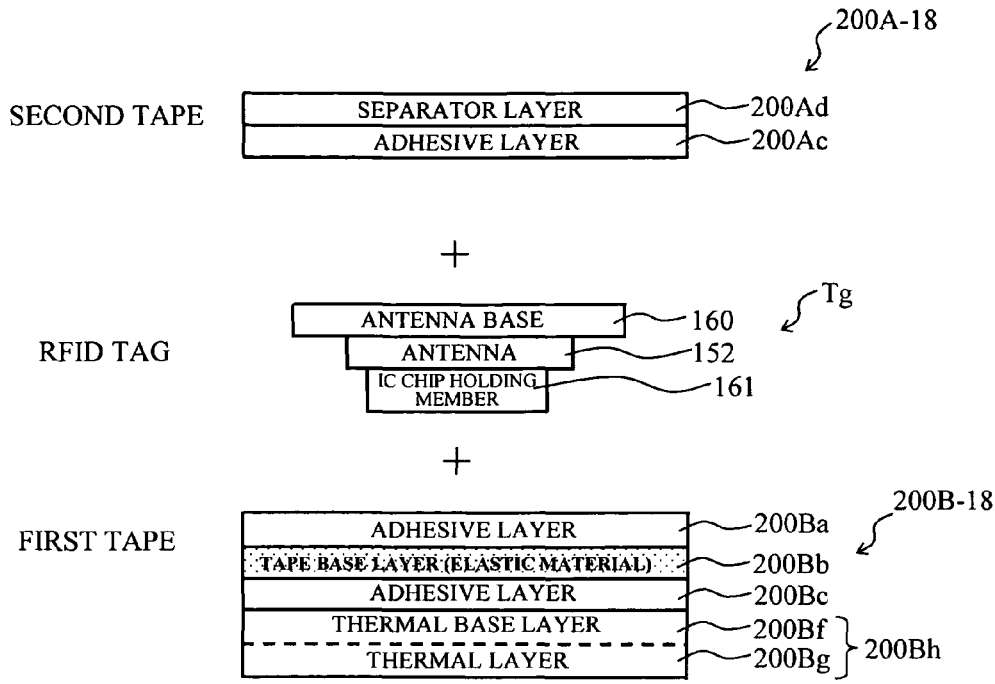
[FIG. 26]
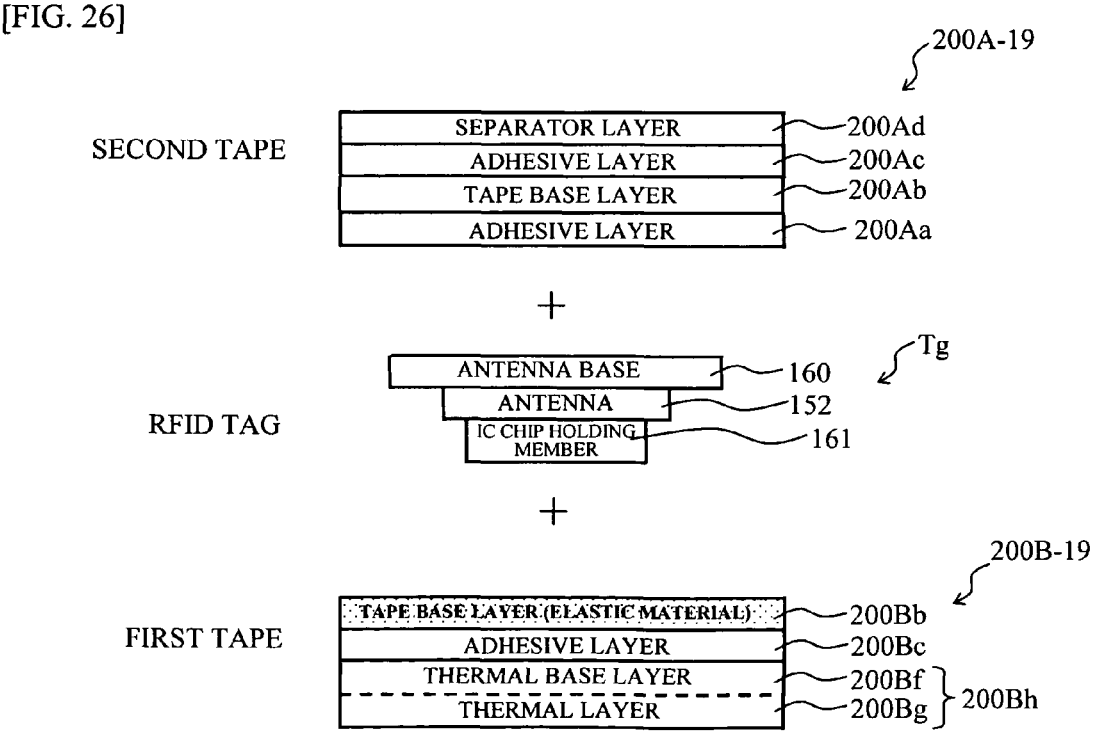

[FIG. 27]
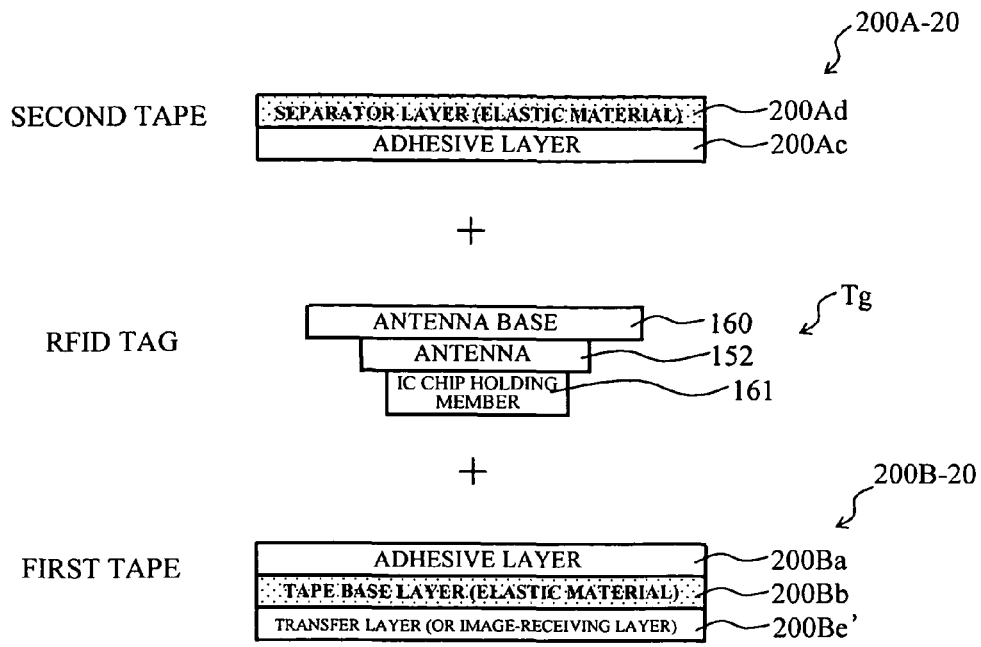
[FIG. 28]
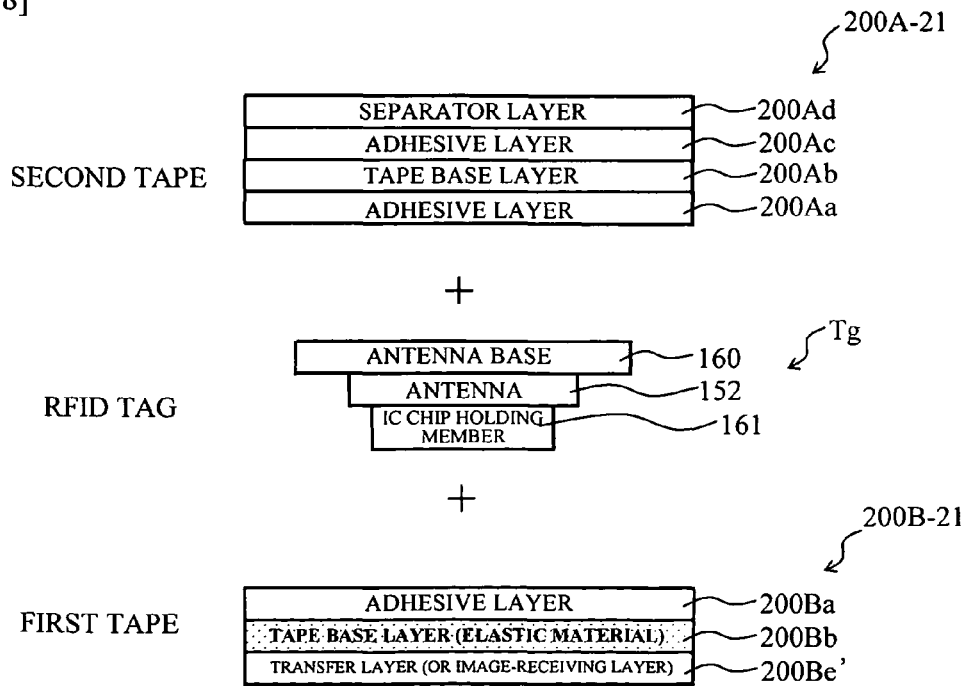

[FIG. 29]
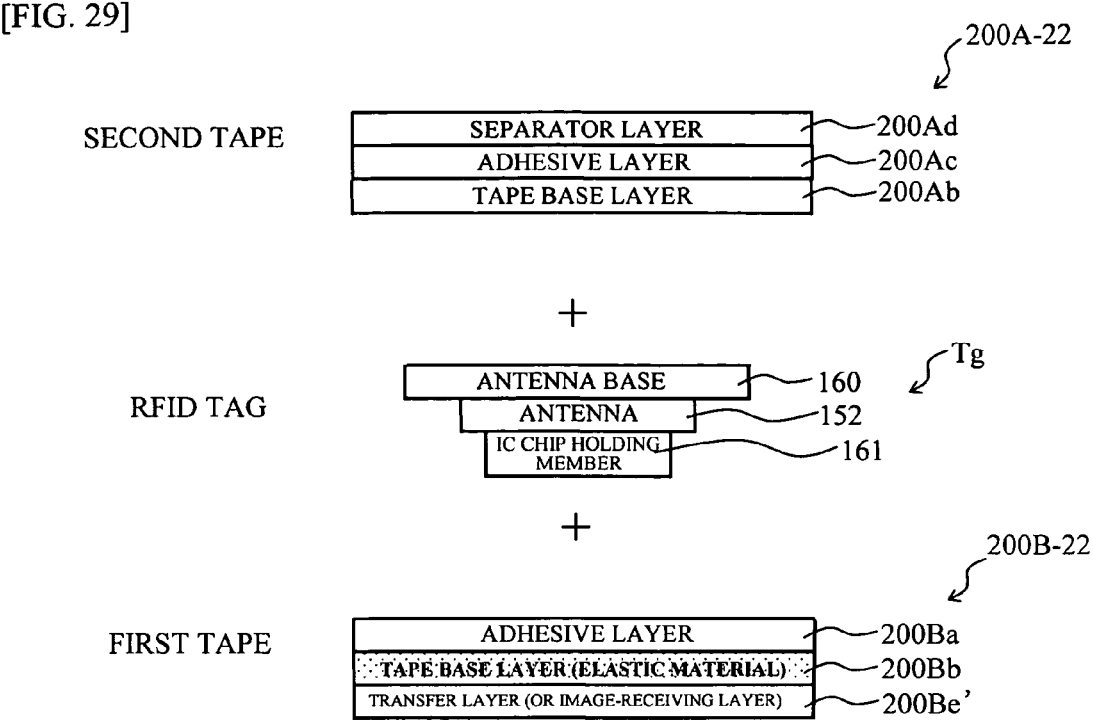
[FIG. 30]
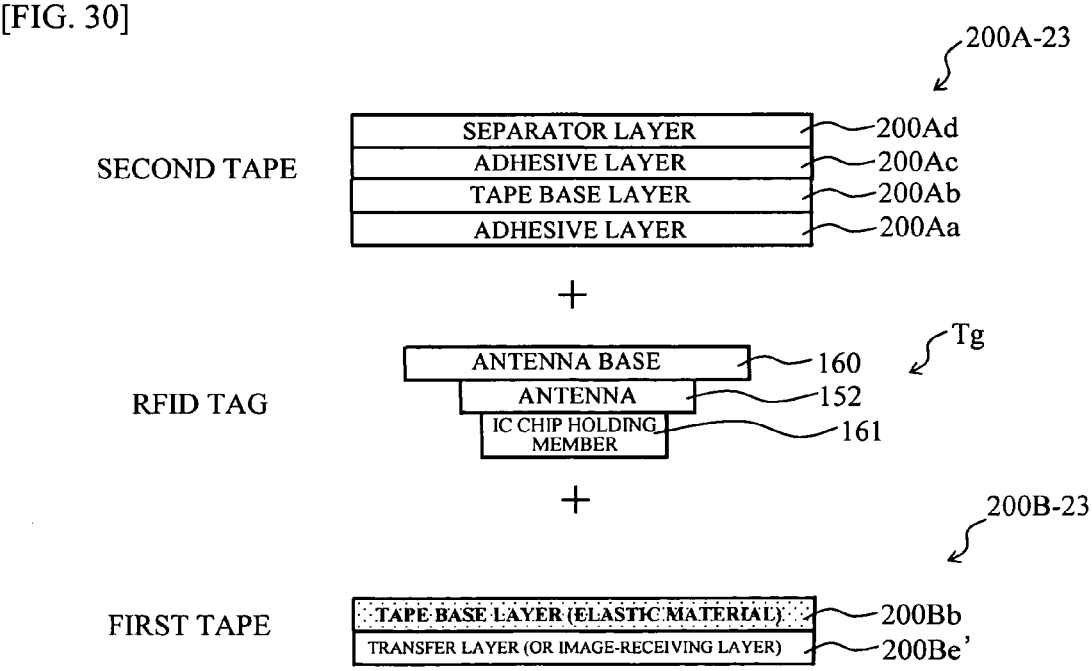

[FIG. 31]
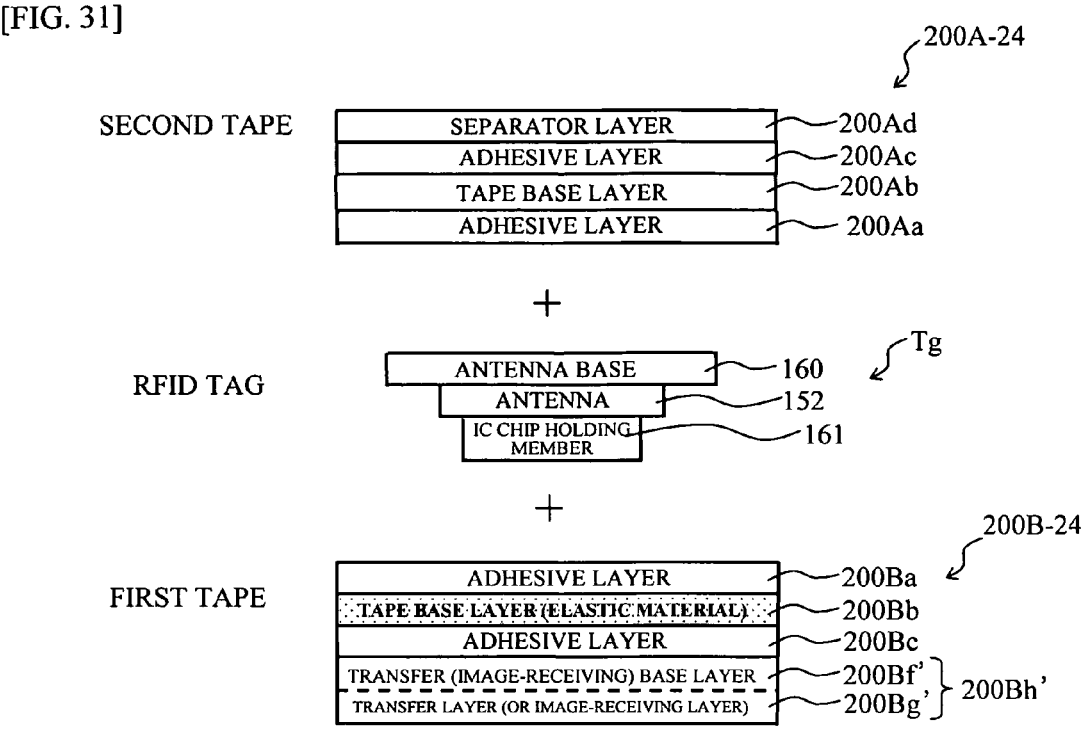
[FIG. 32]
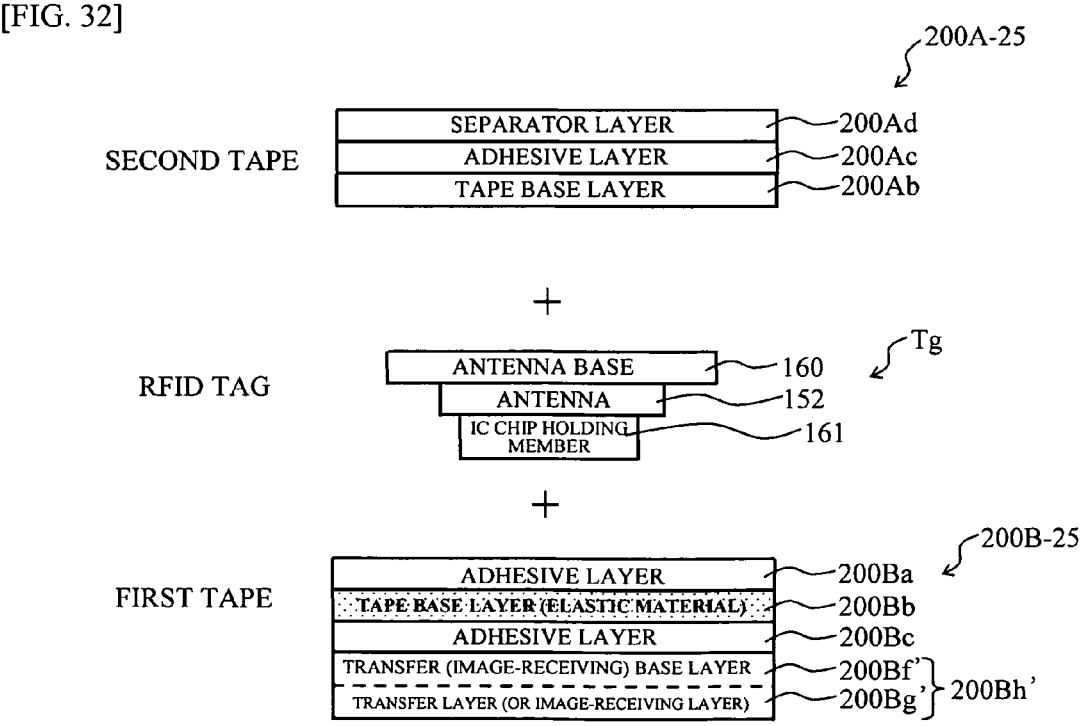

[FIG. 33]
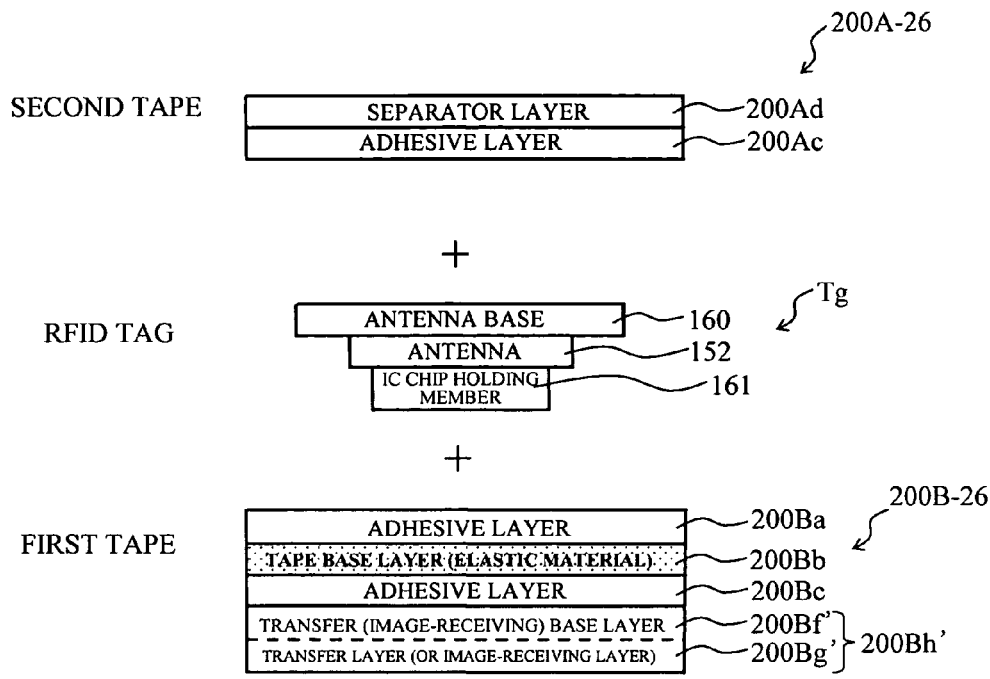
[FIG. 34]
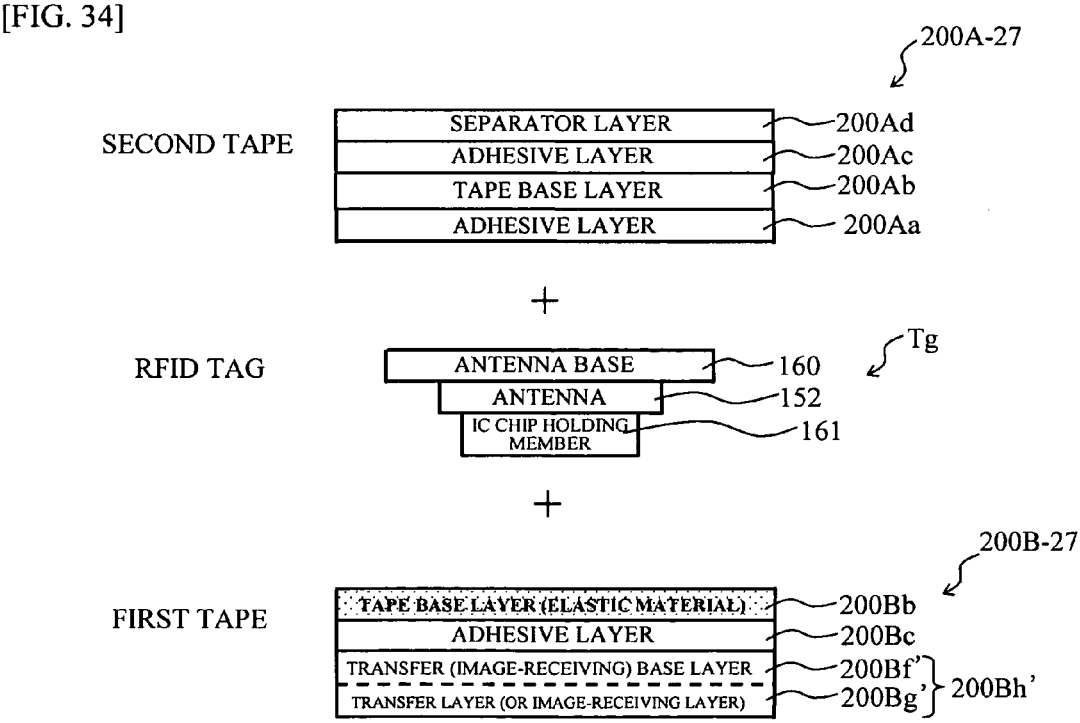

[FIG. 35]
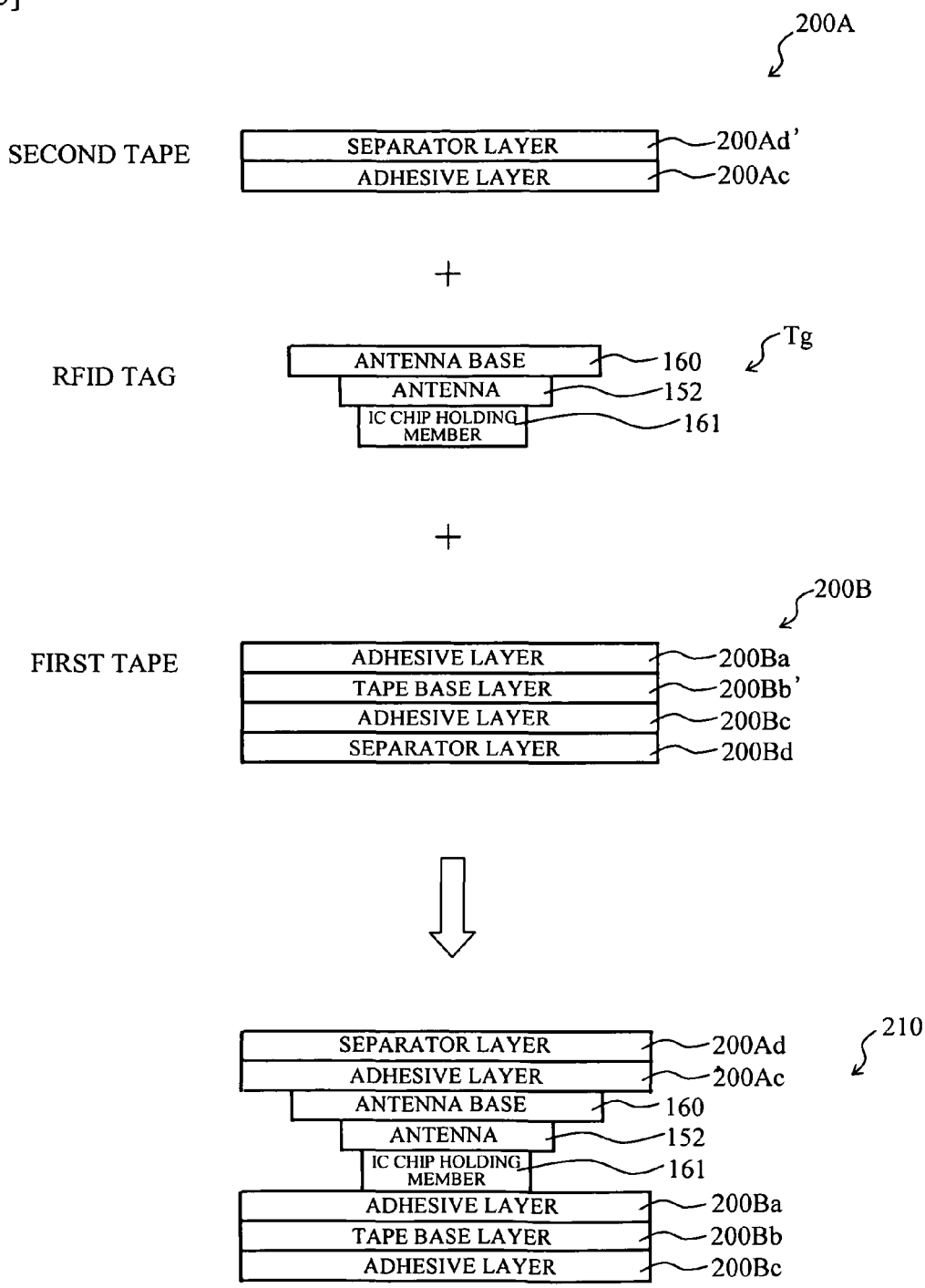

[FIG. 36]
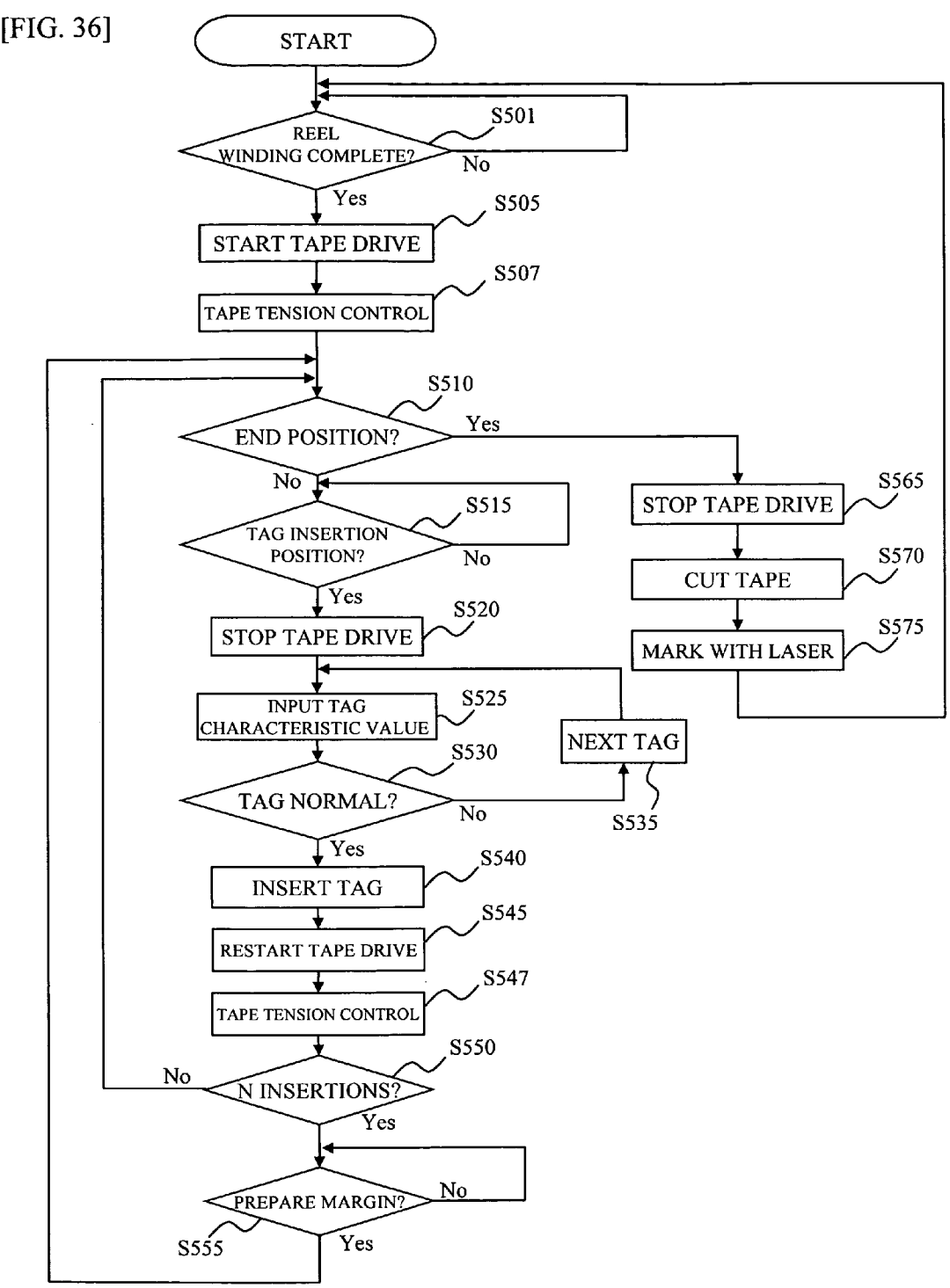

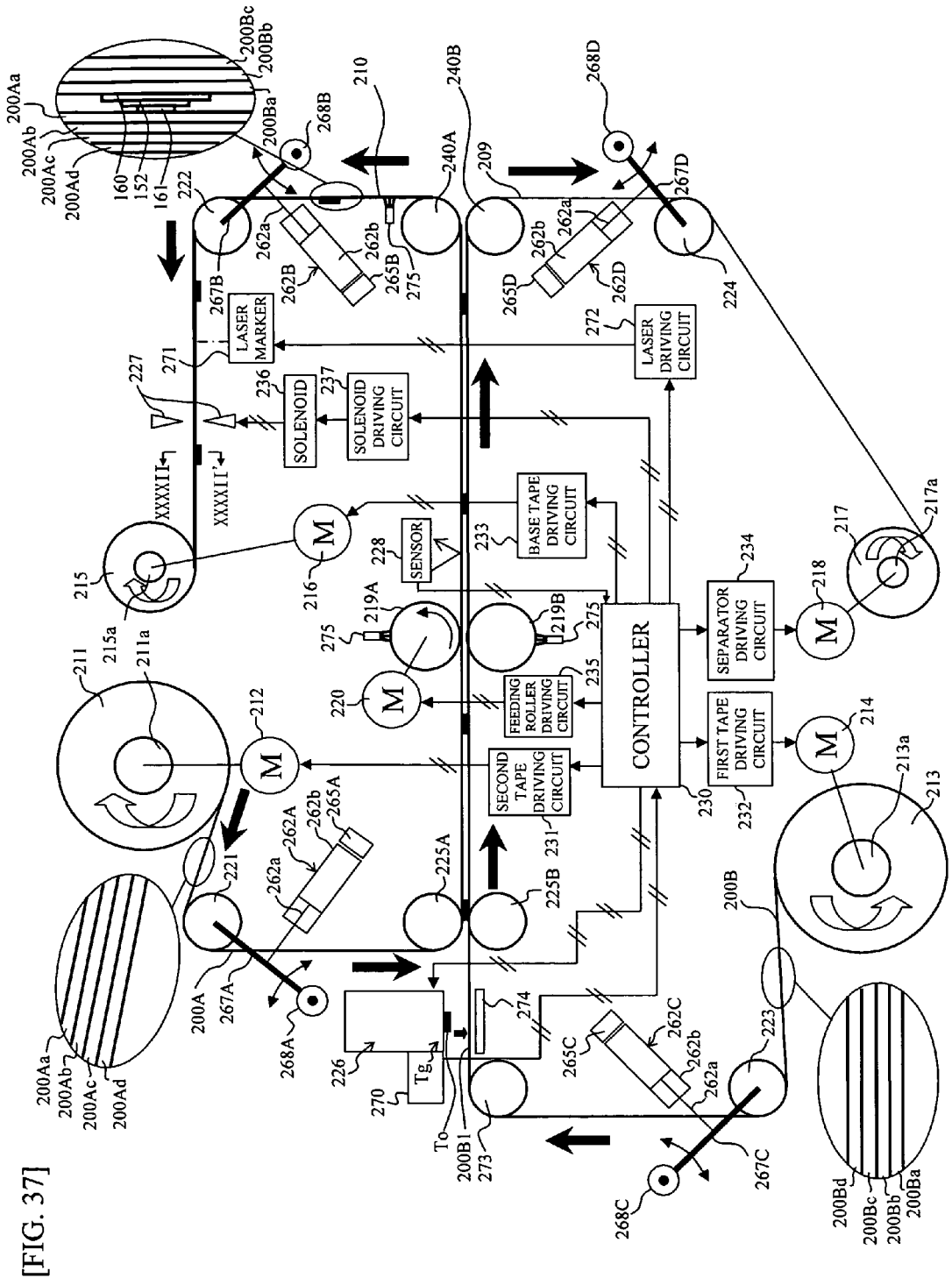
[FIG. 37]

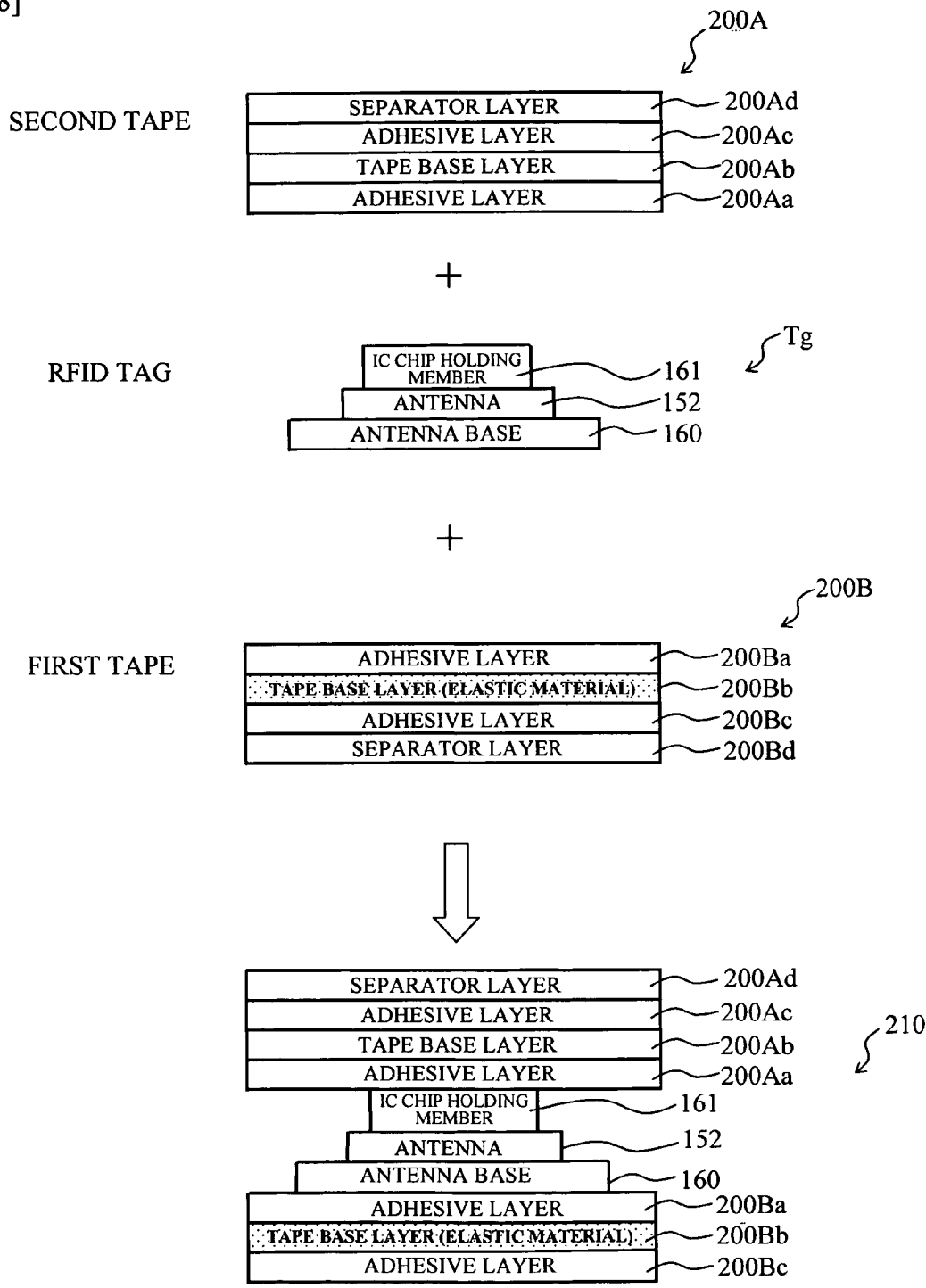

[FIG. 39]
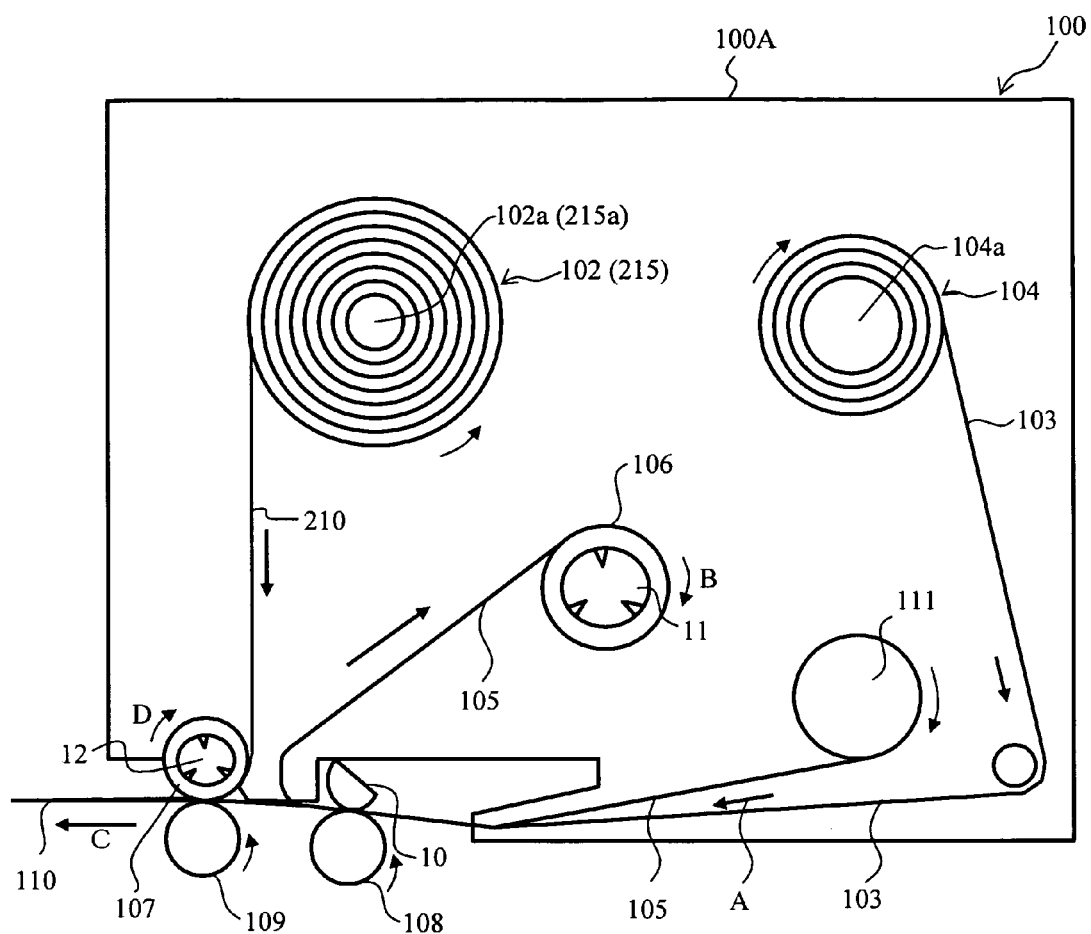

[FIG. 40A]
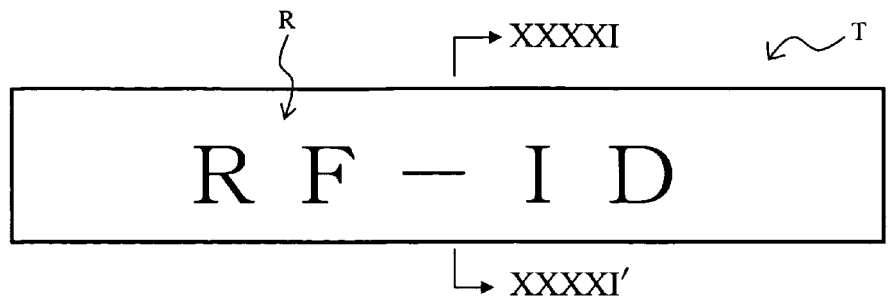
[FIG. 40B]
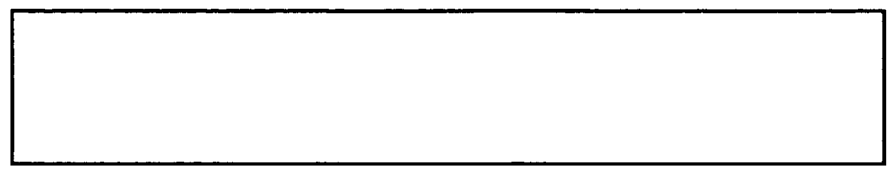
[FIG. 41]
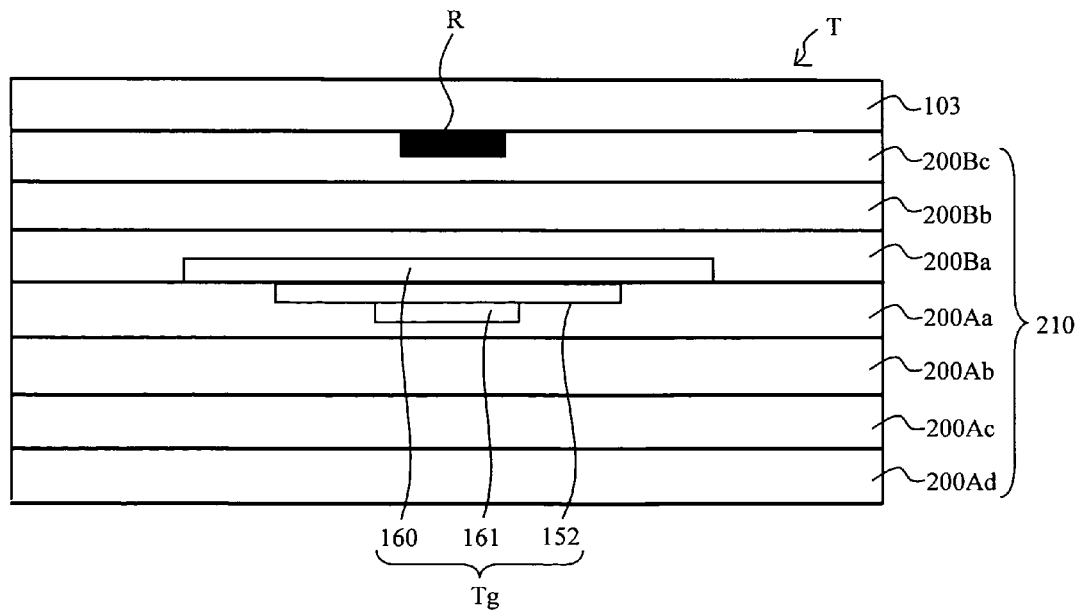

[FIG. 42]
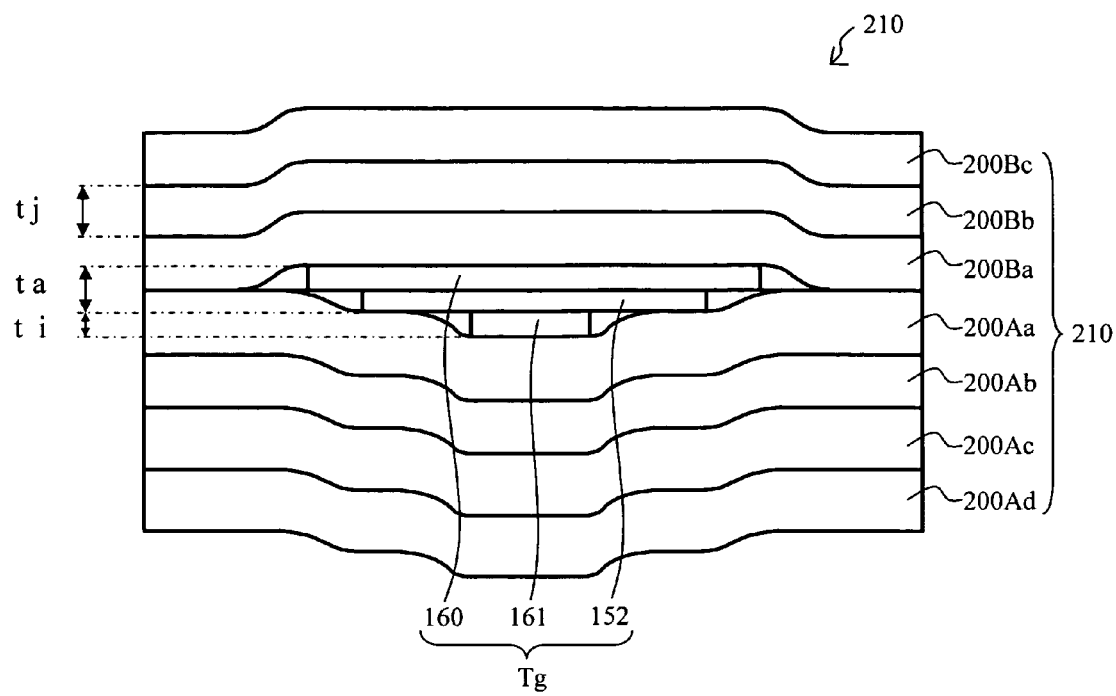
[FIG. 43]
| | CASE 1 | CASE 2 | CASE 3 | CASE 4 |
|---|---|---|---|---|
| ta (μm) | 50 | 60 | 100 | 150 |
| ti (μm) | 220 | 210 | 170 | 150 |
| tj (LOWER LIMIT VALUE) (μm) | 50 | 50 | 60 | 80 |
| $\frac{tj}{ta+ti}$ | 0.19 | 0.19 | 0.22 | 0.27 |
| $\frac{tj}{ta}$ | 1.0 | 0.83 | 0.60 | 0.53 |
| $\frac{ti}{ti}$ | 0.23 | 0.24 | 0.35 | 0.53 |

[FIG. 44]
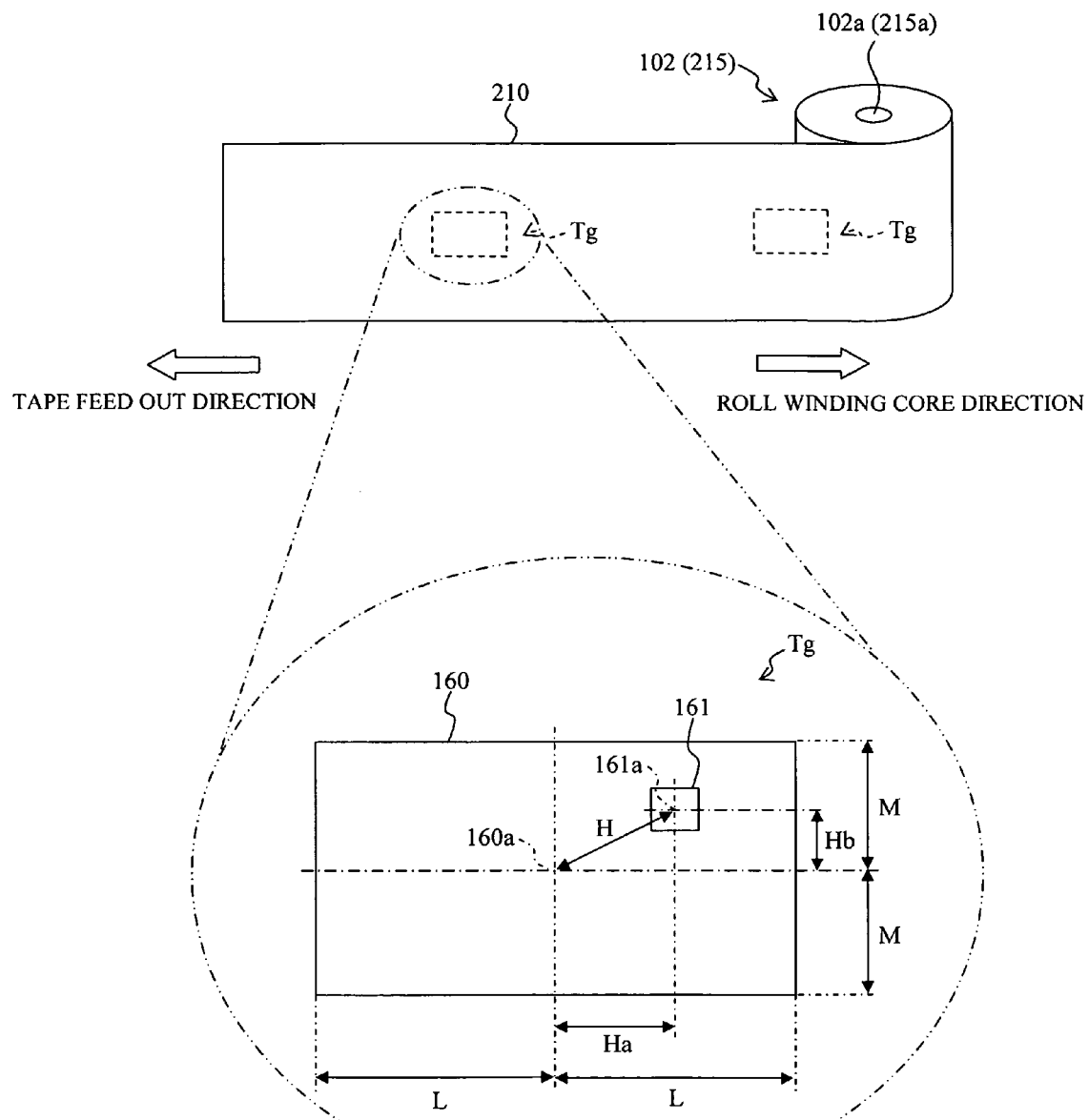

[FIG. 45A]
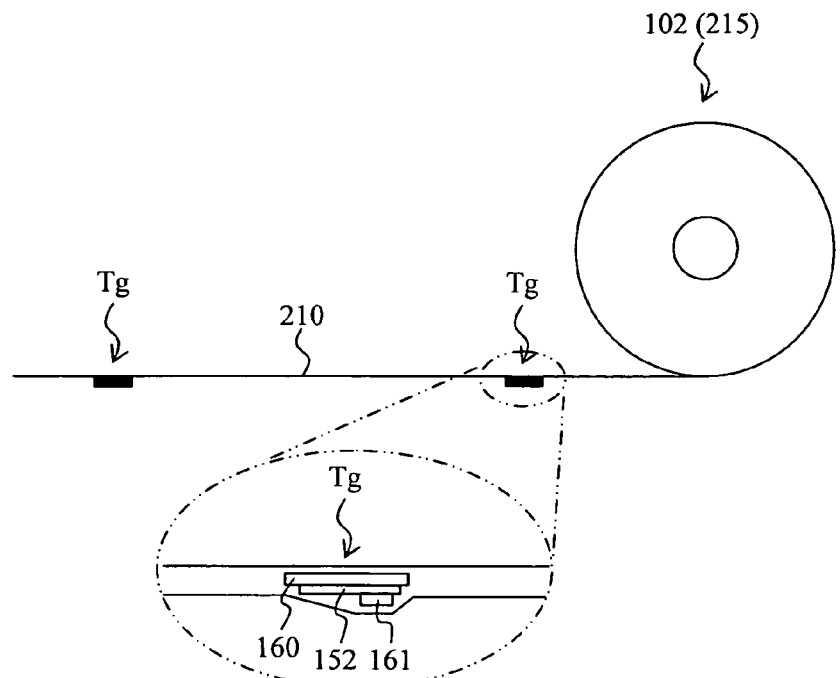
[FIG. 45B]
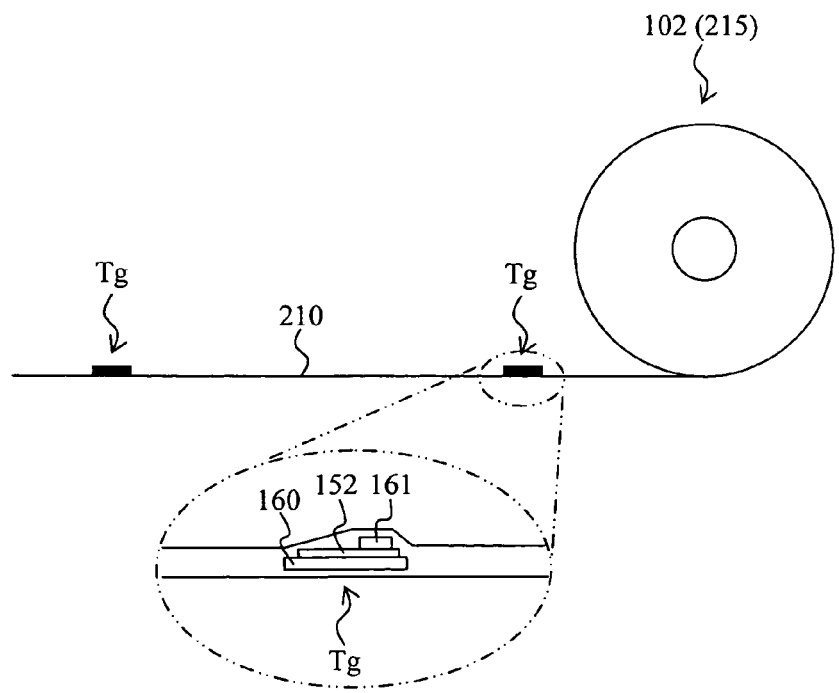

[FIG. 46]

| DIMENSION IN THE TAPE LENGTHWISE DIRECTION | EVALUATION RESULTS |
|---|---|
| $-0.2 \leq Ha/L \leq 0.9$ ($Ha/L \neq 0$) | △ (TOLERANCE RANGE) |
| $0 < Ha/L \leq 0.8$ | ○ (SUITABLE RANGE) |
| $0.2 \leq Ha/L \leq 0.7$ | ◎ (MOST SUITABLE RANGE) |

| DIMENSION IN THE TAPE WIDTH DIRECTION | EVALUATION RESULTS |
|---|---|
| $0 < Hb/M \leq 0.9$ | △ (TOLERANCE RANGE) |
| $0 < Hb/M \leq 0.5$ | ○ (SUITABLE RANGE) |
| $0 < Hb/M \leq 0.3$ | ◎ (MOST SUITABLE RANGE) |

| IC CHIP PROTRUDING DIRECTION | EVALUATION RESULTS |
|---|---|
| OUTER SIDE IN THE ROLL WINDING DIRECTION | ◎ (OPTIMUM) |
| INNER SIDE IN THE ROLL WINDING DIRECTION | ○ (TOLERANCE) |

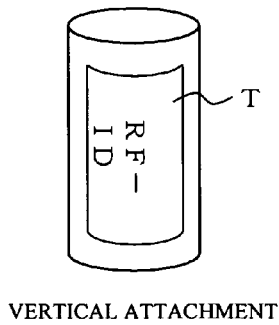
VERTICAL ATTACHMENT

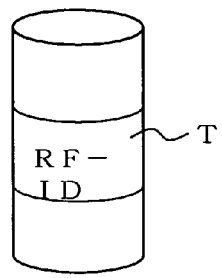
HORIZONTAL ATTACHMENT

[FIG. 48]

| ADHESION AT A SLOW SPEED (N/20mm) | EVALUATION RESULTS | | | |
|---|---|---|---|---|
| | φ25mm | | Φ15mm | |
| | HORIZONTAL ATTACHMENT | VERTICAL ATTACHMENT | HORIZONTAL ATTACHMENT | VERTICAL ATTACHMENT |
| 5.0 | ○ | ○ | ○ | × |
| 6.4 | ○ | ○ | ○ | △ |
| 6.7 | ○ | ○ | ○ | ○ |
| 8.4 | ○ | ○ | ○ | ○ |
| 11.1 | ○ | ○ | ○ | ○ |
| 15.5 | ○ | ○ | ○ | ○ |
| 17.8 | ○ | ○ | ○ | ○ |
| 20.4 | ○ | ○ | ○ | ○ |
| 25.0 | ○ | ○ | ○ | ○ |

○: NO INTERLAYER SEPARATION

△: INTERLAYER SEPARATION LESS THAN 3 MM (WITHIN TOLERANCE RANGE)

×: INTERLAYER SEPARATION 3 MM OR MORE

[FIG. 49A]
| ADHESION AT A SLOW SPEED (N/20mm) | AMOUNT OF SEPARATION (mm) |
|---|---|
| 1.8 | 12 |
| 2.6 | 7 |
| 3.0 | 7.5 |
| 4.0 | 4 |
| 4.3 | 4.2 |
| 4.8 | 2 |
| 4.9 | 2 |
| 5.4 | 0 |
| 6.0 | 0 |
| 6.4 | 0.5 |
| 6.6 | 1 |
| 6.8 | 0.5 |
| 7.1 | 0.5 |
| 8.2 | 0 |
| 8.6 | 0 |
| 10.0 | 0 |
| 12.2 | 0 |
| 13.1 | 0 |
| 15.0 | 0 |
| 17.9 | 0 |
| 21.3 | 0 |
| 25.0 | 0 |
[FIG. 49B]
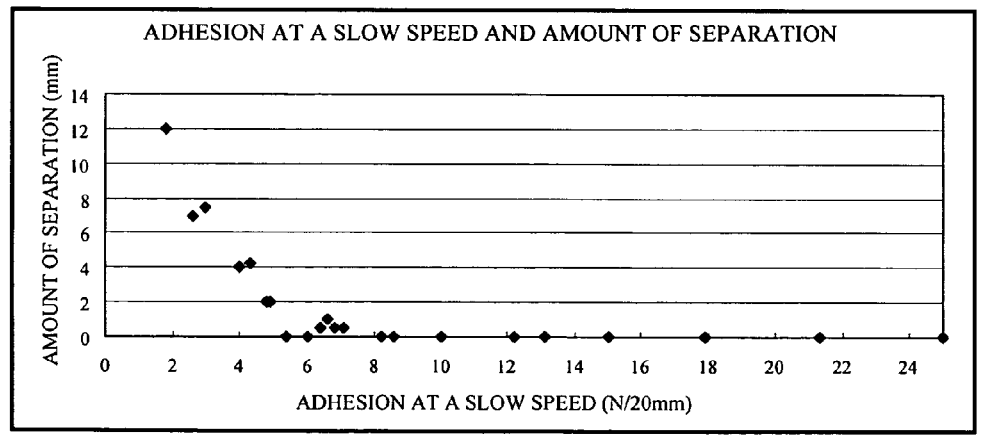

TAG TAPE, TAG TAPE ROLL, AND RFID LABEL

CROSS-REFERENCE TO RELATED APPLICATIONS

This is an application PCT/JP2007/61762, filed Jun. 11, 2007, which was not published under PCT article 21(2) in English and claims the benefits of Japanese Patent application No. 2006-161744 filed Jun. 12, 2006, and No. 2006-353042 filed Dec. 27, 2006.

BACKGROUND

1. Field

The present disclosure relates to a tag tape which has an RFID circuit element for storing information, a tag tape roll of the tag tape wound in the form of a roll, and an RFID label produced using this tag tape and tag tape roll.

2. Description of the Related Art

There are known RFID (radio frequency identification) systems for contactless (electromagnetic coupling method using a coil, electromagnetic induction method, or electromagnetic wave method) transmitting and receiving of information to/from an RFID tag circuit element for storing information.

For example, JP, A, 2004-333651 is known to disclose a tag label producing apparatus for producing such an RFID label for transmitting and receiving information to/from such an RFID circuit element. In this prior art, a tag tape (ribbon-like tape) on which RFID circuit elements (antenna part, IC chip) are disposed at substantially equal spacing in the tape lengthwise direction is wound in the form of a roll around a supply spool. This tag tape is configured by a laminate structure of a plurality of layers which include, sequentially from the outer side in the radius direction of the supply spool, a bonding adhesive layer (second adhesive layer) for bonding the tag tape to a print-receiving tape layer, a tape base layer (substrate), an affixing adhesive layer for affixing the produced RFID label on an object to be affixed, and a separation material layer that is separated when the RFID label is to be affixed, and the RFID circuit element is provided between the tape base layer and the affixing adhesive layer.

A tag label tape with print is produced by supplying the tag tape of this configuration from around the supply spool, and adhering to the print-receiving tape layer (laminate tape) which has been printed as desired through the bonding adhesive layer. Then, RFID labels with print are continuously produced by writing the RFID tag information to the RFID circuit element which has been provided on the tag label tape with print, and cutting the tag label tape with print to a desired length. When using a RFID label which has been produced in this way, the affixing adhesive layer is exposed by peeling off the separation material layer, and the entire label is affixed to the object to be affixed by the adhesion.

There is concern therefore that wrinkles and separation may occur so that the orderliness of the tape, roll, and label cannot be maintained when winding the tag tape of the prior art in the form of a roll, and when affixing the produced RFID label to an object to be affixed which has a curved or irregular surface.

SUMMARY

An object of the present disclosure is to provide a tag tape, tag tape roll, and RFID label capable of maintaining orderliness.

To achieve the above-described object, the tag tape of the first aspect comprises: a substantially sheet-like antenna base on which an RFID circuit element provided with an IC circuit part that stores information and an antenna that transmits and receives information is disposed; a first tape including a substantially tape-like first tag tape base layer that continuously disposes a plurality of the antenna bases in the tape lengthwise direction at predetermined intervals; and a second tape disposed on the opposite side from the first tape so as to have the plurality of antenna bases interposed therebetween in the tape width direction; wherein: at least one of the first tape and the second tape includes an elastic layer formed of an elastic material.

With this arrangement, the difference of the circumferential length can be absorbed by lengthening the part on the outer side in the diameter direction or shortening the part on the inner side in the diameter direction using the elasticity of the elastic material of the elastic layer even when a difference occurs in the circumferential length of the outer side in the diameter direction and the inner side in the diameter direction due to the curvature of the roll when a tag tape with a multi-layer structure is wound as a roll. As a result, the generation of wrinkles due to a difference in circumferential length can be preemptively prevented. According to the first aspect, the orderliness of the tag tape can therefore be maintained when the tag tape is wound in the form of a roll.

To achieve the above-described object, the tag tape roll of the second aspect comprising a tag tape that is wound around an axis substantially perpendicular to the tape lengthwise direction, wherein: the tag tape comprises: a substantially sheet-like antenna base on which an RFID circuit element provided with an IC circuit part that stores information and an antenna that transmits and receives information is disposed; a first tape including a substantially tape-like first tag tape base layer that continuously disposes a plurality of the antenna bases in the tape lengthwise direction at predetermined intervals; and a second tape disposed on the opposite side from the first tape so as to have the plurality of antenna bases interposed therebetween in the tape width direction; wherein: at least one of the first tape and the second tape includes an elastic layer formed of an elastic material.

With this arrangement, the difference of the circumferential length can be absorbed by lengthening the part on the outer side in the diameter direction or shortening the part on the inner side in the diameter direction using the elasticity of the elastic material of the elastic layer even when a difference occurs in the circumferential length of the outer side in the diameter direction and the inner side in the diameter direction due to the curvature of the roll. As a result, the generation of wrinkles due to a difference in circumferential length can be preemptively prevented. According to the second aspect, the orderliness of the tag tape roll can therefore be maintained.

To achieve the above-described object, the RFID label of the third aspect comprising: a substantially sheet-like antenna base on which an RFID circuit element provided with an IC circuit part that stores information and an antenna that transmits and receives information is disposed; a first tape including a substantially tape-like first tag tape base layer that continuously disposes the antenna bases; and a second tape disposed on the opposite side from the first tape so as to have the antenna base interposed therebetween in the tape width direction; wherein: at least one of the first tape and the second tape includes an elastic layer formed of an elastic material.

With this arrangement, the difference in the circumferential length can be absorbed by lengthening the part on the outer side in the diameter direction or shortening the part on the inner side in the diameter direction using the elasticity of the elastic material of the elastic layer even when a difference occurs in the circumferential length between the outer side in the diameter direction of the curvature and the inner side in the diameter direction of the curvature due to the curvature of the irregularity when the RFID label is affixed to a concave shaped part and convex shaped part of the object to be affixed. As a result, the generation of wrinkles due to a difference in circumferential length can be preemptively prevented. According to the third aspect, the orderliness of the tag tape roll can therefore be maintained.

FIG. 1 is a conceptual diagram showing an overall general structure of a tag tape roll manufacturing apparatus according to the first embodiment of the present disclosure;

FIG. 2 is a conceptual side view showing a first tape and a second tape being bonded with an RFID tag interposed therebetween;

FIG. 3 is a flow chart showing the control procedure executed by the controller provided in the tag tape roll manufacturing apparatus of the first embodiment of the present disclosure;

FIG. 4 is a conceptual view showing the condition of a base tape being wound on a reel member;

FIG. 5 is a conceptual side view showing the second tape and first tape being bonded with the RFID tag interposed therebetween in a first modification;

FIG. 6 is a conceptual side view showing the second tape and first tape being bonded with the RFID tag interposed therebetween in a second modification;

FIG. 7 is a conceptual side view showing the second tape and first tape being bonded with the RFID tag interposed therebetween in a third modification;

FIG. 8 is a conceptual side view showing the second tape and first tape being bonded with the RFID tag interposed therebetween in a fourth modification;

FIG. 9 is a conceptual side view showing the second tape and first tape being bonded with the RFID tag interposed therebetween in a fifth modification;

FIG. 10 is a conceptual side view showing the second tape and first tape being bonded with the RFID tag interposed therebetween in a sixth modification;

FIG. 11 is a conceptual side view showing the second tape and first tape being bonded with the RFID tag interposed therebetween in a seventh modification;

FIG. 12 is a conceptual side view showing the second tape and first tape being bonded with the RFID tag interposed therebetween in an eighth modification;

FIG. 13 is a conceptual side view showing the second tape and first tape being bonded with the RFID tag interposed therebetween in a ninth modification;

FIG. 14 is a conceptual view showing the overall general structure of the tag tape roll manufacturing apparatus for manufacturing a base tape roll in which a base tape is wound of the ninth embodiment;

FIG. 15 is a conceptual side view showing the second tape and first tape being bonded with the RFID tag interposed therebetween in a tenth modification;

FIG. 16 is a conceptual side view showing the second tape and first tape being bonded with the RFID tag interposed therebetween in an eleventh modification;

FIG. 17 is a conceptual side view showing the second tape and first tape being bonded with the RFID tag interposed therebetween in a twelfth modification;

FIG. 18 is a conceptual view showing the overall general structure of the tag tape roll manufacturing apparatus for manufacturing a base tape roll in which a base tape is wound of the twelfth embodiment;

FIG. 19 is a conceptual side view showing the second tape and first tape being bonded with the RFID tag interposed therebetween in a thirteenth modification;

FIG. 20 is a conceptual side view showing the second tape and first tape being bonded with the RFID tag interposed therebetween in a fourteenth modification;

FIG. 21 is a conceptual side view showing the second tape and first tape being bonded with the RFID tag interposed therebetween in a fifteenth modification;

FIG. 22 is a conceptual view showing the overall general structure of the tag tape roll manufacturing apparatus for manufacturing a base tape roll in which a base tape is wound of the fifteenth embodiment;

FIG. 23 is a conceptual side view showing the second tape and first tape being bonded with the RFID tag interposed therebetween in a sixteenth modification;

FIG. 24 is a conceptual side view showing the second tape and first tape being bonded with the RFID tag interposed therebetween in a seventeenth modification;

FIG. 25 is a conceptual side view showing the second tape and first tape being bonded with the RFID tag interposed therebetween in an eighteenth modification;

FIG. 26 is a conceptual side view showing the second tape and first tape being bonded with the RFID tag interposed therebetween in a nineteenth modification;

FIG. 27 is a conceptual side view showing the second tape and first tape being bonded with the RFID tag interposed therebetween in a twentieth modification;

FIG. 28 is a conceptual side view showing the second tape and first tape being bonded with the RFID tag interposed therebetween in a twenty-first modification;

FIG. 29 is a conceptual side view showing the second tape and first tape being bonded with the RFID tag interposed therebetween in a twenty-second modification;

FIG. 30 is a conceptual side view showing the second tape and first tape being bonded with the RFID tag interposed therebetween in a twenty-third modification;

FIG. 31 is a conceptual side view showing the second tape and first tape being bonded with the RFID tag interposed therebetween in a twenty-fourth modification;

FIG. 32 is a conceptual side view showing the second tape and first tape being bonded with the RFID tag interposed therebetween in a twenty-fifth modification;

FIG. 33 is a conceptual side view showing the second tape and first tape being bonded with the RFID tag interposed therebetween in a twenty-sixth modification;

FIG. 34 is a conceptual side view showing the second tape and first tape being bonded with the RFID tag interposed therebetween in a twenty-seventh modification;

FIG. 35 is a conceptual side view showing the first tape and second tape being bonded with the RFID tag Tg interposed therebetween in the second embodiment of the present disclosure;

FIG. 36 is a flow chart showing the control procedure executed by the controller of the second embodiment of the present disclosure;

FIG. 37 is a conceptual diagram showing an overall general structure of a tag tape roll manufacturing apparatus according to the third embodiment of the present disclosure;

FIG. 38 is a conceptual side view showing the first tape and second tape being bonded with the RFID tag Tg interposed therebetween in the third embodiment of the present disclosure;

FIG. 39 is an illustration showing an example of the structure of an RFID circuit element cartridge;

FIG. 40 is a top view and bottom view illustrating an example of the outer appearance of an RFID label formed after information has been written to the RFID circuit element and the tag label tape with print has been cut;

FIG. 41 shows the cross section view on the XXXXI-XXXXI' cross section of FIG. 40 rotated 90 degrees in the clockwise direction;

FIG. 42 is a cross sectional view of the base tape on the XXXXII-XXXXII' cross section of FIG. 37;

FIG. 43 is a table showing the lower limit value of the tape base thickness relative to the combinations of each IC chip thickness and antenna thickness extracted from cases in which wrinkles were not generated among a plurality of cases for which evaluation tests were conducted;

FIG. 44 is an illustration showing the positional relationship of the IC chip holding member relative to the antenna base in the RFID tag and the condition of base tape being fed from a first roll in which the base tape is wound in the RFID circuit element cartridge of the fourth embodiment of the present disclosure;

FIG. 45 illustrates the case of an RFID tag disposed so that the IC chip holding member protrudes from the outer side in the roll winding direction of the antenna base, and the case of the RFID tag disposed so that the IC chip holding member protrudes from the inner side in the roll winding direction of the antenna base;

FIG. 46 is a table showing the evaluation test results of the fourth embodiment of the present disclosure;

FIG. 47 illustrates two affixing methods which include the case of affixing the label with the label lengthwise direction substantially parallel to the cylinder axis direction, and the case of affixing the label with the label lengthwise direction facing substantially perpendicular to the cylinder axis direction in the evaluation test of a fifth embodiment of the present disclosure;

FIG. 48 is a table showing the extracted satisfactory results among the evaluation test results of the fifth embodiment of the present disclosure; and FIG. 49 is a table showing the evaluation test results and a graph showing the evaluation test results of a fifth embodiment of the present disclosure.

DETAILED DESCRIPTION OF THE PREFERRED EMBODIMENTS

In the following, some embodiments of the present disclosure will be described with reference to the accompanying drawings. A first embodiment of the present disclosure is first described below.

FIG. 1 is a conceptual diagram briefly showing an overall general structure of a tag tape roll manufacturing apparatus of the present embodiment. In FIG. 1, the tag tape roll manufacturing apparatus produces a base tape 210 by inserting bonding a second tape 200A (structural details are discussed later) and a first tape 200B (structural details are discussed later) and inserting an RFID tag Tg which is provided with an RFID circuit element To inserted between the two tapes, and manufactures a base tape roll 215 by winding the base tape 210.

That is, the tag tape manufacturing apparatus comprises a second tape roll 211 formed by the wound second tape 200A, a second tape shaft driving motor 212 for driving the second tape roll 211, a first tape roll 214 formed by the wound first tape 200B, a second tape shaft driving motor 214 for driving the first tape roll 213, a base tape roll 215 formed by taking up along the outer circumference of the reel member 215a a base tape 210 which includes other layers excluding a separator 209 (details to be described later) in the tape formed by the bonded second tape 200A and the first tape 200B fed from the second and first tape rolls 213 and 211, a base tape shaft driving motor 216 for driving the reel member 215a, a separator roll 217 for taking up along the outer circumference of a reel member 217a the separator 209, a separator shaft driving motor 218 for driving the reel member 217a, and feeding roller 219A (drive side) and feeding roller 219B (driven side) for imparting a driving force to the tapes 200B and 200A to feed the first and second tapes 200B and 200A from the first and second tape rolls 211 and 213 and which are provided between first and second tape rolls 211 and 213 and the base tape 215 and the separator roll 217 along the tape feeding path of the tapes 200B and 200A, and a feeding roller shaft driving motor 220 for driving the drive side transport roller 219A.

The tag tape roll manufacturing apparatus also comprises a first dancer roller 221 provided between the second tape roll 211 and the feeding rollers 219A and 219B along the tape feeding path of the second tape 200A so as to be capable of advancing and retracting in an intersecting direction that intersects (perpendicular in the present example) the tape feeding direction of the second tape 200A to be fed, a second dancer roller 222 provided between the feeding rollers 219A and 219B and the base tape roll 215 along the tape feeding path of the base tape 210 which is produced based on the second tape 200A so as to be capable of advancing and retracting in an intersecting direction that intersects (perpendicular in the present example) the tape feeding direction of the base tape 210, a third dancer roller 223 provided between the first tape roll 213 and the feeding rollers 219A and 219B along the tape feeding path of the first tape 200B so as to be capable of advancing and retracting in an intersecting direction that intersects (perpendicular in the present example) the tape feeding direction of the first tape 200B to be fed, a fourth dancer roller 224 provided between the feeding rollers 219A and 219B and the separator roll 217 along the tape feeding path of the separator 209 which is produced based on the first tape 200B so as to be capable of advancing and retracting in an intersecting direction that intersects (perpendicular in the present example) the tape feeding direction of the separator 209, air cylinders 262A, 262B, 262C, and 262D which respectively advance and retract the first through fourth dancer rollers 221 through 224 in an intersecting direction (a direction perpendicular to the tape feeding direction in the present example), and bonding rollers 225A and 225B for pressing and bonding the second tape 200A fed from the second tape roll 211 and the first tape 200B fed from the first tape roll 213.

The tag tape roll manufacturing apparatus also comprises a tag inserter 226 for attaching at predetermined intervals the RFID tag Tg which includes the RFID circuit element To provided with the IC circuit part 151 (not shown in the drawing) for storing information and a tag side antenna 152 (antenna) connected to the IC circuit part 151 for transmitting and receiving information disposed between the second tape 200A and the first tape 200B to be bonded by the bonding rollers 225A and 225B, a tag checker 270 for acquiring the tag characteristic values of the RFID circuit element To to determine whether or not the RFID circuit element To of the RFID tag Tg to be attached by the tag inserter 226 is normal, a tape supporting member 274 for supporting in a level state the attaching part 200B1 of the first tape 200B to which the RFID tag Tg is to be attached by the tag inserter 226, a cutter 227 for cutting the base tape 210 at a predetermined length, a controller 230, a photosensor 228 for inputting a corresponding detection signal to the controller 230 and disposed so as to face the feeding path (horizontal direction in FIG. 1) on the downstream side in the tape feeding direction of the feeding rollers 219A and 219B (so as to face the top side surface of the tape in the drawing in this example), a laser marker 271 for providing an end mark that is not shown in the drawing on the base tape 210 via a laser and disposed so as to face the feeding direction (horizontal direction in FIG. 1) on the upstream side in the transport direction of the base tape 210 of the corresponding cutter 227, and a plurality of discharging brushes 275 for removing the static electricity generated on the base tape 210 from which the separator 209 has been peeled and the feeding rollers 219A and 219B and disposed in the vicinity of the feeding rollers 219A, 219B and the roller 240A (described later).

The tag tape roll manufacturing apparatus also has a second tape driving circuit 231 for controllably driving the previously mentioned second tape shaft driving motor 212, a first tape driving circuit 232 for controllably driving the previously mentioned first tape shaft driving motor 214, a base tape driving circuit 233 for controllably driving the previously mentioned base tape shaft driving motor 216, a separator driving circuit 234 for controllably driving the previously mentioned separator shaft driving motor 218, a feeding roller driving circuit 235 for controllably driving the previously mentioned feeding roller shaft driving motor 220, a solenoid 236 for driving and stopping the operation of the cutter 227, a solenoid driving circuit 237 for controlling the solenoid 236, a laser driving circuit 272 for controlling the laser output of the laser marker 271, electropneumatic regulators 265A, 265B, 265C, and 265D which function as electric-air conversion means for respectively supplying a gas from a gas source not shown in the drawing as an operating gas that is pressurized according to an electrical signal to the air cylinders 262A, 262B, 262C, and 262D and which are provided with operating valves (not shown in the drawing) that control the degree of opening in accordance with an electrical signal input from the controller 230, a regulator driving circuit which is not shown in the drawing for respectively controlling the operating valves of the electropneumatic regulators 265A, 265B, 265C, 265D, tension arms 267A, 267B, 267C, and 267D which are rotatable around a rotational fulcrum point by the air cylinders 262A, 262B, 262C, 262D and are rotatably supported at the leading end of the dancer rollers 221, 222, 223, and 224, and angle sensors 268A, 268B, 268C, and 268D for respectively detecting the tension of the corresponding tapes 200A, 210, 200B, and 209 by detecting the angle of the tension arms 267A, 267B, 267C, 267C and which are provided in the vicinity of the rotational fulcrum point in this example.

The second tape roll 211 is formed by winding the second tape 200A around a reel member 211a which is driven by the second tape shaft driving motor 212. Similarly, the first tape roll 213 is formed by winding the first tape 200B around a reel member 213a which is driven by the first tape shaft driving motor 213. Furthermore, the base tape roll 215 is formed by winding the base tape 210 around a reel member 215a by driving the reel member 215a via the base tape shaft driving motor 216. Similarly, the separator roll 217 is formed by winding the separator 209 around a reel member 217 by driving the reel member 217 via the separator shaft driving motor 218.

The second tape 200A has a two-layer structure in this example as shown in the enlargement of FIG. 1, and is configured by sequentially laminating from the winding side on the inner side of the second tape roll 211 (top side in the enlargement) toward the opposite side (bottom side in the enlargement) an adhesive layer 200Ac formed of suitable adhesive, and a separator layer 200Ad formed of an elastic material (details to follow). Note that the separator layer 200Ad is separated when the RFID label T is affixed as a completed label-shaped product to a predetermined article or the like, thereby being able to bond to the article or the like by the adhesive layer 200Ac.

The first tape 200B has a four-layer structure in this example as shown in the enlargement of FIG. 1, and is configured by sequentially laminating from the winding side on the inner side (bottom side in the enlargement) toward the opposite side (top side in the enlargement) an adhesive layer 200Ba formed of suitable adhesive, a tape base layer 200Bb formed of elastic material (details to follow), an adhesive layer 200Bc formed of suitable adhesive, and a separator layer 200Bd. Further, the separator layer 200Bd is ultimately wound on the reel member 217a and collected as the separator roll 217.

The air cylinders 262A-D are respectively provided with a piston 262a and cylinder body 262b, so as to change the position of the dancer rollers 221, 222, 223, 224 to control the tension of the tapes 200A. 210, 200B, and 209 by rotating around the rotational fulcrum points of the tension arms 267A-D in linkage with the piston 262a by advancing and retracting the piston 262a contained in the cylinder 262b via the operation gas respectively supplied from the electropneumatic regulators 262A-D.

Note that a direct drive using the electromagnetic power of a solenoid, an electric motor (including various types of motor such as a linear motor or a pulse motor), or the like may be used in lieu of the air cylinder 262 as a driving actuator.

The controller 230 is a so-called microcomputer; while a detailed description thereof will be omitted, the controller 230 comprises a CPU which is a central processing unit, ROM, RAM, and the like, and performs signal processing according to a program previously stored in the ROM using the temporary storage function provided by the RAM.

In this configuration, mainly the second tape 200A is fed out from the second tape roll 211 and supplied through the dancer roller 221 to the bonding rollers 225A and 225B via the transport driving force of the feeding rollers 219A and 219B. Similarly, the first tape 200B which is fed out from the first tape roll 213 is also supplied through the dancer roller 223 and roller 273 to the bonding rollers 225A and 225B. Then, the second tape 200A and the first tape 200B are positioned upstream in the tape feeding direction of the bonding position to be bonded by the bonding rollers 225A and 225B, the RFID tags Tg are sequentially attached to the first tape 200B by the tag inserter 226 at the first tape attaching part 200B1 supported in a flat condition by the tape supporting member 274. Thereafter, the first tape 200B with the attached RFID tag Tg and the second tape 200A are bonded by the bonding rollers 225A and 225B. Note that the tag attachment is performed by so-called intermittent transport drive method by stopping the feed drive of the second tape 200A and first tape 200B at a predetermined insertion location (for example, equal interval disposition) (that is, positioning at this time is controlled according to the detection signals of the sensor 228; details to follow).

The tape which has the inserted tag to be bonded is disposed at the rollers 240A and 240B which are positioned on the downstream side of the feed rollers 219A and 219B, and the separator 209 formed of the separator layer 200B provided on the first tape 200B is separated from the base tape 210 which forms the remaining part thereof. The base tape 210 is reeled out by the reel member 215a and cut by the cutter 227 once it has reached a predetermined length. At this time, an end mark is provided to the base tape 210 by the laser marker 271 upstream of the cutting position by the cutter 227 in the tape feeding direction. At the same time, the separator 209 is reeled in and collected by the reel member 217a. As a result, the base tape 210, which has been formed with a plurality of RFID circuit elements To sequentially disposed at predetermined regular intervals in the lengthwise direction, is wound on the reel member 215a to manufacture the base tape roll 215.

As described above, FIG. 2 is a conceptual side view showing bonding condition of the first tape 200B and the second tape 200A mediated by the RFID tag Tg. In FIG. 2, the RFID tag Tg is configured by a substantially sheet-like antenna base (antenna pattern sheet) 160, and an IC chip holding member 161 which is disposed on the back side (bottom side in FIG. 2) of the antenna base 160 and is provided with a tag side antenna 152 for transmitting and receiving information, and an IC circuit part 151 (not shown in the drawing) for storing updatable (rewritable) information so as to connect to the tag side antenna 152. Note, the RFID circuit element To is configured by the tag side antenna 152 and the IC circuit part 151.

The base tape 210 has an eight-layer structure in this example (refer again to the bottom part of the drawing or refer to the enlargement in FIG. 1) configured by reeling out and removing the separator layer 200B from the reel member 217a as described above after the RFID tag Tg has been inserted and disposed between the second tape 200A which has a two-layer structure and the first tape 200B which has a four-layer structure. That is, the base tape 210 is configured by laminating sequentially from the side wound on the outer side (top side in FIG. 2) of the reel member 215a toward the opposite side (bottom side in FIG. 2) a separator layer 200Ad formed of the elastic material, adhesive layer 200Ac, antenna base 160, tag side antenna 152, IC chip holding member 161, adhesive layer 200Ba, tape base layer 200Bb formed of elastic material, and adhesive layer 200Bc.

Furthermore, although the configuration in FIGS. 1 and 2 has the RFID tag Tg interposed between the adhesive layer 200Ac of the second tape 200A and the adhesive layer 200Ba of the first tape 200B, a seven-layer configuration may also use only one adhesive layer and omit the other. Moreover, the elastic material is not required on both the separator layer 200Ad and the tape base layer 200Ab since either one elastic material will suffice.

FIG. 3 is a flow chart showing a control procedure executed by the controller 230.

In FIG. 3, a judgment is first made as to whether or not the operation of winding the base tape 210 on the reel member 215a has been completed in step S501. This judgment is made, for example, by judging whether or not an operator who has completed the action of winding has input an operation signal to the effect that the winding action is complete via an operation means or the like not shown in the drawing. The judgment is met if the winding action is complete, and the process moves to the next step, step S505.

In step S505 tape drive is initiated according to an operation signal to the effect of initiating production of base tape, input via an operation means, or the like not shown in the drawing. That is, the second tape 200A and the first tape 200B are drivably fed out from the second tape roll 211 and the first tape roll 213 by the driving force of the feeding roller shaft driving motor 220 when a control signal is output to the feeding roller driving circuit 235. Note that at this time, a control signal is also output to the second and first tape driving circuits 231 and 232, base tape driving circuit 233, and separator driving circuit 234, collectively, to drive the second and first tape shaft driving motors 212 and 214, base tape shaft driving motor 216, and separator shaft driving motor 218. With this arrangement, the second tape 200A is fed out from the second tape roll 211 and the first tape 200B is fed out from the first tape roll 213 and bonded together as a single unit by the bonding rollers 225A and 225B, and fed to the feeding rollers 219A and 19B side.

Note, however, that although not particularly disclosed in this flow, when starting the tape drive in step S505 the tension of each tape 200A, 200B, 209, and 210 is tension-controlled to a suitable value (hereinafter referred to as "tape tension control during driving") at the tape feeding time calculated from the angle of the tension arms 267A-D detected by the angle sensors 268A-D by rotating the tension arms 267A-D of the air cylinders 262A-D together with controlling the motor speed of the second and first tape shaft driving motors 212 and 214, base tape shaft driving motor 216, and separator shaft driving motor 218. Note that the tape tension control during driving is always performed when driving tapes.

Subsequently, in step S510 a judgment is made as to whether or not the base tape 210 which is reeling out from the reel member 215a has reached a predetermined winding end position. Specifically, judgment is made as to whether or not the number of RFID tags Tg attached to the base tape 210 has reached a predetermined number. For example, a judgment is made as to whether or not 40 RFID tags Tg have been attached. Since this judgment is not ordinarily satisfied immediately after initiating winding, the process moves to the next step, step S515.

In step S515 a judgment is made as to whether or not the tape being fed as described above has reached a predetermined position at which the RFID tag Tg is to be inserted. This judgment may be made, for example, based on detection results by the photosensor 228 of marks not shown in the drawings provided at a regular pitch to predetermined locations on the surface of the separator layer 200Ad of the first tape 200A as described above. When the judgment has been satisfied, the process moves to step S520.

In step S520 a control signal is again output to the feeding roller shaft driving circuit 235 to stop the drive of the feeding roller shaft driving motor 220, and stop the drive for feeding the second tape 200A and the first tape 200B from the second tape roll 211 and the first tape roll 213. Note that at this time the drive of second and first tape shaft driving motors 212 and 214, base tape shaft driving motor 216, and separator shaft driving motor 218 is automatically stopped by the tape tension control during driving.

Note, however, that although not particularly disclosed in this flow, when the tape drive is stopped in step S520 the tension is controlled so that the sum of the tension of the second tape 200A and the first tape 200B on the supply side and the sum of the tension of the base tape 210 and separator 209 are substantially equal (hereinafter referred to as "tape tension control during stop") to avoid positional dislocation of the tape from occurring when the tape drive is stopped as described.

Subsequently, in step S525 the tag checker 270 obtains the tag characteristic values (tag sensitivity information and the like) of the RFID circuit element To provided in the RFID tag Tg attached by the tag inserter 226.

In the next step, step S530, a judgment is made as to whether or not the tag characteristic values input in step S525 are within a predetermined suitable range. When the characteristic values are not within a predetermined suitable range, the judgment is unsatisfied and the process moves to step S535, a control signal is output to the tag inserter 226 and attaching preparation is performed for the next RFID tag Tg after the RFID tag Tg provided with the RFID circuit element To that was judged unsuitable. Then, the flow proceeds to the next step S525. Note, that the RFID tag Tg which was judged unsuitable is, for example, automatically (or via an operation by the operator) ejected out of the tag inserter 226 so as to not be attached to the first tape 200B. On the other hand, if the tag characteristic values are within the predetermined appropriate range, the judgment is satisfied, and the process moves to the next step, step S540.

In step S540, while the tape drive is stopped at the tag insertion position as described above, a control signal is output to the tag inserter 226 and an RFID tag Tg which is provided with an RFID circuit element To that includes the IC circuit part 151 and the tag side antenna 152 is attached to the attaching part 200B1 of the first tape 200B. At this point it is also possible for a display to be performed for an operator to confirm whether or not to insert the RFID tag Tg instead of automatically inserting the tag if the tag is appropriate as described above, and then insert the RFID tag Tg only if an appropriate instruction is input by the operator. Thereafter, the process moves to step S545 and, similar to step S505, a control signal is output to the feeding roller driving circuit 235 to restart the drive to feed the second tape 200A and the first tape 200B via the driving force of the feeding roller shaft driving motor 220.

Note that in this case too, the tape tension control during driving is performed for adjusting the tension of the tapes 200A, 200B, 209, and 210 during tape feeding, as in step S505.

Then, in step S550 a judgment is made as to whether or not the number of RFID tags Tg that have been attached by the tag inserter 226 is N or more. The number of attached RFID tags Tg may be counted, for example, by counting the number of control signal outputs that have been output by the tag inserter 226 in step S540, or by inputting and integrating an attach signal from the tag inserter 226 each time an RFID tag Tg is attached. Note that N is the number of RFID tags Tg provided in one roll of the base tape roll being manufactured, and is set, for example, at approximately 40. When the number of attached RFID tags Tg is less than N, the judgment is unsatisfied and the process moves to step S510. If the number of RFID tags Tg attached is N or greater, then the judgment is satisfied and the process moves to the next step, step S555.

In step S555 a judgment is made as to whether or not a suitable length of margin (in this case, an area in which the RFID tag Tg is not inserted) is provided in the base tape 210. Specifically, the judgment is made as to whether or not a margin equal to the attachment of an appropriate number of RFID tags Tg has been formed by outputting a control signal to the tag inserter 226 stopping the attachment of the RFID tags Tg, and repeating steps S515, S520, and S545 an appropriate number of times. Note that the length of the margin is, for example, set at a length equal to the attachment area of three RFID tags Tg. If a margin is formed, the judgment is satisfied, and the process returns to step S510.

As described above, the steps S510 through S550 are repeated until N RFID tags Tg are attached, then when a margin has been formed in step S555 and the number of attached RFID tags Tg in the base tape roll 215 wound on the reel member 215a has attained a predetermined number, the judgment of the preceding step S510 is satisfied and the process moves to the next step S565.

In step S565, similar to step S520, a control signal is again output to the feeding roller driving circuit 235 to stop the drive of the feeding roller shaft driving motor 220 and stop the feed out of the second tape 200A and first tape 200B from the second tape roll 211 and first tape roll 213. Note that in this case, similar to the case of step S520, the stop time tension control is performed to substantially equalize the tension of the second tape 200A and first tape 200B on the supply side when the tape drive is stopped, and the tension of the base tape 210 and separator 209 on the winding side.

Subsequently, in step S570 a control signal is output to the solenoid driving circuit 237 to drive the solenoid 236 and cut (segment) the base tape 210 using the cutter 227. With this arrangement, the roll made by winding the base tape 210 of a predetermined length is completed. Note that the position of the cut made by the cutter 227 is set, for example, at a position which leaves, after cutting, a margin equal to the length of two RFID tag Tg attachments and removes the length of one RFID tag attachment from the margin when a margin equal to the length of three attachments of RFID tags Tg is provided in the preceding step S555.

Thereafter, the process moves to step S575 and a control signal is output to the laser driving circuit 272 to start the laser of the laser marker 271 to provide an end mark (not shown in the drawing) via the laser on the upstream side in the tape feeding direction of the position cut by the cutter 227 on the separator 200Ad of the base tape 210. This end mark is provided in the margin with a length equal to two attached RFID tags remaining after cutting. Then, the flow returns to step S501.

Note that, although not particularly mentioned above, normally when initially starting the base tape roll manufacturing operation, there is a margin (for example, the length of the attachment area of approximately ten RFID tags Tg) in which an RFID tag Tg is not attached existing from the RFID tag Tg attaching position by the Tag inserter 226 to the winding position of the base tape 210 at the reel member 215a. This margin area is removed by cutting performed by the cutter 227 when the position at which this margin area ends (a position on the downstream side in the tape feeding direction at the approximate position where the first RFID tag Tg is attached) reaches the cutter 227. Thereafter, when the base tape 210 from which the margin has been removed is wound on the reel member 215a, the judgment of step S501 is satisfied and the manufacturing of the base tape roll starts from the procedure subsequent to step S505.

Note that the present disclosure is not limited to the procedure shown in the flow above, inasmuch as the procedure of the flow may be modified within a range that does not depart from the technical ideas and spirit of the disclosure, for example, the sequence of steps S570 and S575 may be reversed and the like.

The operational effect of the present embodiment is now described below.

In the tag tape roll manufacturing apparatus which has the above mentioned configuration of the present embodiment, the second tape 200A is mainly fed from the second tape roll 211 and supplied toward the bonding rollers 225A and 225B by the feeding driving force of the feeding rollers 219A and 219B when manufacturing the base tape 210. Similarly, the first tape 200B which is fed from the first tape roll 213 is also supplied to the bonding rollers 225A and 225B. Then, the feeding of the second tape 200A and the first tape 200B is temporarily stopped each time a predetermined amount has been fed, and the tag inserter 226 attaches an RFID tag Tg on the attaching part 200B1 of the first tape 200B when the second tape 200A and the first tape 200B are on the upstream side of the bonding by the bonding rollers 225A and 225B. After attachment, feeding is restarted. By performing intermittent feed drive in which feeding and stopping of the tape is repeated in this manner, the RFID tags Tg are inserted at predetermined intervals. Then, the tape which has this multilayer structure is fed farther downstream from the feeding rollers 219A and 219B, and the separator 209 is separated and removed at the rollers 240A and 240B, and the remaining part of the base tape 210 is wound on the reel member 215a. The base tape roll 215 provided with the RFID circuit elements To at predetermined regular intervals in the tape lengthwise direction is thus manufactured.

When the base tape 210 has been wound in a roll shape in this manner, a difference occurs in the circumferential length between one side (for example, the outer side in the diameter direction) and the other side (for example, the inner side in the diameter direction) in the thickness direction of the tape due to the curvature of the roll, and this difference in circumferential length may generate "wrinkles" in the base tape 210. Such "wrinkles" not only damage the appearance of the base tape 210 and the base tape roll 215, there is concern that these "wrinkles" may damage the RFID tag Tg by exerting unnecessary stress on the RFID tag Tg (specifically the RFID circuit element To which is configured by the tag side antenna 152 and IC circuit part 151).

In the present embodiment as described above, the problem of preventing the generation of wrinkles can be eliminated by using an elastic material to configure at least one of the tape base layer 200Bb and the separator layer 200Ad included in the base tape 210. This is described in greater detail below using FIG. 4.

FIG. 4 is a conceptual diagram showing the base tape 210 being wound on the reel member 215a. In this case, t in the drawing represents the thickness (distance) of the layer configured by the RFID tag Tg and the adhesive layer (adhesive layer 200Ac and adhesive layer 200Ba). Furthermore, R1 represents the thickness (distance) from the center 215b of the reel member 215a to the second tape 200A (specifically, the separator layer 200Ad), and R2 represents the thickness (distance) from the center 215b of the reel member 215a to the first tape 200B (specifically, the tape base layer 200Bb).

When the base tape 210 is thus wound up in a roll shape, a difference is produced in the circumferential length on the outer side in the diameter direction (in this case, the second tape 200A) and the inner side in the diameter direction (in this case, the first tape 200B) due to the curvature (the degree of the curve) of the roll. Specifically, when the base tape 210 is being wound on the reel member 215a, the second tape 200A is wound with a length of $2\pi R1$, and the first tape 200B is wound with a length of $2\pi(R1-t)$. The length (circumferential length) of the first tape 200B is therefore shorter than the length (circumferential length) of the second tape 200A (in this case, shorter by a segment length of $2\pi t$) so that a wrinkle is generated in the first tape 200B on the inner circumference side when being wound in a roll shape on the reel member 215a.

In the case of the present embodiment, at least one of the second tape 200A (specifically, the separator layer 200Ad) and the first tape 200B (specifically, the tape base layer 200Bb) is configured with an elastic layer formed of an elastic material. Polyurethane film, latex film, CPP (non-stretched polypropylene), polyolefin, PE (polyethylene), polyamide, flexible polyester, PLA (polylactide film), silicon resin, or substantially mesh-like films can be used as the elastic material. With this arrangement, the part on the outer side in the diameter direction can expand and the part on the inner side in the diameter direction can contract using the elasticity of the elastic material even when a difference occurs in the circumferential length between the outer side and the inner side in the diameter direction due to the curvature of the roll. The difference in the circumferential length can therefore be absorbed and the generation of wrinkles is preemptively prevented. Furthermore, such a base tape 210 effectively suppresses lifting of the base tape 210 side during bonding when the RFID label is prepared by bonding (ultimately cut to a predetermined length) the base tape 210 to a cover film 103 (print-receiving tape or print-receiving tape layer; refer to FIG. 39 to be described layer) which is an object to be bonded through the adhesive layer 200Bc.

For example, when the second tape 200A side (specifically, the separator layer 200Ad) is configured by an elastic material, the difference in circumferential length occurring when the base tape 210 is wound in a roll shape is absorbed by the expansion of the part on the outer side in the diameter direction using the elasticity of the separator layer 200Ad, thus preemptively preventing the generation of wrinkles. In this case, in the RFID label prepared in this manner using the base tape 210 which has the above described structure, the difference in circumferential length can be absorbed and the generation of wrinkles generated by the difference in circumferential length can be preemptively prevented by expanding the separator layer 200Ad even when a difference in the circumferential length occurs on the outer side in the curvature diameter direction and the inner side curvature diameter direction due to the curvature of the convex shape when affixing to a convex shape part of the object to be affixed.

For example, when the first tape 200B side (specifically, the tape base layer 200Bb) is configured of an elastic material, the difference in circumferential length occurring when the base tape 210 is wound in a roll shape is absorbed by contracting the part on the inner side in the diameter direction using the elasticity (contractility) of the tape base layer 200Bb. In this case, in the RFID label prepared in this manner using the base tape 210 which has the above described structure, the difference in circumferential length can be absorbed and the generation of wrinkles generated by the difference in circumferential length can be preemptively prevented by contracting the tape base layer 200Bb even when a difference occurs in the circumferential length of the outer side diameter direction curvature and the inner side diameter direction curvature due to the curvature of the concave shape when affixing to a concave shape part of the object to be affixed.

Thus, when the base tape 210 is wound in a roll shape according to the present embodiment, it is possible to maintain the orderliness of the base tape 210, base tape roll 215, and the RFID label produced using the tape and roll by preventing the generation of wrinkles when the RFID label which has been prepared using the base tape 210 is affixed to an irregularly shaped part.

In the present embodiment particularly, the tension of the first tape 200B may also be controlled (for example, relatively driving the piston 262a of the air cylinder 262C to the expanding side) to a suitable value (a value suitable for expanding the tape base layer 200Bb by $2\pi t$ only), for example, so as to wind the tape base layer 200Bb on the reel member 215a while expanding the circumferential length of the tape base layer 200Bb from $2\pi(R1-t)$ to $2\pi R1$ by the previously described tension controls (tape tension control during driving, tape tension control during stop). With this arrangement, the difference in circumferential length of $2\pi t$ can be absorbed and the generation of wrinkles can be preemptively prevented by contracting the inner side part in the diameter direction using the elasticity (contractility) of the tape base layer 200Bb as the stress in the contraction direction acts on the tape base layer 200Bb when winding the base tape 210 as the base tape roll 215.

Furthermore, the dimension increases in the diameter direction of the base tape layer 210 wound in a roll shape and the curvature decreases as the formation of the base tape roll 215 progresses. Therefore, the tension may also be controlled so as to reduce the tension toward the pulling direction (the direction substantially along the surface of the tape relative to the tape base layer 200Bb) in the tension control as the position in the diameter direction during winding moves farther from the center in the diameter direction of the base tape roll 215. With this arrangement, the tension is reduced toward the pulling direction according to the increase in the curvature, and the magnitude of the added tension is suitably set to reliably prevent the generation of wrinkles.

Moreover, the curvature increases and degree of the curve on the inner diameter side become acute under the condition that the thickness increases to equal the outer diameter in the setting of the dimension of the thickness of the first tape 200B. Therefore, the tension may also be controlled so as to increase the tension in the pulling direction (a direction substantially along the surface of the tape relative to the tape base layer 200Bb) during tension control as the thickness of the first tape 200B increases. With this arrangement, the tension is increased toward the pulling direction according to the increase in the curvature, and the magnitude of the added tension is suitably set to reliably prevent the generation of wrinkles.

In the present embodiment particularly, the first tape 200B and the second tape 200A have adhesive layers 200Ba and 200Ac which are respectively disposed adjacent to the antenna base 160 (RFID tag Tg). With this arrangement, the base tape 210 can be configured with the antenna base 160 continuously and stably disposed at predetermined intervals in the tape lengthwise direction since the antenna base 160 (RFID tag Tg) can be fixed to both the first tape 200B and the second tape 200A.

In the present embodiment particularly, the second tape 200A has the adhesive layer 200Ac which combines the function as the an antenna base adhesive layer provided adjacent to the antenna base 160 (RFID tag Tg) and the function as an adhesive layer for affixing the first tape 200B to the object to be affixed. As in the modification shown in FIG. 5 which will be described later, with this arrangement the tape thickness is reduced to effectively prevent the generation of wrinkles by configuring the base tape without providing a special base layer compared in comparison to the base tape that provides the antenna base adhesive layer (220Aa) and the attaching adhesive layer (200Ac) separately.

Note that when either of the separator layer 200Ad and tape base layer 200Bb are configured of elastic material both effects are combined to effectively preemptively prevent the generation of wrinkles.

Note also that the present disclosure is not limited to the layer structure described in the above embodiment, and may be applied to various layer structures insofar as such structure is within a range that does not depart from the technical ideas and spirit of the disclosure. Description will be made below regarding such modifications.

(1) When the Structure Includes the Tape Base Layer (Intermediate Base Layer) in the First Tape Although the second tape 200A has a two-layer structure which includes the adhesive layer 200Ac and separator layer 200Ad in the above embodiment, the present disclosure is not limited to this structure inasmuch as, for example, a four-layer structure is possible which includes an adhesive layer 200Aa formed of suitable adhesive, and a colored tape base layer 200Ab (second tag tape base layer) formed of PET (polyethylene terephthalate) or the like. FIG. 5 is a conceptual side view showing the second tape 200A-1 and the first tape 200B-1 bonded with an RFID tag Tg interposed therebetween in a first modification, and corresponds to the previously described FIG. 2. Note that parts in FIG. 5 similar to parts in FIG. 2 have the same reference number, and are not described further.

As shown in FIG. 5, the second tape 200A-1 of the first modification has a four-layer structure configured by the adhesive layer 200Aa, tape base layer 200Ab, adhesive layer 200Ac, and separator layer 200Ad formed of an elastic material. Note that the structures of the RFID tag Tg and the first tape 200B-1 are identical to the structures of the RFID tag Tg and the first tape 200B shown in FIG. 2. In the first modification which has this structure, after the tag inserter 226 has attached the RFID tag Tg to the attaching part 200B1 of the first tape 200B-1 of this structure, the adhesive layer 200Aa of the second tape 200A-1 and the adhesive layer 200Ba of the first tape 200B-1 are bonded by the bonding rollers 225A and 225B, then fed downstream and the separator layer 209 (separator layer 200Bd) is separated and removed at the rollers 240A and 240B, and the base tape 210-1 (not shown in the drawing) which is configured by the remaining parts is wound on the reel member 215a. The tag tape roll in which is wound the base tape 210-1 provided with the RFID circuit elements To at predetermined regular intervals in the tape lengthwise direction is thus manufactured.

In the first modification of the above structure, a base tape 210-1 is produced which has a multilayer structure configured of ten layers in addition to effects identical to the above embodiment. Furthermore, visual effects (easily visible printing and the like) and ornamental effects (color pleasing to the user and the like) can be enhanced from the surface side of the base tape 210-1 by coloring the tape base layer 200Ab and using this color as a background color.

In the first modification particularly, the first tape 200B and second tape 200A respectively have adhesive layers 200Ba and 200Aa to fix the antenna base 160 (RFID tag Tg) to the tape base layer. With this arrangement, the antenna base 160 (RFID tag Tg) can be continuously and stably disposed at regular intervals in the lengthwise direction of the tape by respectively fixing the antenna base layer 160 (RFID tag Tg) to the tape base layer 200Bb of the first tape 200B and the tape base layer 200Ab of the second tape 200A.

In addition to the structure of the first modification which has been described above, the present disclosure is applicable to tapes which have various layer structures. The modifications are described in order below. Although examples are described in which an elastic material is not used in the separator layer 200Ad of the second tape in the following modifications, an elastic material may also be used in the separator layer 200Ad in the structures of each of the modification.

In the second modification shown in FIG. 6, for example, the second tape 200A-2 has a three-layer structure configured by the tape base layer 200Ab, adhesive layer 200Ac, and separator layer 200Ad. Note that the second tape 200A-2 differs from the second tape 200A-1 in that the separator layer 200Ad is not configured by an elastic material. The structures of the first tape 200B-2 and the RFID tag Tg in the second modification are identical to the structures of the embodiment shown in FIG. 2. In the second modification which has this structure, after the tag inserter 226 has attached the RFID tag Tg to the attaching part 200B1 of the first tape 200B-2 of this structure, the tape base layer 200Ab of the second tape 200A-2 and the adhesive layer 200Ba of the first tape 200B-2 are bonded by the bonding rollers 225A and 225B, then fed downstream and the separator layer 209 (separator layer 200Bd) is separated and removed at the rollers 240A and 240B, and the base tape 210-2 (not shown in the drawing) which is configured by the remaining parts is wound on the reel member 215a. The tag tape roll in which is wound the base tape 210-2 provided with the RFID circuit elements To at predetermined regular intervals in the tape lengthwise direction is thus manufactured.

In the second modification which has the above structure, the difference in circumferential length occurring when the base tape 210-2 is wound in a roll shape is absorbed and the generation of wrinkles is preemptively prevented by contracting the part on the inner side in the diameter direction using the elasticity (contractility) of the tape base layer 200Bb of the first tape 200B-2. In the second modification, the thickness of the entire tape can also be reduced in comparison with providing the adhesive layer on both the first tape and second tape by providing the adhesive layer 200Ba for fixing the RFID tag Tg on only one of the first tape 200B-2 and the second tape 200A-2 (in this case, the first tape 200B-2). As a result, this arrangement also is effective in preventing the generation of wrinkles.

In a third modification shown in FIG. 7, for example, the second tape 200A-3 has a four-layer structure configured by an adhesive layer 200Aa, tape base layer 200Ab formed of an elastic material, adhesive layer 200Ac, and separator layer 200Ad. The first tape 200B-3 also has a four-layer structure configured by an adhesive layer 200Ba, tape base layer 200Bb, adhesive layer 200Bc, and separator layer 200Bd. In this case the tape base layer 200Bb in the first tape 200B-3 is not formed of an elastic material. Note that the configuration of the RFID tag Tg is the same as the configuration thereof in the embodiment shown in FIG. 2. In the third modification which has this structure, after the tag inserter 226 has attached the RFID tag Tg to the attaching part 200B1 of the first tape 200B-3 of this structure, the adhesive layer 200Aa of the second tape 200A-3 and the adhesive layer 200Ba of the first tape 200B-3 are bonded by the bonding rollers 225A and 225B, then fed downstream and the separator layer 209 (separator layer 200Bd) is separated and removed at the rollers 240A and 240B, and the base tape 210-3 (not shown in the drawing) which is configured by the remaining parts is wound on the reel member 215a. The tag tape roll in which is wound the base tape 210-3 provided with the RFID circuit elements To at predetermined regular intervals in the tape lengthwise direction is thus manufactured.

In the third modification which has this structure, the difference in circumferential length occurring when the base tape 210-3 is wound in a roll shape is absorbed and the generation of wrinkles can be preemptively prevented by expanding the part on the outer side in the diameter direction using the elasticity of the tape base layer 200Ab of the second tape 200A-3.

In a fourth modification shown in FIG. 8, for example, the second tape 200A-4 has a three-layer structure configured by the tape base layer 200Ab which is formed of an elastic material, adhesive layer 200Ac, and separator layer 200Ad. Note that the structure of the first tape 200B-4 is identical to the structure of the first tape 200B-3 of the above modification, and the structure of the RFID tag Tg is identical to the structure of the embodiment shown in FIG. 2. In the fourth modification which has this structure, after the tag inserter 226 has attached the RFID tag Tg to the attaching part 200B1 of the first tape 200B-4 of this structure, the tape base layer 200Ab of the second tape 200A-4 and the adhesive layer 200Ba of the first tape 200B-4 are bonded by the bonding rollers 225A and 225B, then fed downstream and the separator layer 209 (separator layer 200Bd) is separated and removed at the rollers 240A and 240B, and the base tape 210-4 (not shown in the drawing) which is configured by the remaining parts is wound on the reel member 215a. The tag tape roll in which is wound the base tape 210-4 provided with the RFID circuit elements To at predetermined regular intervals in the tape lengthwise direction is thus manufactured.

In the fourth modification which has this structure, the difference in circumferential length occurring when the base tape 210-4 is wound in a roll shape is absorbed and the generation of wrinkles can be preemptively prevented by expanding the part on the outer side in the diameter direction using the elasticity of the tape base layer 200Ab of the second tape 200A-4.

In a fifth modification shown in FIG. 9, for example, the second tape 200A-5 has a four-layer structure configured by an adhesive layer 200Aa, tape base layer 200Ab formed of an elastic material, adhesive layer 200Ac, and separator layer 200Ad. The first tape 200B-5 also has a four-layer structure configured by an adhesive layer 200Ba, tape base layer 200Bb formed of an elastic material, adhesive layer 200Bc, and separator layer 200Bd. Note that the configuration of the RFID tag-Tg is the same as the configuration thereof in the embodiment shown in FIG. 2. In the fifth modification which has this structure, after the tag inserter 226 has attached the RFID tag Tg to the attaching part 200B1 of the first tape 200B-5 of this structure, the adhesive layer 200Aa of the second tape 200A-5 and the adhesive layer 200Ba of the first tape 200B-5 are bonded by the bonding rollers 225A and 225B, then fed downstream and the separator layer 209 (separator layer 200Bd) is separated and removed at the rollers 240A and 240B, and the base tape 210-5 (not shown in the drawing) which is configured by the remaining parts is wound on the reel member 215a. The tag tape roll in which is wound the base tape 210-5 provided with the RFID circuit elements To at predetermined regular intervals in the tape lengthwise direction is thus manufactured.

In the fifth modification which has this structure, the difference in the circumferential length that occurs when the base tape 210-5 is wound in a roll shape is absorbed and the generation of wrinkles is preemptively prevented by expanding and contracting the part on the outer side and the part on the inner side in the diameter direction using the elasticity of both the tape base layer 200Ab of the second tape 200A-5 and the tape base layer 200Bb of the first tape 200B-5. As a result, in the fifth modification even a large difference in circumferential length can be absorbed and the generation of wrinkles can be reliably prevented by expanding and contracting the tape base layers of both the first tape and second tape.

In a sixth modification shown in FIG. 10, for example, the second tape 200A-6 has a three-layer structure configured by the tape base layer 200Ab which is formed of an elastic material, adhesive layer 200Ac, and separator layer 200Ad. The first tape 200B-6 also has a four-layer structure configured by an adhesive layer 200Ba, tape base layer 200Bb formed of an elastic material, adhesive layer 200Bc, and separator layer 200Bd. Note that the configuration of the RFID tag Tg is the same as the configuration thereof in the embodiment shown in FIG. 2. In the sixth modification which has this structure, after the tag inserter 226 has attached the RFID tag Tg to the attaching part 200B1 of the first tape 200B-6 of this structure, the tape base layer 200Ab of the second tape 200A-6 and the adhesive layer 200Ba of the first tape 200B-6 are bonded by the bonding rollers 225A and 225B, then fed downstream and the separator layer 209 (separator layer 200Bd) is separated and removed at the rollers 240A and 240B, and the base tape 210-6 (not shown in the drawing) which is configured by the remaining parts is wound on the reel member 215a. The tag tape roll in which is wound the base tape 210-6 provided with the RFID circuit elements To at predetermined regular intervals in the tape lengthwise direction is thus manufactured.

In the sixth modification which has this structure, the difference in the circumferential length that occurs when the base tape 210-6 is wound in a roll shape is absorbed and the generation of wrinkles is preemptively prevented by expanding and contracting the part on the outer side and the part on the inner side in the diameter direction using the elasticity of both the tape base layer 200Ab of the second tape 200A-6 and the tape base layer 200Bb of the first tape 200B-6. With this arrangement, even a large difference in circumferential length can be adequately absorbed and the generation of wrinkles can be reliably prevented.

In a seventh modification shown in FIG. 11, for example, the second tape 200A-7 has a four-layer structure configured by an adhesive layer 200Aa, tape base layer 200Ab formed of an elastic material, adhesive layer 200Ac, and separator layer 200Ad. The first tape 200B-7 also has a two-layer structure configured by an adhesive layer 200Bc and separator layer 200Bd. Note that the configuration of the RFID tag Tg is the same as the configuration thereof in the embodiment shown in FIG. 2. In the seventh modification which has this structure, after the tag inserter 226 has attached the RFID tag Tg to the attaching part 200B1 of the first tape 200B-7 of this structure, the adhesive layer 200Aa of the second tape 200A-7 and the adhesive layer 200Ba of the first tape 200B-7 are bonded by the bonding rollers 225A and 225B, then fed downstream and the separator layer 209 (separator layer 200Bd) is separated and removed at the rollers 240A and 240B, and the base tape 210-7 (not shown in the drawing) which is configured by the remaining parts is wound on the reel member 215a. The tag tape roll in which is wound the base tape 210-7 provided with the RFID circuit elements To at predetermined regular intervals in the tape lengthwise direction is thus manufactured.

In the seventh modification which has this structure, the difference in circumferential length generated when the base tape 210-7 is wound in a roll shape can be absorbed and the generation of wrinkles can be preemptively prevented by expanding the part on the outer side in the diameter direction using the elasticity of the tape base layer 200Ab of the second tape 200A-7. In the seventh modification the first tape 200B-7 also has an adhesive layer 200Bc which both functions as an antenna base adhesive layer provided adjacent to the antenna base 160 (RFID tag Tg), and functions as a bonding adhesive layer for bonding the print-receiving tape and the second tape 200A-7. With this arrangement, the thickness of the tape can be reduced with the effect of preventing the generation of wrinkles by configuring the base tape without providing an interposed special base layer compared to the base tape which is configured by separate antenna base adhesive layer (200Ba) and bonding adhesive layer (200Bc) as in the embodiment.

In an eighth modification shown in FIG. 12, for example, the second tape 200A-8 has a three-layer structure configured by the tape base layer 200Ab which is formed of an elastic material, adhesive layer 200Ac, and separator layer 200Ad. The first tape 200B-8 also has a two-layer structure configured by an adhesive layer 200Bc and separator layer 200Bd. Note that the configuration of the RFID tag Tg is the same as the configuration thereof in the embodiment shown in FIG. 2. In the eighth modification which has this structure, after the tag inserter 226 has attached the RFID tag Tg to the attaching part 200B1 of the first tape 200B-8 of this structure, the tape base layer 200Ab of the second tape 200A-8 and the adhesive layer 200Bc of the first tape 200B-8 are bonded by the bonding rollers 225A and 225B, then fed downstream and the separator layer 209 (separator layer 200Bd) is separated and removed at the rollers 240A and 240B, and the base tape 210-8 (not shown in the drawing) which is configured by the remaining parts is wound on the reel member 215a. The tag tape roll in which is wound the base tape 210-8 provided with the RFID circuit elements To at predetermined regular intervals in the tape lengthwise direction is thus manufactured.

In the eighth modification which has this structure, the difference in circumferential length generated when the base tape 210-8 is wound in a roll shape can be absorbed and the generation of wrinkles can be preemptively prevented by expanding the part on the outer side in the diameter direction using the elasticity of the tape base layer 200Ab of the second tape 200A-8. A further effect is a greater reduction in the thickness of the tape via the synergism of the effects described in both the second modification and seventh modification.

Although the first tape has an adhesive layer (220Ba or 200Bc) on the RFID tag Tg side in the first through eighth modifications, the present disclosure is not limited to this arrangement and configurations in which the first tape does not have an adhesive layer on the RFID tag Tg side may also be considered. Description will be made below regarding such modifications. Note that in this case the tag inserter 226 attaches the RFID tag Tg to the attaching part 200A1 on the second tape 200A side (refer to FIG. 14 which is described later).

In a ninth modification shown in FIG. 13, for example, the second tape 200A-9 has a four-layer structure configured by an adhesive layer 200Aa, tape base layer 200Ab, adhesive layer 200Ac, and separator layer 200Ad. The first tape 200B-9 also has a three-layer structure configured by a tape base layer 200Bb which is formed of an elastic material, adhesive layer 200Bc, and separator layer 200Bd. Note that the configuration of the RFID tag Tg is the same as the configuration thereof in the embodiment shown in FIG. 2.

FIG. 14 is a conceptual diagram briefly showing an overall general structure of a tag tape roll manufacturing apparatus for manufacturing a base tape roll of wound base tape, and corresponds to the previously described FIG. 1. Note that parts similar to parts in FIG. 1 have the same reference number, and are not described further.

As shown in FIG. 14, the tag inserter 226, tag checker 270, and tape supporting member 274 are disposed on the second tape 200A side. With this arrangement, in the ninth modification, after the tag inserter 226 has attached the RFID tag Tg to the attaching part 200A1 of the second tape 200A-9 of this structure, the tape base layer 200Bb of the first tape 200B-9 and the adhesive layer 200Aa of the second tape 200A-9 are bonded by the bonding rollers 225A and 225B, then fed downstream and the separator layer 209 (separator layer 200Bd) is separated and removed at the rollers 240A and 240B, and the base tape 210-9 which is configured by the remaining parts is wound on the reel member 215a. The tag tape roll in which is wound the base tape 210-9 provided with the RFID circuit elements To at predetermined regular intervals in the tape lengthwise direction is thus manufactured.

In the ninth modification which has the above structure, the difference in circumferential length occurring when the base tape 210-9 is wound in a roll shape is absorbed and the generation of wrinkles is preemptively prevented by contracting the part on the inner side in the diameter direction using the elasticity (contractility) of the tape base layer 200Bb of the first tape 200B-9.

In a tenth modification shown in FIG. 15, for example, the second tape 200A-10 has a four-layer structure configured by an adhesive layer 200Aa, tape base layer 200Ab formed of an elastic material, adhesive layer 200Ac, and separator layer 200Ad. The first tape 200B-10 also has a three-layer structure configured by a tape base layer 200Bb, adhesive layer 200Bc, and separator layer 200Bd. Note that the configuration of the RFID tag Tg is the same as the configuration thereof in the embodiment shown in FIG. 2. In the tenth modification which has this structure, after the tag inserter 226 has attached the RFID tag Tg to the attaching part 200A1 of the second tape 200A-10 of this structure, the tape base layer 200Bb of the first tape 200B-10 and the adhesive layer 200Aa of the second tape 200A-10 are bonded by the bonding rollers 225A and 225B, then fed downstream and the separator 209 (separator layer 200Bd) is separated and removed at the rollers 240A and 240B, and the base tape 210-10 which is configured by the remaining parts is wound on the reel member 215a. The tag tape roll in which is wound the base tape 210-10 provided with the RFID circuit elements To at predetermined regular intervals in the tape lengthwise direction is thus manufactured.

In the tenth modification which has this structure, the difference in circumferential length generated when the base tape 210-10 is wound in a roll shape can be absorbed and the generation of wrinkles can be preemptively prevented by expanding the part on the outer side in the diameter direction using the elasticity of the tape base layer 200Ab of the second tape 200A-10.

In an eleventh modification shown in FIG. 16, for example, the second tape 200A-11 has a four-layer structure configured by an adhesive layer 200Aa, tape base layer 200Ab formed of an elastic material, adhesive layer 200Ac, and separator layer 200Ad. The first tape 200B-11 also has a three-layer structure configured by a tape base layer 200Bb which is formed of an elastic material, adhesive layer 200Bc, and separator layer 200Bd. Note that the configuration of the RFID tag Tg is the same as the configuration thereof in the embodiment shown in FIG. 2. In the eleventh modification which has this structure, after the tag inserter 226 has attached the RFID tag Tg to the attaching part 200A1 of the second tape 200A-11 of this structure, the tape base layer 200Bb of the first tape 200B-11 and the adhesive layer 200Aa of the second tape 200A-11 are bonded by the bonding rollers 225A and 225B, then fed downstream and the separator 209 (separator layer 200Bd) is separated and removed at the rollers 240A and 240B, and the base tape 210-11 which is configured by the remaining parts is wound on the reel member 215a. The tag tape roll in which is wound the base tape 210-11 provided with the RFID circuit elements To at predetermined regular intervals in the tape lengthwise direction is thus manufactured.

In the eleventh modification which has this structure, the difference in the circumferential length that occurs when the base tape 210-11 is wound in a roll shape is absorbed and the generation of wrinkles is preemptively prevented by expanding and contracting the part on the outer side and the part on the inner side in the diameter direction using the elasticity of both the tape base layer 200Ab of the second tape 200A-11 and the tape base layer 200Bb of the first tape 200B-11.

(2) When the First Tape has a Print-Receiving Layer (Thermal Layer, Transfer Layer, Image Receiving Layer)

Although the above embodiment has been described by way of example of manufacturing a so-called laminate type base tape 210 by producing an RFID label in which a print-receiving tape (cover film 103) with desired printing is affixed to an adhesive layer 200Bc on the first tape side of a base tape 210 fed from a base tape roll when producing an RFID label using a manufactured base tape roll, the present disclosure is not limited to this arrangement inasmuch as, for example, so-called thermal, receptor, and inkjet type base tapes may also be manufactured by configuring the first tape 200B as a tape provided with a print-receiving layer (thermal layer, transfer layer, image receiving layer).

(2-1) Thermal Tape

FIG. 17 is a conceptual side view showing the condition when bonding the second tape 200A-12 and first tape 200B-12 with the RFID tag Tg interposed therebetween in a twelfth modification when manufacturing a thermal type base tape, and this drawing corresponds to the previously mentioned FIG. 2 and the like. Note that parts in FIG. 17 similar to parts in FIG. 2 have the same reference number, and are not described further.

As shown in FIG. 17, the first tape 200B-12 of the twelfth modification has a three-layer structure configured by an adhesive layer 200Ba, a tape base layer 200Bb formed of an elastic material, and a thermal layer 200Be configured by a thermal agent which produces a color via heat. Note that the configurations of the second tape 200A and the RFID tag Tg are the same as the configurations thereof in the embodiment shown in FIG. 2.

A conceptual drawing briefly showing the overall general structure of a tag tape roll manufacturing apparatus for manufacturing a base tape roll by winding a base tape 210-12 which has the second tape 200A-12 of this structure bonded to the first tape 200B-12 is shown in FIG. 18. Aspects which differ in the configurations of the tag tape roll manufacturing apparatus of the twelfth modification shown in FIG. 18 from the tag tape roll manufacturing apparatus shown in FIG. 1 include the omission of the separation process of the separator of the first tape 200B-12, that is, the roller 240B, fourth dancer roller 224, air cylinder 262D, separator roll 217, the separator shaft driving motor 218 for driving the separator roll 217, and the separator driving circuit 234 for controlling the drive of the separator shaft driving motor 218 and the like, and the omission of the discharge brush 275 provided at the latter part of the separator separation position since the separation of the separator is lacking. In other aspects the configuration is identical to the configuration shown in FIG. 1.

In the tag tape roll manufacturing apparatus which has this structure, after the tag inserter 226 has attached the RFID tag Tg to the attaching part 200B1 of the first tape 200B-12 of this structure, the adhesive layer 200Ac of the second tape 200A-12 and the adhesive layer 200Ba of the first tape 200B-12 are bonded by the bonding rollers 225A and 225B, and the base tape 210-12 is wound on the reel member 215a. The tag tape roll in which is wound the base tape 210-12 provided with the RFID circuit elements To at predetermined regular intervals in the tape lengthwise direction is thus manufactured.

The twelfth modification which has this structure provides, in addition to the same effects of the embodiment, the effects of producing an RFID label with print without specially bonding a print-receiving tape for print formation, and reducing the whole thickness of the tape or the label because the base tape 210-12 is directly printable.

Various configurations may be considered beyond the layer structure of the twelfth modification described above. Although examples are described in which an elastic material is not used in the separator layer 200Ad of the second tape in the following modifications, an elastic material may also be used in the separator layer 200Ad in the structures of each of the modification. When the second tape has a tape base layer Ab in the following modifications, the tape base layer 200Ab on the second tape side may also be configured of an elastic material rather than the tape base layer 200Bb on the first tape side configured of an elastic material, or both the tape base layers 200Bb and 200Ab may be configured of elastic material.

In a thirteenth modification shown in FIG. 19, for example, the second tape 200A-13 has a four-layer structure configured by an adhesive layer 200Aa, tape base layer 200Ab, adhesive layer 200Ac, and separator layer 200Ad. The first tape 200B-13 also has a three-layer structure configured by an adhesive layer 200Ba, tape base layer 200Bb formed of an elastic material, and thermal layer 200Be configured by a thermal agent which produces a color via heat. Note that the configuration of the RFID tag Tg is the same as the configuration thereof in the embodiment shown in FIG. 2. In the thirteenth modification which has this structure, after the tag inserter 226 has attached the RFID tag Tg to the attaching part 200B1 of the first tape 200B-13 of this structure, the adhesive layer 200Aa of the second tape 200A-13 and the adhesive layer 200Ba of the first tape 200B-13 are bonded by the bonding rollers 225A and 225B, and the produced base tape 210-13 is wound on the reel member 215a. The tag tape roll in which is wound the base tape 210-13 provided with the RFID circuit elements To at predetermined regular intervals in the tape lengthwise direction is thus manufactured.

In the thirteenth modification which has the above structure, the difference in circumferential length occurring when the base tape 210-13 is wound in a roll shape is absorbed and the generation of wrinkles is preemptively prevented by contracting the part on the inner side in the diameter direction using the elasticity (contractility) of the tape base layer 200Bb of the first tape 200B-13.

In a fourteenth modification shown in FIG. 20, for example, the second tape 200A-14 has a three-layer structure configured by the tape base layer 200Ab, adhesive layer 200Ac, and separator layer 200Ad. The first tape 200B-14 also has a three-layer structure configured by an adhesive layer 200Ba, tape base layer 200Bb formed of an elastic material, and thermal layer 200Be configured by a thermal agent which produces a color via heat. Note that the configuration of the RFID tag Tg is the same as the configuration thereof in the embodiment shown in FIG. 2. In the fourteenth modification which has this structure, after the tag inserter 226 has attached the RFID tag Tg to the attaching part 200B1 of the first tape 200B-14 of this structure, the tape base layer 200Ab of the second tape 200A-14 and the adhesive layer 200Ba of the first tape 200B-14 are bonded by the bonding rollers 225A and 225B, and the produced base tape 210-14 is wound on the reel member 215a. The tag tape roll in which is wound the base tape 210-14 provided with the RFID circuit elements To at predetermined regular intervals in the tape lengthwise direction is thus manufactured.

In the fourteenth modification which has the above structure, the difference in circumferential length occurring when the base tape 210-14 is wound in a roll shape is absorbed and the generation of wrinkles is preemptively prevented by contracting the part on the inner side in the diameter direction using the elasticity (contractility) of the tape base layer 200Bb of the first tape 200B-14.

Although the first tape is configured to have an adhesive layer 200Ba on the RFID tag Tg side in the preceding twelfth through fourteenth modifications, the present disclosure is not limited to this arrangement inasmuch as configuring the first tape without the adhesive layer on the RFID tag Tg side may also be considered. Note that in this case the tag inserter 226 attaches the RFID tag Tg to the attaching part 200A1 on the second tape 200A side (refer to FIG. 22 which is described later).

In a fifteenth modification shown in FIG. 21, for example, the second tape 200A-15 has a four-layer structure configured by an adhesive layer 200Aa, tape base layer 200Ab, adhesive layer 200Ac, and separator layer 200Ad. The first tape 200B-15 also has a two-layer structure configured by a tape base layer 200Bb formed of an elastic material, and thermal layer 200Be configured by a thermal agent which produces a color via heat. Note that the configuration of the RFID tag Tg is the same as the configuration thereof in the embodiment shown in FIG. 2.

FIG. 22 is a conceptual diagram briefly showing an overall general structure of a tag tape roll manufacturing apparatus for manufacturing a base tape roll of wound base tape, and corresponds to the previously described FIG. 1. Note that parts similar to parts in FIG. 1 have the same reference number, and are not described further.

As shown in FIG. 22, the tag inserter 226, tag checker 270, and tape supporting member 274 are disposed on the second tape 200A side. With this arrangement, in the fifteenth modification, after the tag inserter 226 has attached the RFID tag Tg to the attaching part 200A1 of the second tape 200A-15 of this structure, the tape base layer 200Bb of the first tape 200B-15 and the adhesive layer 200Aa of the second tape 200A-15 are bonded by the bonding rollers 225A and 225B, and the produced base tape 210-15 is wound on the reel member 215a. The tag tape roll in which is wound the base tape 210-15 provided with the RFID circuit elements To at predetermined regular intervals in the tape lengthwise direction is thus manufactured.

In the fifteenth modification which has the above structure, the difference in circumferential length occurring when the base tape 210-15 is wound in a roll shape is absorbed and the generation of wrinkles is preemptively prevented by contracting the part on the inner side in the diameter direction using the elasticity (contractility) of the tape base layer 200Bb of the first tape 200B-15.

Note that although the thermal layer 200Be is laminated on the tape base layer 200Bb, the disclosure is not limited to this arrangement inasmuch as a thermal sheet configured of a thermal base layer and thermal layer may be provided on the tape base layer 200Bb mediated by adhesive. Description will be made below regarding such modifications.

In a sixteenth modification shown in FIG. 23, for example, the second tape 200A-16 has a four-layer structure configured by an adhesive layer 200Aa, tape base layer 200Ab, adhesive layer 200Ac, and separator layer 200Ad. On the other hand, the first tape 200B-16 has a four-layer structure configured by an adhesive layer 200Ba, tape base layer 200Bb formed of elastic material, adhesive layer 200Bc, and thermal sheet 200Bh configured by a thermal base layer 200Bf (print-receiving base material), and thermal layer 200Bg (print-receiving layer) formed of thermal agent which produces a color via heat. Note that the configuration of the RFID tag Tg is the same as the configuration thereof in the embodiment shown in FIG. 2. In the sixteenth modification which has this structure, after the tag inserter 226 has attached the RFID tag Tg to the attaching part 200B1 of the first tape 200B-16 of this structure, the adhesive layer 200Aa of the second tape 200A-16 and the adhesive layer 200Ba of the first tape 200B-16 are bonded by the bonding rollers 225A and 225B, and the produced base tape 210-16 is wound on the reel member 215a. The tag tape roll in which is wound the base tape 210-16 provided with the RFID circuit elements To at predetermined regular intervals in the tape lengthwise direction is thus manufactured.

In the sixteenth modification which has the above structure, the difference in circumferential length occurring when the base tape 210-16 is wound in a roll shape is absorbed and the generation of wrinkles is preemptively prevented by contracting the part on the inner side in the diameter direction using the elasticity (contractility) of the tape base layer 200Bb of the first tape 200B-16. Furthermore, according to the sixteenth modification, visual effects (easily visible printing and the like) and ornamental effects (color pleasing to the user and the like) can be enhanced from the surface side of the base tape by coloring the thermal base layer 200Bf of the thermal sheet 200Bh and using this color as a background color.

In a seventeenth modification shown in FIG. 24, for example, the second tape 200A-17 has a three-layer structure configured by the tape base layer 200Ab, adhesive layer 200Ac, and separator layer 200Ad. Furthermore, the first tape 200B-17 has the same structure as the sixteenth modification, and the configuration of the RFID tag Tg is the same as the configuration thereof in the embodiment shown in FIG. 2. In the seventeenth modification which has this structure, after the tag inserter 226 has attached the RFID tag Tg to the attaching part 200B1 of the first tape 200B-17 of this structure, the tape base layer 200Ab of the second tape 200A-17 and the adhesive layer 200Ba of the first tape 200B-17 are bonded by the bonding rollers 225A and 225B, and the produced base tape 210-17 is wound on the reel member 215*a*. The tag tape roll in which is wound the base tape 210-17 provided with the RFID circuit elements To at predetermined regular intervals in the tape lengthwise direction is thus manufactured.

In the seventeenth modification which has the above structure, the difference in circumferential length occurring when the base tape 210-17 is wound in a roll shape is absorbed and the generation of wrinkles is preemptively prevented by contracting the part on the inner side in the diameter direction using the elasticity (contractility) of the tape base layer 200Bb of the first tape 200B-17.

In an eighteenth modification shown in FIG. 25, for example, the second tape 200A-18 has a two-layer structure configured by an adhesive layer 200Ac, and separator layer 200Ad. Furthermore, the first tape 200B-18 has the same structure as the sixteenth and seventeenth modifications, and the configuration of the RFID tag Tg is the same as the configuration thereof in the embodiment shown in FIG. 2. In the eighteenth modification which has this structure, after the tag inserter 226 has attached the RFID tag Tg to the attaching part 200B1 of the first tape 200B-18 of this structure, the adhesive layer 200Aa of the second tape 200A-18 and the adhesive layer 200Ba of the first tape 200B-18 are bonded by the bonding rollers 225A and 225B, and the produced base tape 210-18 is wound on the reel member 215*a*. The tag tape roll in which is wound the base tape 210-18 provided with the RFID circuit elements To at predetermined regular intervals in the tape lengthwise direction is thus manufactured.

In the eighteenth modification which has the above structure, the difference in circumferential length occurring when the base tape 210-18 is wound in a roll shape is absorbed and the generation of wrinkles is preemptively prevented by contracting the part on the inner side in the diameter direction using the elasticity (contractility) of the tape base layer 200Bb of the first tape 200B-18.

In a nineteenth modification shown in FIG. 26, for example, the second tape 200A-19 has a four-layer structure configured by an adhesive layer 200Aa, tape base layer 200Ab, adhesive layer 200Ac, and separator layer 200Ad. On the other hand, the first tape 200B-19 has a three-layer structure configured by a tape base layer 200Bb formed of elastic material, adhesive layer 200Bc, and thermal sheet 200Bh configured by a thermal base layer 200Bf, and thermal layer 200Bg formed of thermal agent which produces a color via heat. Note that the configuration of the RFID tag Tg is the same as the configuration thereof in the embodiment shown in FIG. 2.

In the nineteenth modification which has this structure, a tag tape roll manufacturing apparatus is used which has the tag inserter 226, tag checker 270, and tape supporting member 274 disposed on the second tape 200A side similar to the fifteenth modification. That is, after the tag inserter 226 has attached the RFID tag Tg to the attaching part 200A1 of the second tape 200A-19 of this structure, tape base layer 200Bb of the first tape 200B-19 and the adhesive layer 200Aa of the second tape 200A-19 are bonded by the bonding rollers 225A and 225B, and the produced base tape 210-19 is wound on the reel member 215*a*. The tag tape roll in which is wound the base tape 210-19 provided with the RFID circuit elements To at predetermined regular intervals in the tape lengthwise direction is thus manufactured.

In the nineteenth modification which has the above structure, the difference in circumferential length occurring when the base tape 210-19 is wound in a roll shape is absorbed and the generation of wrinkles is preemptively prevented by contracting the part on the inner side in the diameter direction using the elasticity (contractility) of the tape base layer 200Bb of the first tape 200B-19.

(2-2) Receptor (Inkjet) Type

Although in the above the first tape is described as having a thermal layer as a print-receiving layer, other configurations having a transfer layer configured of transfer-receiving layer which is printable via thermal transfer from an ink ribbon, or having an image receiving layer configured by an image receiving material which is printable by applying ink are also possible. Note that although the examples below are described in terms of the first tape having a transfer layer as a print-receiving layer, an image-receiving layer (so-called inkjet type) may also be provided in lieu of the transfer layer in each of the modifications. In the configurations of each of the following modifications, an elastic material may also be used in the separator layer 200Ad.

FIG. 27 is a conceptual side view showing the condition when bonding the second tape 200A-20 and first tape 200B-20 with the RFID tag Tg interposed therebetween in a twentieth modification when manufacturing a so-called receptor type base tape, and this drawing corresponds to the previously mentioned FIG. 2 and the like. Note that parts in FIG. 27 similar to parts in FIG. 2 have the same reference number, and are not described further.

As shown in FIG. 27, the first tape 200B-20 of the twentieth modification has a three-layer structure configured by an adhesive layer 200Ba, a tape base layer 200Bb formed of an elastic material, and a transfer layer 200Be'. Note that the configurations of the second tape 200A and the RFID tag Tg are the same as the configurations thereof in the embodiment shown in FIG. 2.

Although not particularly shown in the drawing, the base tape roll in which is wound the base tape 210-20 of the bonded first tape 200B-20 and second tape 200A-20 which has this structure is manufactured by a tag tape roll manufacturing apparatus of the same configuration as FIG. 18. In the tag tape roll manufacturing apparatus which has this structure, after the tag inserter 226 has attached the RFID tag Tg to the attaching part 200B1 of the first tape 200B-20 of this structure, the adhesive layer 200Ac of the second tape 200A-20 and the adhesive layer 200Ba of the first tape 200B-20 are bonded by the bonding rollers 225A and 225B, and the base tape 210-20 is wound on the reel member 215*a*. The tag tape roll in which is wound the base tape 210-20 provided with the RFID circuit elements To at predetermined regular intervals in the tape lengthwise direction is thus manufactured.

The twentieth modification which has this structure provides the effect of reducing the whole thickness of the tape or the label in addition to effects identical to the preceding embodiment, similar to the previously described thermal tape.

In a twenty-first modification shown in FIG. 28, for example, the second tape 200A-21 has a four-layer structure configured by an adhesive layer 200Aa, tape base layer 200Ab, adhesive layer 200Ac, and separator layer 200Ad. The first tape 200B-21 also has a three-layer structure configured by an adhesive layer 200Ba, tape base layer 200Bb formed of an elastic material, and transfer layer 200Be'. Note that the configuration of the RFID tag Tg is the same as the configuration thereof in the embodiment shown in FIG. 2. In the twenty-first modification which has this structure, after the tag inserter 226 has attached the RFID tag Tg to the attaching part 200B1 of the first tape 200B-21 of this structure, the adhesive layer 200Aa of the second tape 200A-21 and the adhesive layer 200Ba of the first tape 200B-21 are bonded by the bonding rollers 225A and 225B, and the produced base tape 210-21 is wound on the reel member 215a. The tag tape roll in which is wound the base tape 210-21 provided with the RFID circuit elements To at predetermined regular intervals in the tape lengthwise direction is thus manufactured.

In the twenty-first modification which has the above structure, the difference in circumferential length occurring when the base tape 210-21 is wound in a roll shape is absorbed and the generation of wrinkles is preemptively prevented by contracting the part on the inner side in the diameter direction using the elasticity (contractility) of the tape base layer 200Bb of the first tape 200B-21.

In a twenty-second modification shown in FIG. 29, for example, the second tape 200A-22 has a three-layer structure configured by the tape base layer 200Ab, adhesive layer 200Ac, and separator layer 200Ad. The first tape 200B-22 also has a three-layer structure configured by an adhesive layer 200Ba, tape base layer 200Bb formed of an elastic material, and transfer layer 200Be'. Note that the configuration of the RFID tag Tg is the same as the configuration thereof in the embodiment shown in FIG. 2. In the twenty-second modification which has this structure, after the tag inserter 226 has attached the RFID tag Tg to the attaching part 200B1 of the first tape 200B-22 of this structure, the tape base layer 200Ab of the second tape 200A-22 and the adhesive layer 200Ba of the first tape 200B-22 are bonded by the bonding rollers 225A and 225B, and the produced base tape 210-22 is wound on the reel member 215a. The tag tape roll in which is wound the base tape 210-22 provided with the RFID circuit elements To at predetermined regular intervals in the tape lengthwise direction is thus manufactured.

In the twenty-second modification which has the above structure, the difference in circumferential length occurring when the base tape 210-22 is wound in a roll shape is absorbed and the generation of wrinkles is preemptively prevented by contracting the part on the inner side in the diameter direction using the elasticity (contractility) of the tape base layer 200Bb of the first tape 200B-22.

Although the first tape is configured to have an adhesive layer 200Ba on the RFID tag Tg side in the preceding twentieth through twenty-second modifications, the present disclosure is not limited to this arrangement inasmuch as configuring the first tape without the adhesive layer on the RFID tag Tg side may also be considered. Note that in this case the tag inserter 226 attaches the RFID tag Tg to the attaching part 200A1 (refer to FIG. 22 which was described previously) on the second tape 200A side.

In a twenty-third modification shown in FIG. 30, for example, the second tape 200A-23 has a four-layer structure configured by an adhesive layer 200Aa, tape base layer 200Ab, adhesive layer 200Ac, and separator layer 200Ad. The first tape 200B-23 also has a two-layer structure configured by a tape base layer 200Bb formed of elastic material, and transfer layer 200Be'. Note that the configuration of the RFID tag Tg is the same as the configuration thereof in the embodiment shown in FIG. 2. With this arrangement, in the twenty-third modification, after the tag inserter 226 has attached the RFID tag Tg to the attaching part 200A1 of the second tape 200A-23 of this structure, the tape base layer 200Bb of the first tape 200B-23 and the adhesive layer 200Aa of the second tape 200A-23 are bonded by the bonding rollers 225A and 225B, and the produced base tape 210-23 is wound on the reel member 215a. The tag tape roll in which is wound the base tape 210-23 provided with the RFID circuit elements To at predetermined regular intervals in the tape lengthwise direction is thus manufactured.

In the twenty-third modification which has the above structure, the difference in circumferential length occurring when the base tape 210-23 is wound in a roll shape is absorbed and the generation of wrinkles is preemptively prevented by contracting the part on the inner side in the diameter direction using the elasticity (contractility) of the tape base layer 200Bb of the first tape 200B-23.

Note that although the transfer layer 200Be' is laminated on the tape base layer 200Bb above, the disclosure is not limited to this arrangement inasmuch as a transfer sheet (receptor sheet) configured by a transfer base layer and a transfer layer may also be provided on the tape base layer 200Bb mediated by adhesive. Description will be made below regarding such modifications. Note that in each of the following modifications an image-receiving sheet (inkjet sheet) configured by an image-receiving base layer and an image-receiving layer may also be provided in lieu of the transfer sheet configured by the transfer base layer and transfer layer.

In a twenty-fourth modification shown in FIG. 31, for example, the second tape 200A-24 has a four-layer structure configured by an adhesive layer 200Aa, tape base layer 200Ab, adhesive layer 200Ac, and separator layer 200Ad. On the other hand, the first tape 200B-24 has a four-layer structure configured by an adhesive layer 200Ba, tape base layer 200Bb formed of an elastic material, adhesive layer 200Bc, and transfer sheet 200Bh' configured by a transfer base layer 200Bf' and transfer layer 200Bg'. Note that the configuration of the RFID tag Tg is the same as the configuration thereof in the embodiment shown in FIG. 2. In the twenty-fourth modification which has this structure, after the tag inserter 226 has attached the RFID tag Tg to the attaching part 200B1 of the first tape 200B-24 of this structure, the adhesive layer 200Aa of the second tape 200A-24 and the adhesive layer 200Ba of the first tape 200B-24 are bonded by the bonding rollers 225A and 225B, and the produced base tape 210-24 is wound on the reel member 215a. The tag tape roll in which is wound the base tape 210-24 provided with the RFID circuit elements To at predetermined regular intervals in the tape lengthwise direction is thus manufactured.

In the twenty-fourth modification which has the above structure, the difference in circumferential length occurring when the base tape 210-24 is wound in a roll shape is absorbed and the generation of wrinkles is preemptively prevented by contracting the part on the inner side in the diameter direction using the elasticity (contractility) of the tape base layer 200Bb of the first tape 200B-24.

In a twenty-fifth modification shown in FIG. 32, for example, the second tape 200A-25 has a three-layer structure configured by the tape base layer 200Ab, adhesive layer 200Ac, and separator layer 200Ad. Furthermore, the first tape 200B-25 has the same structure as the twenty-fourth modification, and the configuration of the RFID tag Tg is the same as the configuration thereof in the embodiment shown in FIG. 2. In the twenty-fifth modification which has this structure, after the tag inserter 226 has attached the RFID tag Tg to the attaching part 200B1 of the first tape 200B-25 of this structure, the tape base layer 200Ab of the second tape 200A-25 and the adhesive layer 200Ba of the first tape 200B-25 are bonded by the bonding rollers 225A and 225B, and the produced base tape 210-25 is wound on the reel member 215a. The tag tape roll in which is wound the base tape 210-25 provided with the RFID circuit elements To at predetermined regular intervals in the tape lengthwise direction is thus manufactured.

In the twenty-fifth modification which has the above structure, the difference in circumferential length occurring when the base tape 210-25 is wound in a roll shape is absorbed and the generation of wrinkles is preemptively prevented by contracting the part on the inner side in the diameter direction using the elasticity (contractility) of the tape base layer 200Bb of the first tape 200B-25.

In a twenty-sixth modification shown in FIG. 33, for example, the second tape 200A-26 has a two-layer structure configured by an adhesive layer 200Ac, and separator layer 200Ad. Furthermore, the first tape 200B-26 has the same structure as the twenty-fourth and twenty-fifth modifications, and the configuration of the RFID tag Tg is the same as the configuration thereof in the embodiment shown in FIG. 2. In the twenty-sixth modification which has this structure, after the tag inserter 226 has attached the RFID tag Tg to the attaching part 200B1 of the first tape 200B-26 of this structure, the adhesive layer 200Ac of the second tape 200A-26 and the adhesive layer 200Ba of the first tape 200B-26 are bonded by the bonding rollers 225A and 225B, and the produced base tape 210-26 is wound on the reel member 215a. The tag tape roll in which is wound the base tape 210-26 provided with the RFID circuit elements To at predetermined regular intervals in the tape lengthwise direction is thus manufactured.

In the twenty-sixth modification which has the above structure, the difference in circumferential length occurring when the base tape 210-26 is wound in a roll shape is absorbed and the generation of wrinkles is preemptively prevented by contracting the part on the inner side in the diameter direction using the elasticity (contractility) of the tape base layer 200Bb of the first tape 200B-26.

In a twenty-seventh modification shown in FIG. 34, for example, the second tape 200A-27 has a four-layer structure configured by an adhesive layer 200Aa, tape base layer 200Ab, adhesive layer 200Ac, and separator layer 200Ad. On the other hand, the first tape 200B-27 has a three-layer structure configured by a tape base layer 200B formed of an elastic material, adhesive layer 200Bc, and a transfer sheet (receptor sheet) 200Bh' configured by a transfer base layer 200Bf and transfer layer 200Bg'. Note that the configuration of the RFID tag Tg is the same as the configuration thereof in the embodiment shown in FIG. 2.

In the twenty-seventh modification which has this structure, a tag tape roll manufacturing apparatus is used which has the tag inserter 226, tag checker 270, and tape supporting member 274 disposed on the second tape 200A side similar to the twenty-third modification. That is, after the tag inserter 226 has attached the RFID tag Tg to the attaching part 200A1 of the second tape 200A-27 of this structure, tape base layer 200Bb of the first tape 200B-27 and the adhesive layer 200Aa of the second tape 200A-27 are bonded by the bonding rollers 225A and 225B, and the produced base tape 210-27 is wound on the reel member 215a. The tag tape roll in which is wound the base tape 210-27 provided with the RFID circuit elements To at predetermined regular intervals in the tape lengthwise direction is thus manufactured.

In the twenty-seventh modification which has the above structure, the difference in circumferential length occurring when the base tape 210-27 is wound in a roll shape is absorbed and the generation of wrinkles is preemptively prevented by contracting the part on the inner side in the diameter direction using the elasticity (contractility) of the tape base layer 200Bb of the first tape 200B-27.

The following describes the second embodiment of the present disclosure with reference to accompanying drawings. Although the present embodiment does not have an elastic layer formed of elastic material in either the first tape or second tape, for the suitable imparting of tension on the first tape, which absorbs the difference in circumferential length and prevents the generation of wrinkles via the elasticity of an elastic layer possessed by at least one of the first tape and second tape of the previously described first embodiment, the present embodiment does prevent the generation of wrinkles by contracting the part on the inner side in the diameter direction using the elasticity (contractility) normally inherent to the first tape by imparting tension on the first tape (or imparting a larger tension on the first tape than the second tape). That is, tension is invariably imparted on the first tape (or tension is imparted on the first tape which is greater than that imparted on the second tape).

The structure of the tag tape roll manufacturing apparatus of the present embodiment is identical to that of the first embodiment shown in FIG. 1, and further description is therefore omitted.

FIG. 35 is a conceptual side view showing the condition when bonding the second tape 200A and first tape 200B with the RFID tag Tg interposed therebetween in the present embodiment, and this drawing corresponds to the previously mentioned FIG. 2 and the like. Note that parts similar to parts in FIG. 2 have the same reference number, and are not described further.

In FIG. 35, the second tape 200A has a two-layer structure in this example, and is configured by sequentially laminating a separator layer 200Ad' and an adhesive layer 200Ac formed of a suitable adhesive from the side (top side in the drawing) wound on the outer side of the second taper roll 211 toward the opposite side (bottom side in the drawing). Note that this embodiment differs from the first embodiment in that the separator layer 200Ad' is not configured by an elastic material.

The first tape 200B has a four-layer structure in this example, and is configured by sequentially laminating an adhesive layer 200Ba formed of a suitable adhesive, tape base layer 200Bb', adhesive layer 200Bc formed of suitable adhesive, and separator layer 200Bd from the side (top side in the drawing) wound on the outer side toward the opposite side (bottom side in the drawing). Note that this embodiment differs from the first embodiment in that the tape base layer 200Bb' is not configured by an elastic material. Further, the separator layer 200Bd is ultimately wound on the reel member 217a and collected as the separator roll 217.

The base tape 210 has an eight-layer structure in this example configured by reeling out and removing the separator layer 200B from the reel member 217a as described above after the RFID tag Tg has been inserted and disposed between the second tape 200A which has a two-layer structure and the first tape 200B which has a four-layer structure. That is, the base tape 210 is configured by laminating sequentially from the side wound on the outer side of the reel member 215a (top side in FIG. 35) toward the opposite side (bottom side in FIG. 35) a separator layer 200Ad', adhesive layer 200Ac, antenna base 160, tag side antenna 152, IC chip holding member 161, adhesive layer 200Ba, tape base layer 200Bb', and adhesive layer 200Bc.

FIG. 36 is a flow chart showing the control sequence executed by the controller 230 of the present embodiment, and corresponds to the previously described FIG. 3. Note that sequences similar to sequences in FIG. 3 have the same reference number, and are not described further.

Aspects of FIG. 36 which differ from FIG. 3 are the addition of steps S507 and S547 in the sequence for tension control which imparts a pulling direction tension on the first tape 200B after the tape drive has started in steps S505 and S545. That is, when the operation of winding the base tape 210 on the reel member 215a is completed in step S501, then in step S505 the feeding rollers 219A and 219B are driven and the second tape 200A and the first tape 200B are fed out from the second tape roll 211 and the first tape roll 213. With this arrangement, the second tape 200A is fed out from the second tape roll 211 and the first tape 200B is fed out from the first tape roll 213 and bonded together as a single unit by the bonding rollers 225A and 225B, and fed to the feeding rollers 219A and 19B side.

Then, in step S507 the motor speed of the second and first tape shaft driving motors 212 and 214, and the base tape shaft driving motor 216 and separator shaft driving motor 218 are controlled, and the tension arms 267A-D are rotated by the air cylinders 262A-D to perform tension control of the tension of the tapes 200A, 200B, 209, and 210 to suitable values during the tape feeding time calculated from the angle of the tension arms 267A-D detected by the angle sensors 268A-D (hereinafter referred to as "tape tension control during driving"). In the present embodiment, the pulling direction tension added to the first tape 200B is controlled to a suitable value (a value suitable for expanding the first tape 200B by $2\pi t$ only) so that the circumferential length of the first tape 200B is lengthened from $2\pi(R1-t)$ to $2\pi R1$ (refer to the previously described FIG. 4). Note that although the first tape 200B does not have an elastic layer formed of elastic material in the present embodiment, the tension is controlled so that the length is increased by the stated amount only by using the normal inherent elasticity of the first tape 200B. Note that the tape tension control during driving is always performed when driving tapes.

The subsequent steps S510 through S545 are identical to those described in FIG. 3, in which the tape drive is stopped when the RFID tag Tg reaches the insertion position via this tape drive, the tag checker 270 determines whether or not the RFID circuit element To is normal, and when normal the tag inserter 226 attaches the RFID tag Tg to the attaching part 200B1 of the first tape 200B. Then the feeding rollers 219A and 219B are driven and the second tape 200A and first tape 200B are driven and fed out from the second tape roll 211 and first tape roll 213.

Subsequently, in step S457 the pulling direction tension added to the first tape 200B is controlled to a suitable value (a value suitable to lengthen the first tape 200B by amount $2\pi t$ only) as in step S507. The subsequent steps S550 through S575 are identical to those of FIG. 3.

Note that the present disclosure is not limited to the procedure shown in the flow above, inasmuch as the procedure of the flow may be modified within a range that does not depart from the technical ideas and spirit of the disclosure, for example, the sequence of steps S570 and S575 may be reversed and the like.

In the present embodiment which has this structure, the base tape 210 is configured by the first tape 200B which includes a tape base layer 200Bb' for the disposition of the RFID tag Tg adhered to the second tape 200A in a state in which the tension in the pulling direction has been added beforehand to the first tape 200B. The base tape 210 is then wound on the reel member 215a so that the first tape 200B configures the inner side in the diameter direction under the action of stress in the contraction direction via the added tension in the pulling direction. With this arrangement, the first tape 200B can be contracted by the part on the inner side in the diameter direction using the normal elasticity (contractility) of the first tape 200B. As a result, a difference in the circumferential length can be absorbed and the generation of wrinkles can be preemptively prevented even when a difference in the circumferential length occurs between one side (outer side in the roll diameter direction) and the other side (inner side in the roll diameter direction) in the thickness direction due to the curvature of the roll. According to the present embodiment, the orderliness of the base tape 210, base tape roll 215, and the RFID label produced using the tape and roll can thus be maintained.

Note that although the tension control adds tension in the pulling direction of the first tape 200B as described above, the disclosure is not limited to this arrangement inasmuch as tension may be added to both the first tape 200B and the second tape 200A to provide a tension difference between the tension added to the first tape 200B and the tension added to the second tape 200A. In this case the tension added to the first tape 200B is greater than the tension added to the second tape 200A, and is controlled to a suitable value to lengthen the first tape 200B to be longer than the second tape 200A by the amount $2\pi t$ only. In this case as well, similar advantages to those of the second embodiment are provided.

Tension control for reducing the tension in the pulling direction may be performed as the position in the diameter direction of the roll become farther from the center in the diameter direction, and tension control for increasing tension in the pulling direction may be performed as the thickness of the first tape 200B becomes greater in the present embodiment, similar to the previously described first embodiment.

Note also that the present disclosure is not limited to the layer structure described in the second embodiment, and may be applied to various layer structures insofar as the structure is within a range that does not depart from the technical ideas and spirit of the disclosure. For example, at least one of the separator layer 200Ad' and tape base layer 200Bb' may be configured of an elastic material as in the structure shown in FIG. 2 of the first embodiment, and a base tape may also be manufactured using the tapes that have the layer structures of the first through twenty-seventh modifications shown in FIGS. 5-13, 15-17, 19-21, and 23-34 of the first embodiment. Furthermore, the elastic layers (separator layer 200Ad, tape base layer 200Bb, tape base layer 200) configured of elastic material in each of the modifications may also be applied in the case of layer structures configured of normal, non-elastic materials. In this case the effects of the first embodiment and the effects inherent to each modification can be obtained in addition to the effects of the present embodiment.

Although the generation of wrinkles is prevented by imparting tension on the first tape (or imparting a tension to the first tape which is greater than the tension of the second tape) or providing an elastic layer configured of elastic material in at least one of the first tape and second tape in the first embodiment and second embodiment which have been described above, the present inventors have discovered that the generation of wrinkles can be suppressed and the orderliness of the tape, roll, or label can be maintained by also setting the dimension in the thickness direction of the tape of the antenna, IC circuit part, and tape base at appropriate values. The detailed content is described below in the third embodiment.

The following describes the third embodiment of the present disclosure with reference to accompanying drawings.

FIG. 37 is a conceptual diagram showing an overall general structure of the tag tape roll manufacturing apparatus according to the present embodiment, and corresponds to FIG. 1 described above. FIG. 38 is a conceptual side view showing the condition the first tape 200B and the second tape 200A are bonded with the RFID tag Tg interposed therebetween in the present embodiment, and corresponds to FIGS. 2 and 5 above. Note that parts in FIGS. 1, 2, and 5 similar to parts in FIGS. 37 and 38 have the same reference number, and are not described further.

In FIGS. 37 and 38 the second tape 200A has a four-layer structure similar to FIG. 5 configured by sequentially laminating a separator layer 200Ad, adhesive layer 200Ac formed of a suitable adhesive, tape base layer 200Ab, and adhesive layer 200Aa. The first tape 200B also has a four-layer structure similar to FIG. 5 configured by sequentially laminating an adhesive layer 200Ba formed of a suitable adhesive, tape base layer 200Bb formed of an elastic material, adhesive layer 200Bc formed of a suitable adhesive, and separator layer 200Bd.

The RFID tag Tg has a structure similar to the previously described FIG. 5 configured by a substantially sheet-like antenna base (antenna pattern sheet) 160, and an IC chip holding member 161 which is disposed on the back side (bottom side in FIG. 2) of the antenna base 160 and is provided with a tag side antenna 152 for transmitting and receiving information, and an IC circuit part 151 (not shown in the drawing) for storing updatable (rewritable) information so as to connect to the tag side antenna 152.

In the present embodiment, the dimensions in the thickness direction of the tape of the tape base layer 200Bb, IC chip holding member 161 of the RFID tag Tg, tag side antenna 152 of the RFID tag Tg, and antenna base 160 of the first tape 200B are configured to be a value within a range which satisfies a suitable relationship (details to follow).

The tag tape roll manufacturing apparatus prepares a base tape 210 and manufactures a base tape roll 215 in which the base tape 210 is wound by bonding the second tape 200A and first tape 200B which have the structures described above, inserting an RFID tag Tg which has the above mentioned structure provided with an RFID circuit element To interposed between the two tapes in a direction so that the IC chip holding member 161 protrudes from the side that becomes the outer side (left side in the enlargement of FIG. 37, top side in FIG. 38) when wound up in a roll relative to the antenna base 160. Note that in other aspects the structure of the tag tape roll manufacturing apparatus is identical to the first embodiment described above.

When preparing an RFID label T using the base tape roll 215 which has been manufactured in the manner described above, the label may be prepared using, for example, a cartridge with the built-in base tape roll 215, by installing the cartridge in a tag label producing apparatus.

FIG. 39 is an illustration showing an example of the structure of such an RFID circuit element cartridge. The RFID circuit element cartridge 100 shown in FIG. 39 is provided with a housing 100A, first roll 102 in which a base tape 210 is wound in a narrow strip disposed within the housing 100A (similar to the base tape roll 215 above), second roll 104 in which is wound a transparent cover film 103 which has the same width as the base tape 210, ribbon supply side roll 111 for feeding out an ink ribbon 105 (thermal transfer ribbon; and which is unnecessary when the cover film is a thermal tape), ribbon take-up roller 106 for winding up the printed ribbon 105, tag label tape 110 with print which is configured by pressing and affixing the base tape 210 together with the cover film 103, and a pressure roller 107 for feeding the tape in the arrow A direction (functioning as a tape feeding roller).

The second roll 104 has the cover film 103 wound around a reel member 104a. The cover film 103 which is fed out from the second roll 104 is configured so that the ribbon 105 which is driven by the ribbon take-up roller 106 and the ribbon supply side roll 111 disposed on the back side (that is, the side to be adhered to the base tape 210) thereof contacts the back surface of the cover film 103 by pressing by a print head 10 of the tag label producing apparatus (the entirety of which is omitted from the drawing.

The ribbon take-up roller 106 and pressure roller 107 are driven in rotation by transmitting the driving force of a cartridge motor (not shown in the drawing) provided on the tag label producing apparatus side (for example, a pulse motor) to a ribbon take-up roller driving shaft 11 and tape feeding roller driving shaft 12.

In the cartridge 100 configured as described above, the base tape 210 fed out from the first roll 102 is supplied to the pressure roller 107. On the other hand, the cover film 103 fed out from the second roll 104 is configured so that the ink ribbon 105 which is driven by the ribbon take-up roller 106 and the ribbon supply side roll 111 disposed on the back side (that is, the side to be adhered to the base tape 210) thereof contacts the back surface of the cover film 103 by pressing by the print head 10.

Then, when the cartridge 100 is installed in the cartridge holder part of the label producing apparatus and the roll holder (not shown in the drawing) moves to the contact position from the removed position, the cover film 105 and ink ribbon 105 are interposed between the print head 10 and platen roller 108, and the base tape 210 and cover film 103 are interposed between the pressure roller 107 and a sub-roller 109. Subsequently, the ribbon take-up roller 106 and the pressure roller 107 are synchronously rotationally driven along the directions denoted by the arrow B and the arrow D, respectively, by the driving force provided from the cartridge motor 23. Furthermore, the feeding roller driving shaft 12, the sub-roller 109, and the platen roller 108 are connected to one another by a gear (not shown). With such an arrangement, upon driving the feeding roller driving shaft 12, the pressure roller 107, the sub-roller 109, and the platen roller 108 rotate, thereby feeding out the base tape 101 from the first roll 102 to the pressure roller 107 as described above. On the other hand, the cover film 103 is fed out from the second roll 104, and a plurality of heating elements of the print head 10 are powered by the print-head driving circuit 25. As a result, the print R is printed on the back surface of the cover film 103. Then, the base tape 211 is adhered to and integrated with the cover film 103, on which the print R has been printed, by the pressure roller 107 and sub-roller 109 to form a tag label tape 110 with print which is delivered to the outside of the cartridge 100, as indicated by an arrow C. Subsequently, the ribbon take-up roller driving shaft 11 is driven to take up the ink ribbon 105, which has been used to print the print on the cover film 103, onto the ribbon take-up roller 106.

Then, after information is transmitted and received via wireless communication from an antenna (not shown in the drawing) provided on the tag label producing apparatus side to the IC circuit part 151 of the RFID circuit element To provided in the tag label tape with print 110 fed out from the cartridge 100, a cutter (not shown in the drawing) provided on the tag label producing apparatus side cuts the tape at a set length to produce an RFID label T.

FIGS. 40A and 40B are diagrams which show an example of the outer appearance of an RFID label T cut from the tag label tape 109 with print after the RFID circuit element To information writing (or reading) as described above. FIG. 40A is a top view, and FIG. 40B is a bottom view. FIG. 41 shows the cross section view on the XXXXI-XXXXI' cross section of FIG. 40 rotated 90 degrees in the clockwise direction. Note that FIG. 41 conceptually shows the layer structure, and actually the disposed parts of the RFID tag Tg are somewhat expanded in shape in the tape thickness direction from the thickness of the RFID tag Tg as shown in FIG. 42 which follows.

In FIGS. 40A, 40B, and FIG. 41, the RFID label T has an eight-layer structure in which the cover film 103 has been added to the seven-layer structure base tape 210 shown in the previously described FIG. 38 (omitting the RFID tag Tg), and is configured by eight layers sequentially from the cover film 103 side (top side in FIG. 41) toward the opposite side (bottom side in FIG. 41) which include the cover film 103, adhesive layer 200Bc, tape base layer 200Bb, adhesive layer 200Ba, adhesive layer 200Aa, tape base layer 200Ab, adhesive layer 200Ac, and separator layer (separation sheet) 200Ad. Then, the RFID tag Tg which is configured by the antenna base 160, tag side antenna 152, and IC chip holding member 161 as described above is provided between the adhesive layer 200Ba and the adhesive layer 200Aa, and print R (in this example, the letters "RF-ID" representing the type of RFID label T) is printed on the back surface of the cover film 103.

In the above basic structure, the characteristics of the present embodiment suppress the generation of wrinkles by setting the dimensions in the tape thickness direction of the tape base (tape base layer 200Bb), IC circuit part (in the present embodiment, IC chip holding member 161), and antenna (tag side antenna 152 and antenna base 160) to values which satisfy a suitable relationship which is described below. A detailed description follows.

FIG. 42 is a cross sectional view of the base tape 210 on the XXXXII-XXXXII' cross section of FIG. 37. As shown in FIG. 42, the dimension in the tape thickness direction of the tape base layer 200Bb (referred to as "tape base thickness" hereinafter) is designated $t_j$, the dimension in the tape thickness direction of the antenna base 160 and tag side antenna 152 of the RFID tag Tg (referred to as "antenna thickness" hereinafter) is designated $t_a$, and the dimension in the tape thickness direction of the IC chip holding member 161 (referred to as "IC chip thickness" hereinafter) is designated $t_i$.

As shown in FIG. 42, the dimension in the thickness direction of the entire tape is greater at the disposition part of each RFID tag Tg in the base tape 210 compared to the part in which RFID tag Tg is not disposed inasmuch as the part surrounding the RFID tag Tg (tape base layer 200Bb and the like) becomes curved and extended in the thickness direction so as to detour around the RFID tag Tg. There is a tendency for wrinkles to be easily generated in the parts of the tag tape as the degree of the curvature increases due to the detour around the RFID tag Tg, in other words, as the proportion of the dimension in the thickness direction of the entire tape decreases relative to the dimension in the thickness direction of the RFID tag Tg (antenna thickness $t_a$+IC chip thickness $t_i$).

The present inventors evaluated the presence/absence of wrinkles in many cases by changing the thickness of the RFID tag Tg while changing the combination of the IC thickness $t_i$ and antenna thickness $t_a$, and changing the thickness of the entire tape by changing the tape base thickness, that is, the thickness of the base tape 200Bb relative to these combinations. Note that the evaluation test was conducted with the total antenna thickness $t_a$ and IC chip thickness $t_i$ (that is, the thickness of the RFID tag Tg) within a range of less than 300 µm, and the antenna thickness $t_a$ within a range of less than 150 µm. The planar dimensions of the IC chip holding member 161 used at this time was approximately 1.5×1.5–2×3 mm, and the planar dimension of the antenna base 160 was approximately 15×18–24×44 mm.

FIG. 43 is a table showing the lower limit values of the tape base thickness $t_j$ relative to the combinations of the IC chip thickness $t_i$ and antenna thickness $t_a$ extracted from the cases in which no wrinkles were generated among the many cases subjected to the evaluation test. As shown in the Table, the lower limit value of the tape base thickness $t_j$ was 50 µm in the range in which wrinkles were not generated in case 1 (antenna thickness $t_a$=50 µm; IC chip thickness $t_i$=220 µm), the lower limit value of the tape base thickness $t_j$ was 50 µm in the range in which wrinkles were not generated in case 2 (antenna thickness $t_a$=60 µm; IC chip thickness $t_i$=210 µm), the lower limit value of the tape base thickness $t_j$ was 60 µm in the range in which wrinkles were not generated in case 3 (antenna thickness $t_a$=100 µm; IC chip thickness $t_i$=170 µm), and the lower limit value of the tape base thickness $t_j$ was 80 µm in the range in which wrinkles were not generated in case 4 (antenna thickness $t_a$=150 µm; IC chip thickness $t_i$=150 µm).

From these results the present inventors observed the proportion of the tape base thickness $t_j$ ($t_j/(t_a+t_i)$) relative to the total of the antenna thickness $t_a$ and IC chip thickness (that is, the thickness of the RFID tag Tg), and discovered that the generation of wrinkles can be prevented if this value is 0.15 or greater when the allowance value obtained by the inventors in the test is subtracted from the 0.19 minimum value since this value was 0.19 in case 1, 0.19 in case 2, 0.22 in case 3, and 0.27 in case 4.

On the other hand, the base tape 210 is wound in a roll shape in the tag tape roll manufacturing apparatus when manufacturing a roll as described above, and fed from the roll and turned through a feeding path in the tag label producing apparatus when producing a RFID label. Therefore, when the thickness of the entire tape becomes excessively large, the rigidity also becomes excessive and the operation of winding the roll shape and turning in the feeding path becomes difficult.

From the results of various investigations conducted by the inventors, the maximum value of the tape base thickness $t_j$ at which the base tape 210 can be wound into a roll was 200 µm when the total of the antenna thickness $t_a$ and IC chip thickness $t_i$ (that is, the thickness of the RFID tag Tg) was 270 µm. This time the value of the proportion ($t_j/(t_a+t_i)$) of the tape base thickness $t_j$ relative to the total of the antenna thickness $t_a$ and IC chip thickness $t_i$ was 200/270≈0.74. Therefore, excessive rigidity can be prevented and winding and feeding can be performed smoothly by increasing the dimension in the thickness direction by setting the proportion of the tape base thickness $t_j$ at less than 0.74 relative to the total of the antenna thickness $t_a$ and IC chip thickness $t_i$.

According to the present embodiment, it is possible to realize an RFID label T and base tape 210 which are usable in practice and make it difficult for wrinkles to generate by setting the value of the proportion of the tape base thickness $t_j$ relative to the total of the antenna thickness $t_a$ and IC chip thickness $t_i$ at 0.15 or higher but less than 0.74.

Note that from the results of the investigations by the present inventors the winding of the roll of the base tape 210 can be performed optimally when the tape base thickness tj is less than 100 µm. This time the value of the proportion (tj/(ta+ti)) of the tape base thickness tj relative to the total of the antenna thickness ta and IC chip thickness ti was 100/270≈0.37. Therefore, it is possible to realize an RFID label T and base tape 210 of even greater quality and make it difficult for wrinkles to generate by setting the value of the proportion (tj/(ta+ti)) of the tape base thickness tj relative to the total of the antenna thickness ta and IC chip thickness ti at 0.15 or higher but less than 0.37.

From these results shown in FIG. 43 the present inventors also observed the proportion (tj/ta) of the tape base thickness tj relative to the total of the antenna thickness ta, and discovered that the generation of wrinkles can be prevented if this value is 0.50 or greater when the allowance value obtained by the inventors in the test is subtracted from the 0.53 minimum value since this value was 1.0 in case 1, 0.83 in case 2, 0.60 in case 3, and 0.53 in case 4.

On the other hand, the base tape 210 is wound in a roll shape in the tag tape roll manufacturing apparatus when manufacturing a roll as described above, and fed from the roll and turned through a feeding path in the tag label producing apparatus when producing an RFID label. Therefore, when the thickness of the entire tape becomes excessively large, the rigidity also becomes excessive and the operation of winding the roll shape and turning in the feeding path becomes difficult.

From the results of various investigations conducted by the inventors, the maximum value of the tape base thickness tj at which the base tape 210 can be wound into a roll was 200 µm when the antenna thickness ta was 50 µm. This time the value of the proportion (tj/ta) of the tape base thickness tj relative to the antenna thickness ta was 200/50=4. Therefore, excessive rigidity can be prevented and winding and feeding can be performed smoothly by increasing the dimension in the thickness direction by setting the proportion of the tape base thickness tj at less than 4.0 relative to the antenna thickness ta.

According to the present embodiment, it is possible to realize an RFID label T and base tape 210 which are usable in practice and make it difficult for wrinkles to generate by setting the value of the proportion (tj/ta) of the tape base thickness tj relative to the total of the antenna thickness ta at 0.50 or higher but less than 4.0.

Note that from the results of the investigations by the present inventors the winding of the roll of the base tape 210 can be performed more optimally when the tape base thickness tj is less than 100 µm. This time the value of the proportion (tj/ta) of the tape base thickness tj relative to the antenna thickness ta was 100/50=2.0. Therefore, it is possible to realize an RFID label T and base tape 210 of even greater quality and make it difficult for wrinkles to generate by setting the value of the proportion of the tape base thickness tj (tj/ta) relative to the antenna thickness ta at 0.50 or higher but less than 2.0.

From these results shown in FIG. 43 the present inventors also observed the proportion (tj/ti) of the tape base thickness tj relative to the IC chip thickness ti, and discovered that the generation of wrinkles can be prevented if this value is 0.20 or greater when the allowance value obtained by the inventors in the test is subtracted from the 0.23 minimum value since this value was 0.23 in case 1, 0.24 in case 2, 0.35 in case 3, and 0.53 in case 4.

On the other hand, the base tape 210 is wound in a roll shape in the tag tape roll manufacturing apparatus when manufacturing a roll as described above, and fed from the roll and turned through a feeding path in the tag label producing apparatus when producing an RFID label. Therefore, when the thickness of the entire tape becomes excessively large, the rigidity also becomes excessive and the operation of winding the roll shape and turning in the feeding path becomes difficult.

From the results of various investigations conducted by the inventors, the maximum value of the tape base thickness tj at which the base tape 210 can be wound into a roll was 200 µm when IC chip thickness ti was 220 µm. This time the value of the proportion (tj/ti) of the tape base thickness tj relative to the IC chip thickness ti was 200/220≈0.91. Therefore, excessive rigidity can be prevented and winding and feeding can be performed smoothly by increasing the dimension in the thickness direction by setting the proportion of the tape base thickness tj at less than 0.91 relative to the IC chip thickness ti.

According to the present embodiment, it is possible to realize an RFID label T and base tape 210 which are usable in practice and make it difficult for wrinkles to generate by setting the value of the proportion (tj/ti) of the tape base thickness tj relative to the IC chip thickness ti at 0.20 or higher but less than 0.91.

Note that from the results of the investigations by the present inventors the winding of the roll of the base tape 210 can be performed more optimally when the tape base thickness tj is less than 100 µm. This time the value of the proportion (tj/ti) of the tape base thickness tj relative to the IC chip thickness ti was 100/220≈0.45. Therefore, it is possible to realize an RFID label T and base tape 210 of even greater quality and make it difficult for wrinkles to generate by setting the value of the proportion of the tape base thickness tj (tj/ti) relative to the IC chip thickness ta at 0.20 or higher but less than 0.45.

In the present embodiment which has the above structure, the influence of an increase in dimension caused by the RFID tag Tg at the disposition position of the RFID tag Tg can be reduced and the generation of wrinkles can be prevented by setting the proportion of the tape base thickness tj which is the dimension (ta+ti) in the thickness direction of the tape base layer 200Bb at 0.15 or higher relative to the dimension in the thickness direction of the RFID tag Tg (total of the antenna thickness ta and the IC chip thickness ti), and relatively increasing the thickness of the entire base tape body relative to the RFID tag Tg.

On the other hand, the base tape 210 which has a laminate structure provided with the tape base layer 200Bb is wound in a roll shape when manufacturing a roll, and fed from the roll and turned through a feeding path in the tag label producing apparatus when producing an RFID label. Therefore, when the thickness of the entire tape becomes excessively large, the rigidity also becomes excessive and the operation of winding the roll shape and turning in the feeding path becomes difficult. In the present embodiment, therefore, excessive rigidity can be prevented and winding and feeding can be performed smoothly by increasing the dimension in the thickness direction by setting the proportion of the tape base thickness tj at less than 0.74 relative to the dimension in the thickness direction of the RFID tag Tg (total of the antenna thickness ta and IC chip thickness ti) ta+ti.

As a result, in the present embodiment it is possible to realize a base tape which is usable in practice and makes it difficult for wrinkles to generate by setting the proportion of the dimension tj in the thickness direction of the tape base layer 200Bb relative to the dimension ta+ti in the thickness direction of the RFID tag in a suitable range. According to the present embodiment the orderliness of the base tape 210, base tape roll 215, and the RFID label produced using the tape and roll can thus be maintained.

In the present embodiment, the influence of an increase in dimension caused by the RFID tag Tg at the disposition position of the RFID tag Tg can be reduced and the generation of wrinkles can be prevented by setting the proportion of the tape base thickness tj at 0.50 or higher relative to the antenna thickness ta of the RFID tag Tg, and relatively increasing the thickness of the tape base layer 200Bb relative to antenna base 160 and tag side antenna 152 of the RFID tag Tg. On the other hand, excessive rigidity caused by the increase in the dimension in the thickness direction can be prevented and winding and feeding can be performed smoothly by setting the proportion of the tape base thickness tj at less than 4.0 relative to the antenna thickness ta of the RFID tag Tg.

As a result, in the present embodiment it is possible to realize a base tape which is usable in practice and makes it difficult for wrinkles to generate by setting the proportion of the tape base thickness tj in a suitable range relative to the antenna thickness ta of the RFID tag. According to the present embodiment the orderliness of the base tape 210, base tape roll 215, and the RFID label produced using the tape and roll can thus be maintained.

The present embodiment also particularly configures the tape base layer 200Bb of elastic material. With this arrangement, the difference in circumferential length can be absorbed by contracting the part on the inner side in the diameter direction using the elasticity of the elastic material of the tape base layer 200Bb even though a difference occurs in the circumferential length between the inner side in the diameter direction and the outer side in the diameter direction due to the curvature of the roll when the base tape 210 has been wound as the base tape roll 215. As a result the effect of preventing the generation of wrinkles is further increased because the generation of wrinkles base tape 210 caused by differences of circumferential length can be prevented.

In the present embodiment the IC chip holding member 161 (IC circuit part 151) is particularly disposed so as to protrude from the side which becomes the outer side when winding the roll relative to the antenna base 160. In this case generally when the base tape has been wound around the shaft as a base tape roll, the curvature of the base tape increases (the degree of the curve becomes tighter) closer on the inner diameter side of the roll, and the curvature of the base tape decreases closer on the outer diameter of the roll (the degree of the curve becomes looser). When the thickness of the base tape changes, the change in the thickness of the tape has less influence on the entire tape when the curvature of the base tape is small rather than when the curvature is large. In the base tape 210 of the present embodiment, the IC chip holding member 161 (IC circuit part 151) is disposed so as to protrude from the side which becomes the outer side when winding the roll relative to the antenna base 160 as described above. With this arrangement, the IC chip holding member 161 (IC circuit part 151) can be disposed on the outer diameter side of the roll which has a relatively small curvature, and as a result the thickness of the IC chip holding member 161 (IC circuit part 151) has less influence on the change in the tape thickness. The effect of preventing the generation of wrinkles is therefore obtained with this arrangement when winding the roll.

Furthermore, in the present embodiment the IC chip holding member 161 (IC circuit part 151) is particularly disposed so as to protrude from the opposite side from the tape base layer 200Bb which is formed of elastic material. The effect of preventing the generation of wrinkles is therefore obtained with this arrangement when winding the roll.

Note that the present disclosure is not limited to the layer structure described in the third embodiment above, inasmuch as the disclosure is applicable to various structures within a range that does not depart from the technical ideas and spirit of the disclosure. For example, the layer structure shown in FIG. 2 of the previously described first embodiment, and the layer structures of the first through twenty-seventh modifications of the first embodiment shown in FIGS. 5-13, 15-17, 19-21, and 23-34 may also be used. In this case it is desirable that the RFID tag Tg is disposed so that the IC chip holding member 161 faces in a direction to protrude from the side (top side in FIG. 38) which becomes the outer circumference side when winding the roll relative to the antenna base 160. In this case the effects of the first embodiment and the effects inherent to each modification can be obtained in addition to the effects of the present embodiment.

Although wrinkles are prevented by setting the dimension in the tape thickness direction of the tape base (tape base layer 200Bb), IC circuit part (IC chip holding member 161), and antenna (tag side antenna 152 and antenna base 160) at a suitable value in the third embodiment described above, the present inventors have discovered that it is possible to suppress the generation of wrinkles and maintain the orderliness of the tape, roll, or label by setting the planar position of the IC circuit part at a suitable position relative to the antenna base. The detailed content is described below in the fourth embodiment.

The following describes the fourth embodiment of the present disclosure with reference to accompanying drawings.

The tag tap roll manufacturing apparatus, base tape 210, and base tape roll 215, and the structure of the RFID label T and the like produced using these tapes and rolls of the present embodiment are identical to the structures shown in FIGS. 37-41 of the third embodiment, and their description is therefore omitted.

In the above basic structure, the characteristics of the present embodiment suppress the generation of wrinkles by disposing the planar position of the IC circuit part (IC chip holding member 161 in the present embodiment) at a suitable position relative to the antenna base 160 as described above. A detailed description follows.

FIG. 44 shows the condition of feeding out the base tape 210 from the first roll 102 (similar to the base tape roll 215) in which the base tape 210 is wound in the RFID tag circuit element cartridge 100, and shows an enlarged diagram of the RGID tag Tg representing the positional relationship of the IC chip holding member 161 relative to the antenna base 160 in the RFID tag Tg of the present embodiment. Note that the illustration of the tag side antenna 152 is omitted in FIG. 44.

As shown in FIG. 44, the dimension in the lengthwise direction of the tape (lateral direction in FIG. 44) of the antenna base 160 which configures the RFID tag Tg is 2L, and the dimension in the width direction of the tape (vertical direction in FIG. 44) is 2M. Then the IC chip holding member 161 is disposed relative to the antenna base 160 so that the center position 160a of the antenna base 160 and the center position 161a of the IC chip holding member 161 deviate by a distance H only. In this case there is a distance Ha between the center position in the lengthwise direction of the tape of the IC chip holding member 161 and the center position in the lengthwise direction of the tape of the antenna base 160, and a distance Hb between the center position in the width direction of the tape of the IC chip holding member 161 and the center position in the width direction of the tape of the antenna base 160. Note that the distance Ha is a negative value in the feed out direction (left direction in FIG. 44) of the base tape, and a positive value in the opposite direction (right direction in FIG. 44) to the feed out direction.

In the present embodiment the IC chip holding member 161 is disposed to deviate relative to the antenna base 160 so that the values of the distance Ha and the distance Hb are within the range shown in FIG. 46. A detailed description follows.

The present inventors evaluated the presence/absence of wrinkles in many cases by changing the distance H between the center position 160*a* of the antenna base 160 and the center position 161*a* of the C chip holding member 161 while changing the combination of the distance Ha and the distance Hb for a plurality of RFID tags Tg which had different dimension 2M in the width direction of the tape and dimension 2L in the lengthwise direction of the tape of the antenna base 160. Note that the evaluation test was conducted when the RFID tag Tg was disposed so that the IC chip holding member 161 protruded from the outer side in the winding direction of the roll of the antenna base 160 as shown in FIG. 45A, and when the RFID tag Tg was disposed so that the IC chip holding member 161 protruded from the inner side in the winding direction of the roll of the antenna base 160 as shown in FIG. 45B. As a result, it was discovered that the generation of wrinkles can be suppressed when winding a roll if dimension in the lengthwise direction of the tape is such that the proportion of the distance Ha relative to the distance L is within a predetermined range, and the dimension in the width direction of the tape is such that the proportion of the distance Hb relative to the distance M is within a predetermined range.

FIG. 46 is a table showing the evaluation test results. Note that in this table the range in which the proportion (Ha/L) of the distance Ha relative to the distance L is a negative value indicates the case wherein the IC chip holding member 161 is disposed deviated a distance Ha in the feeding direction (left direction in FIG. 44) of the base tape as described above, and the range in which the proportion (Ha/L) is a positive value indicates the case wherein the IC chip holding member 161 is disposed deviated a distance Ha in the roll winding direction (right direction in FIG. 44) of the base tape.

As shown in FIG. 46, regarding the dimension in the lengthwise direction of the tape, the generation of wrinkles in the base tape 210 when winding the roll can be suppressed to the lowest limit if the proportion (Ha/L) of the distance Ha relative to the distance L is within a range of −0.2 or higher but less than 9 (where 0 is omitted). The generation of wrinkles in the base tape 210 when winding the roll can be even more effectively suppressed if the proportion Ha/L is within the range of greater than zero but less than 0.8. The generation of wrinkles in the base tape 210 when winding the roll can be even more effectively suppressed if the proportion Ha/L is within the range of 0.2 or higher but less than 0.7.

Regarding the width direction of the tape, the generation of wrinkles in the base tape 210 when winding the roll can be suppressed to the lowest limit if the proportion (Hb/M) of the distance Hb relative to the distance M is within a range of greater than zero but less than 0.9. The generation of wrinkles in the base tape 210 when winding the roll can be even more effectively suppressed if the proportion Hb/M is within the range of greater than zero but less than 0.5. The generation of wrinkles in the base tape 210 when winding the roll can be even more effectively suppressed if the proportion Hb/M is within the range of greater than zero but less than 0.3.

As a result, although there is an applicable value even when the RFID tag Tg is disposed so that the IC chip holding member 161 protrudes on either the inner side or outer side in the direction of winding the roll of the antenna base 160, the present inventors have discovered that the effect of suppressing the generation of wrinkles is greatest when the RFID tag Tg is particularly disposed so that the IC chip holding member 161 protrudes from the outer side in the winding direction of the roll of the antenna base 160.

According to the present modification which has the structure described above, an effect of suppressing the generation of wrinkles is obtained by disposing the IC chip holding member 161 relative to the antenna base 160 so that the center position 161*a* of the IC chip holding member 161 is separated by a predetermined distance H which satisfies the conditions shown in FIG. 46 relative to the center position 160*a* of the corresponding antenna base 160. Details are described below.

That is, in the present embodiment a base tape 210 has an adhesive layer 200Bc for bonding a cover film 103 on the inner side which becomes the inner side in the diameter direction when winding the roll and is wound in a roll shape so that the adhesive layer 200Bc of the base tape 210 being wound on the outer side in the diameter direction is in contact with the separator layer 200Ad on the outer side of the base tape 210 being wound on the inner side in the diameter direction when producing the RFID label T with print by bonding (so-called laminate type) the cover film 103 to the base tape 210 which is fed out from the base tape roll 102. Therefore, the adhesive layer 200Bc of the fed tape is fed out and separated from the separator layer 200Ad which is wound in a roll when the base tape 210 is fed out from the base tape roll 102. The thickness of the tape changes rapidly during this separation, and that part is readily susceptible to wrinkling.

In the present embodiment, the base tape can be configured so that the thickness of the tape thickness direction of each RFID tag in the lengthwise direction of the tape increases gradually in steps from the tape feeding side toward the roll core side direction, in the order of "antenna base" thickness, "antenna base+antenna" thickness, "antenna base+antenna+IC circuit part" thickness as shown in FIG. 45A, by deviating the disposition of the IC chip holding member 161 relative to the antenna base 160 as described above. As a result, the generation of wrinkles can be prevented because the separation does not rapidly change the tape thickness in the part in which the RFID tag Tg is disposed when the base tape 210 is separated and fed out from the base tape roll 102. According to the present embodiment the orderliness of the base tape 210, base tape roll 215, and the RFID label produced using the tape and roll can thus be maintained.

According the present embodiment an effect of preventing the generation of wrinkles can also be obtained by disposing the IC chip holding member 161 relative to the antenna base 160 so that, for example, the position in the lengthwise direction of the tape of the end on the tape feeding direction side of the IC chip holding member 161 is positioned on the opposite side from the tape feeding direction (roll core direction side) from the center position in the tape lengthwise direction of the antenna base 160. As previously described, since the planar dimensions of the IC chip holding member 161 used by the present inventors is approximately 1.5×1.5-2×3 mm, and the planar dimensions of the antenna base 160 is approximately 15×18-24×44 mm, it is possible to set the proportion (Ha/L) of the distance Ha relative to the distance L in a range of greater than zero but less than 0.8, or within a range of 0.2 or higher but less than 0.7 via this disposition.

In the present embodiment it is particularly desirable that the IC chip holding member 161 is disposed so as to protrude from the outer side in the roll winding direction of the antenna base 160. In this case generally when the base tape has been wound around the shaft as a base tape roll, the curvature of the base tape increases (the degree of the curve becomes tighter) closer on the inner diameter side of the roll, and the curvature of the base tape decreases closer on the outer diameter of the roll (the degree of the curve becomes looser). When the thickness of the base tape changes, the change in the thickness of the tape has less influence on the entire tape when the curvature of the base tape is small rather than when the curvature is large. In the base tape 210 of the present embodiment, the IC chip holding member 161 (IC circuit part 151) can be disposed on the outer diameter side of the roll which has a relatively small curvature and as a result there is a reduction of the influence of the change in tape thickness due to the thickness of the IC chip holding member 161 (IC circuit part 151) by disposing the IC chip holding member 161 (IC circuit part 151) so as to protrude from the outer side during roll winding relative to the antenna base 160. The effect of preventing the generation of wrinkles is thus increased further.

In the present embodiment, an effect of preventing the generation of wrinkles can be obtained particularly when the IC chip holding member 161 is disposed so as to protrude from the inner side in the roll winding direction of the antenna base 160. In this case although generally slack may occur on the inner side in the diameter direction and this may easily wrinkle due to the difference in circumferential length produced between the inner side in the diameter direction and the outer side in the diameter direction of the base tape caused by the curvature of the roll when manufacturing the base tape roll in which the base tape is wound around an axis, the generation of slack on the inner side in the diameter direction can be prevented when excess circumferential length is necessary to cover the thickness of the IC chip holding member 161 at the inner side in the diameter direction of the base tape 210 by disposing the IC chip holding member 161 so as to protrude on the inner side in the roll winding direction.

Note that the present disclosure is not limited to the layer structure described in the fourth embodiment above, inasmuch as the disclosure is applicable to various structures within a range that does not depart from the technical ideas and spirit of the disclosure. For example, the layer structure shown in FIG. 2 of the previously described first embodiment, and the layer structures of the first through twenty-seventh modifications of the first embodiment shown in FIGS. 5-13, 15-17, 19-21, and 23-34 may also be used. In this case it is desirable that the RFID tag Tg is disposed so that the IC chip holding member 161 protrudes from the side which becomes the outer side during roll winding relative to the antenna base 160 as shown in FIG. 38 and FIG. 45A. In this case the effects of the first embodiment and the effects inherent to each modification can be obtained in addition to the effects of the present embodiment.

Note that although the orderliness of the base tape 210, base tape roll 215, and RFID label produced using these tapes and rolls is maintained by preventing the generation of wrinkles in the first through fourth embodiments, the present inventors have discovered that the generation of interlayer separation of the first tape 200B and second tape 200A can be prevented by using adhesive which has a predetermined adhesion at a slow speed on the adhesive layers 200Aa and 200Ba which are adjacent to the RFID tag Tg, and orderliness of the tape, roll, and label can be maintained thereby. The detailed content is described below in the fifth embodiment.

The following describes the fifth embodiment of the present disclosure with reference to accompanying drawings.

The tag tap roll manufacturing apparatus, base tape 210, and base tape roll 215, and the structure of the RFID label T and the like produced using these tapes and rolls of the present embodiment are identical to the structures shown in FIGS. 37-41 of the third embodiment, and their description is therefore omitted.

In the above basic structure the characteristics of the present embodiment prevent interlayer separation of the first tape 200B and second tape 200A by using adhesive which has a predetermined adhesion at a slow speed on the adhesive layer 200Aa for fixing the RFID tag Tg on the tape base layer 200Ab, and on the adhesive layer 200Ba for fixing the RFID tag Tg on the tape base layer 200Bb as described above. A detailed description follows.

The present inventors conducted evaluation tests interlayer separation using various adhesives which had different adhesion at a slow speed on the adhesive layers 200Aa and 200Ba. The measurement of adhesion at a slow speed of the adhesives used at this time was performed based on the adhesive tape and adhesive sheet testing method of the Japan Industrial Standard (JIS Z0237). Specifically, adhesion at a slow speed was measured by affixing the adhesive which was the object being measured on an adhesive sheet measuring 160 mm in length by a single reciprocation using a 2 kg rubber roller opposite a stainless steel plate, folding back the sheet with the affixed adhesive to be parallel with the stainless steep plate, and measuring the resistance force when peeling back the folded sheet from the stainless steel plate at a speed of 5 mm/min.

The interlayer separation evaluation method was also conducted by affixing the RFID labels T which were produced using a plurality of adhesives which had different adhesion at a slow speed on the adhesive layers 200Aa and 200Ba to a cylinder that had curved surface with a curvature of φ25 mm and a cylinder that had a curved surface with a curvature of φ15 mm, and visually monitoring interlayer separation of the first tape 200B and second tape 200A after one week had elapsed. In this case each cylinder was evaluated by two affixing methods including affixing the label with the lengthwise direction of the label facing substantially parallel to the cylinder axis direction as shown in FIG. 47A (referred to as "vertical attachment" below), and affixing the label with the lengthwise direction of the label facing substantially perpendicular to the cylinder axis direction as shown in FIG. 47B (referred to as "horizontal attachment" below).

FIG. 48 is a table showing the favorable results extracted from the evaluation test results. Note that in the drawing the symbol ○ indicates no interlayer separation occurs, the symbol □ indicates interlayer separation occurs below the tolerance range of 3 mm, and the symbol x indicates interlayer separation occurs at 3 mm and larger.

As shown in FIG. 48, although interlayer separation did not occur when an adhesive with a adhesion at a slow speed of 5.0 (N/20 mm) was used and the label attached to the cylinder with a curvature of φ25 mm by vertical attachment and horizontal attachment, interlayer separation of 3 mm and larger did occur when vertical attachment was used on the cylinder with a curvature of φ15 mm while interlayer separation did not occur when horizontal attachment was used. Furthermore, although interlayer separation did not occur when an adhesive with a adhesion at a slow speed of 6.4 (N/20 mm) was used and the label was attached to the cylinder with a curvature of φ25 mm by vertical attachment and horizontal attachment, and the label was attached to the cylinder with a curvature of φ15 mm using horizontal attachment, interlayer separation of less than 3 mm did occur when vertical attachment was used on the cylinder with a curvature of φ15 mm. Note that interlayer separation did not occur when an adhesive with a adhesion at a slow speed of 6.7-25.0 (N/20 mm) was used and the label was attached by vertical attachment and horizontal attachment to the cylinder with a curvature of φ25 mm and the cylinder with a curvature of φ15 mm.

The present inventors came to the following conclusions based on these results. That is, if the normal mode of use of the RFID label T is considered, there is sufficient lack of interlayer separation when the label is attached by horizontal attachment to a cylinder with a curvature of ϕ15 mm, and the lower limit of adhesion at a slow speed capable of preventing interlayer separation is therefore 5.0 (N/20 mm). On the other hand, the upper limit value of adhesion at a slow speed is 25.0 (N/20 mm) based on the adhesion at a slow speed of up to 25.0 (N/20 mm) from the evaluation tests conducted by the present inventors and in general the adhesion at a slow speed of adhesive used in preparing a label with a multilayer structure is a maximum of approximately 25.0 (N/20 mm). Therefore, interlayer separation between the first tape 200B and the second tape 200A can be prevented by using adhesive which has a adhesion at a slow speed of 5.0 (N/20 mm) or higher but less than 25.0 (N/20 mm).

Interlayer separation of the first tape 200B and the second tape 200A can be more reliably prevented if the adhesion at a slow speed is 6.5 (N/20 mm) or greater based on the experience of the present inventors since interlayer separation did not occur when the adhesion at a slow speed was 6.7 (N/20 mm) and interlayer separation occurred at less than 3 mm with vertical attachment on the cylinder with a curvature of ϕ15 mm and adhesion at a slow speed of 6.4 (N/20 mm).

In the present embodiment which has this structure, adhesive provided with a adhesion at a slow speed of 5.0[N/20 mm] or higher but less than 25[N/20 mm] was used on the adhesive layer 200Ba and adhesive layer 200Aa in the base tape 210 which has a multilayer structure configured by an adhesive layer 200Bc, tape base layer 200Bb, adhesive layer 200Ba, adhesive layer 200Aa, tape base layer 200Ab, adhesive layer 200Ac, and separator layer (separation sheet) 200Ad. With this arrangement, the first tape 200B and second tape 200A can be strongly attached and interlayer separation of the first tape 200B and second tape 200A can be prevented. According to the present embodiment the orderliness of the base tape 210, base tape roll 215, and the RFID label produced using the tape and roll can thus be maintained.

In the present embodiment in particular the first tape 200B and second tape 200A can be more strongly attached and interlayer separation of the first tape 200B and second tape 200A can be prevented even more by using adhesive provided with adhesion at a slow speed of 6.5[N/20 mm] or higher but less than 25[N/20 mm] on the adhesive layer 200Ba and adhesive layer 200Aa.

In the present embodiment in particular both the first tape 200B and second tape 200A respectively have adhesive layers 200Aa and 200Ba for fixing the RFID tag Tg. With this arrangement, interlayer separation of the first tape 200B and the second tape 200A is prevented still more because the adhesive layers 200Aa and 200Ba are strongly attached by homologous adhesive layers. Furthermore, the RFID tags Tg can be continuously and stably disposed in the tape lengthwise direction at predetermined intervals because the RFID tags Tg can be respectively fixed to both the tape base layer 200Ab and tape base layer 200Bb using the adhesive layers 200Aa and 200Ba.

Note that although adhesive provided with adhesion at a slow speed of 5.0[N/20 mm] or greater but less than 25[N/20 mm] is used for both the adhesive layers 200Aa and 200Ba which are adjacent to the RFID tag Tg in the present embodiment, an adhesive layer on only one side may also be used.

Note also that the present disclosure is not limited to the layer structure described in the fifth embodiment, and may be applied to various layer structures insofar as the structure is within a range that does not depart from the technical ideas and spirit of the disclosure. For example, the layer structure shown in FIG. 2 of the previously described first embodiment, and the layer structures of the first through twenty-seventh modifications of the first embodiment shown in FIGS. 5-13, 15-17, 19-21, and 23-34 may also be used. Note that although the layer structure of the eighth modification shown in FIG. 12 lacks the adhesive layers 200Aa and 200Ba, in this case the adhesive of the present embodiment may be used on the adhesive layer 200Bc. In this case the effects of the first embodiment and the effects inherent to each modification can be obtained in addition to the effects of the present embodiment.

Note that although interlayer separation of the first tape 200B and second tape 200A is prevented by using adhesive which has a predetermined adhesion at a slow speed on the adhesive layers 200Aa and 200Ba which are adjacent to the RFID tag Tg in the fifth embodiment, the present inventors have discovered that interlayer separation of the cover film 103 and adhesive layer 200Bc can be prevented and the orderliness of the produced RFID label can be maintained also by using adhesive which has a predetermined adhesion at a slow speed on the adhesive layer 200Bc for attaching the cover film 103 in the case of a so-called laminate type tape structure in which the label is configured by bonding a cover film on a base tape. The detailed content is described below in the sixth embodiment.

The following describes the sixth embodiment of the present disclosure with reference to accompanying drawings.

The tag tap roll manufacturing apparatus, base tape 210, and base tape roll 215, and the structure of the RFID label T and the like produced using these tapes and rolls of the present embodiment are identical to the structures shown in FIGS. 37-41 of the third embodiment, and their description is therefore omitted.

In this basic structure the characteristics of the present embodiment prevent the generation of interlayer separation of the cover film 103 and adhesive layer 200Bc by using adhesive which has a desired adhesion at a slow speed on the adhesive layer 200Bc for attaching the cover film 103 as described above. A detailed description follows.

The present inventors conducted evaluation tests interlayer separation using various adhesives which had different adhesion at a slow speed on the adhesive layer 200Bc. In this case the method of measuring the adhesion at a slow speed of the adhesive is same as the method of the fifth embodiment. The method of evaluating interlayer separation involved affixing the RFID labels T produced in a substantially square shape measuring 24×24 mm to a cylinder which had a curved surface with a curvature of ϕ8 mm using a plurality of adhesives with different adhesion at a slow speed applied to the adhesive layer 200Bc, and visually inspecting the interlayer separation of the cover film 103 and adhesive layer 200Bc after one week had elapsed.

FIG. 49A is a table showing the evaluation test results and FIG. 49B is a graph of the evaluation test results.

As shown in FIG. 49, although the amount of interlayer separation was greatest when adhesive with adhesion at a slow speed of 1.8 to 4.9 (N/20/mm) was used, interlayer separation was suppressed to a minimal level with some interlayer separation occurring when adhesive with adhesion at a slow speed of 5.4 (N/20 mm) or higher was used. Furthermore, interlayer separation did not occur when adhesive with adhesion at a slow speed of 8.2 (N/20 mm) or higher was used.

The present inventors came to the following conclusions based on these results. That is, if the normal mode of use of the RFID label T is considered, the lower limit of adhesion at a slow speed capable of preventing interlayer separation is 5.4 (N/20 mm) since the amount of separation that occurred in the evaluation test was 0.5 mm which is within the tolerance limit, and the lower limit is 6.0 (N/20 mm) when a safety factor derived from the tests of the present inventors is added.

On the other hand, the upper limit value of adhesion at a slow speed is 25.0 (N/20 mm) based on the adhesion at a slow speed of up to 25.0 (N/20 mm) from the evaluation tests conducted by the present inventors and in general the adhesion at a slow speed of adhesive used in preparing a label with a multilayer structure is a maximum of approximately 25.0 (N/20 mm). Therefore, interlayer separation between cover film 103 and the adhesive layer 200Bc can be prevented by using adhesive which has a adhesion at a slow speed of 6.0 (N/20 mm) or higher but less than 25.0 (N/20 mm).

Since interlayer separation did not occur when adhesive with a adhesion at a slow speed of 8.2 (N/20 mm) or higher was used as described above, interlayer separation of the cover film 103 and adhesive layer 200Bc can be more reliably prevented if the adhesion at a slow speed is 8.0 (N/20 mm) or higher when the allowance value obtained by the inventors in the test is subtracted.

In the present embodiment which has the above structure, adhesive provided with a adhesion at a slow speed of 6.0[N/20 mm] or higher but less than 25[N/20 mm] is used on the adhesive layer 200Ac in a base tape 210 which has a multilayer structure configured by an adhesive layer 200Bb, adhesive layer 200Ba, adhesive layer 200Aa, tape base layer 200Ab, adhesive layer 200Ac, and separator layer (separation sheet) 200Ad. With this arrangement, the cover film 103 and adhesive layer 200Bc can be strongly attached and interlayer separation of the cover film 103 and adhesive layer 200Bc can be prevented in the RFID label prepared by bonding the cover film 103 to the base tape 210. According to the present embodiment the orderliness of the RFID label produced using the base tape 210 can therefore be maintained.

In the present embodiment in particular the cover film 103 and adhesive layer 200Bc can be even more strongly attached and interlayer separation of the cover film 103 and adhesive layer 200Bc can be prevented even more by using adhesive provided with also adhesion power of 8.0[N/20 mm] or higher but less than 25[N/20 mm] on the adhesive layer 200Ac.

Note also that the present disclosure is not limited to the layer structure described in the sixth embodiment, and may be applied to various layer structures insofar as the structure is within a range that does not depart from the technical ideas and spirit of the disclosure. For example, the layer structure shown in FIG. 2 of the previously described first embodiment, and the layer structures of the first through eleventh, sixteenth through nineteenth, and twenty-fourth through twenty-seventh modifications of the first embodiment shown in FIGS. 5-13, 15-16, 23-26, and 31-34 may also be used. In this case the effects of the first embodiment and the effects inherent to each modification can be obtained in addition to the effects of the present embodiment. Furthermore, although these embodiments and modifications are configured by a tag tape which includes an RFID tag Tg, the present disclosure is not limited to this arrangement inasmuch as the disclosure is also applicable to normal label tapes which do not have an RFID tag Tg.

The invention claimed is:

1. A tag tape comprising:
a substantially sheet-like antenna base on which an RFID circuit element provided with an IC circuit part that stores information and an antenna that transmits and receives information is disposed;
a first tape including a substantially tape-like first tag tape base layer that continuously disposes a plurality of said antenna bases in the tape lengthwise direction at predetermined intervals; and
a second tape disposed on the opposite side from said first tape so as to have said plurality of antenna bases interposed therebetween in the tape width direction; wherein:
at least one of said first tape and said second tape includes an elastic layer formed of an elastic material.

2. The tag tape according to claim 1, wherein:
at least one of said first tape and said second tape includes an antenna base adhesive layer disposed adjacent to said antenna base.

3. The tag tape according to claim 2, wherein:
said second tape includes:
an affixing adhesive layer that affixes said first tag tape base layer to an object to be affixed; and
a separation material layer which is separated during affixing, and is provided on the affixing side of said affixing adhesive layer.

4. The tag tape according to claim 3, wherein:
said second tape includes said antenna base adhesive layer, and
said antenna base adhesive layer also serves as said affixing adhesive layer.

5. The tag tape according to claim 3, wherein:
said second tape includes said elastic layer, and said elastic layer also serves as said separation material layer.

6. The tag tape according to claim 1, wherein:
said first tape includes said elastic layer, and said elastic layer has said first tag tape base layer.

7. The tag tape according to claim 1, wherein:
said second tape includes a substantially tape-like second tag tape base layer that continuously disposes a plurality of said antenna bases at predetermined intervals in the tape lengthwise direction.

8. The tag tape according to claim 7, wherein:
said second tape includes said elastic layer, and said elastic layer also serves as said second tag tape base layer.

9. The tag tape according to claim 2, wherein:
said first tape includes a bonding adhesive layer that bonds a print-receiving tape which is printable and said first tag tape base layer.

10. The tag tape according to claim 9, wherein:
said first tape includes said antenna base adhesive layer, and said antenna base adhesive layer also serves as said bonding adhesive layer.

11. The tag tape according to claim 1, wherein:
said first tape or said second tape includes a print-receiving layer formed of a print-receiving material which is capable of print formation.

12. The tag tape according to claim 11, wherein:
said print-receiving layer is integratedly provided on a substantially sheet-like print-receiving base material.

13. The tag tape according to claim 1, wherein:
said elastic layer includes a polyurethane film layer formed of polyurethane as said elastic material.

14. The tag tape according to claim 1, wherein:
said elastic layer includes a mesh-like film layer formed of a substantially mesh-like film as said elastic material.

15. The tag tape according to claim 1, wherein:
said elastic layer comprises a latex layer formed of latex as said elastic material.

16. A tag tape roll comprising a tag tape that is wound around an axis substantially perpendicular to the tape lengthwise direction, wherein:
said tag tape comprises:
a substantially sheet-like antenna base on which an RFID circuit element provided with an IC circuit part that stores information and an antenna that transmits and receives information is disposed;

a first tape including a substantially tape-like first tag tape base layer that continuously disposes a plurality of said antenna bases in the tape lengthwise direction at predetermined intervals; and a second tape disposed on the opposite side from the first tape so as to have said plurality of antenna bases interposed therebetween in the tape width direction; wherein:

at least one of said first tape and said second tape includes an elastic layer formed of an elastic material.

17. The tag tape roll according to claim 16, wherein:
at least one of said first tape and said second tape of said tag tape includes an antenna base adhesive layer disposed adjacent to said antenna base.

18. The tag tape roll according to claim 17, wherein:
said second tape includes:
an affixing adhesive layer that affixes said first tag tape base layer to an object to be affixed; and
a separation material layer which is separated during affixing, and is provided on said affixing side of said adhesive layer.

19. The tag tape roll according to claim 16, wherein:
said second tape includes a substantially tape-like second tag tape base layer that continuously disposes a plurality of said antenna bases at predetermined intervals in the tape lengthwise direction.

20. The tag tape roll according to claim 16, wherein:
said first tape of said tag tape includes a bonding adhesive layer that bonds a print-receiving tape which is printable and said first tag tape base layer.

21. The tag tape roll according to claim 16, wherein:
said first tape or said second tape of said tag tape includes a print-receiving layer formed of a print-receiving material which is capable of print formation.

22. An RFID label comprising:
a substantially sheet-like antenna base on which an RFID circuit element provided with an IC circuit part that stores information and an antenna that transmits and receives information is disposed;
a first tape including a substantially tape-like first tag tape base layer that continuously disposes said antenna bases; and
a second tape disposed on the opposite side from said first tape so as to have said antenna base interposed therebetween in the tape width direction; wherein:
at least one of said first tape and said second tape includes an elastic layer formed of an elastic material.

23. The RFID label according to claim 22 further comprising a print receiving tape layer which is printable; wherein:
said first tape includes a bonding adhesive layer that bonds said print-receiving tape layer to said first tag tape base layer.

24. The RFID label according to claim 22, wherein:
said first tape or said second tape includes a print-receiving layer formed of a print-receiving material which is capable of print formation.

* * * * *